US009266736B2

(12) United States Patent
Ohta et al.

(10) Patent No.: US 9,266,736 B2
(45) Date of Patent: Feb. 23, 2016

(54) GRAPHITE FILM AND METHOD FOR PRODUCING GRAPHITE FILM

(75) Inventors: Yusuke Ohta, Settsu (JP); Makoto Mishiro, Settsu (JP); Takashi Inada, Settsu (JP); Yasushi Nishikawa, Settsu (JP)

(73) Assignee: KANEKA CORPORATION, Osaka (JP)

( * ) Notice: Subject to any disclaimer, the term of this patent is extended or adjusted under 35 U.S.C. 154(b) by 505 days.

(21) Appl. No.: 13/380,373

(22) PCT Filed: Jun. 22, 2009

(86) PCT No.: PCT/JP2009/002820

§ 371 (c)(1),
(2), (4) Date: Jan. 26, 2012

(87) PCT Pub. No.: WO2010/150300

PCT Pub. Date: Dec. 29, 2010

(65) Prior Publication Data

US 2012/0121880 A1 May 17, 2012

(51) Int. Cl.
*B32B 9/00* (2006.01)
*C01B 31/04* (2006.01)

(52) U.S. Cl.
CPC ............. *C01B 31/04* (2013.01); *C01B 31/0423* (2013.01); *Y10T 428/30* (2015.01)

(58) Field of Classification Search
CPC ............................ C01B 31/04; C01B 31/0423
USPC ........................................... 428/408; 423/447
See application file for complete search history.

(56) References Cited

FOREIGN PATENT DOCUMENTS

| | | |
|---|---|---|
| JP | 63-256508 | 10/1988 |
| JP | 04-149012 | 5/1992 |
| JP | 07-109171 | 4/1995 |
| JP | 2000-178016 | 6/2000 |
| JP | 2006-327907 | 12/2006 |

OTHER PUBLICATIONS

JP,2006-327907 [Detailed Description] Translation.*
JP,2006-327907 [Claims] Translation.*
English-language translation of PCT International Search Report, International Application No. PCT/JP2009/002820, mailed Sep. 15, 2009, 5 pgs.
English-language abstract of JP63-256508, 1 pg.
English-language abstract of JP 04-149012,1 pg.
English-language abstract of JP 07-109171, 1 pg.
English-language abstract of JP 2000-178016, 1 pg.
English-language abstract of JP 2006-327907, 1 pg.

* cited by examiner

*Primary Examiner* — Daniel H Miller
(74) *Attorney, Agent, or Firm* — Kagan Binder, PLLC

(57) ABSTRACT

Provided is a long and large-area graphite film having improved thermal diffusivity and flex resistance, and accompanied by ameliorated ruffling. According to a method for producing a graphite film, in which graphitization of a heat-treated film consisting of a carbonized polymer film is carried out in a state being wrapped around an internal core, the method being characterized in that a heat treatment is executed by controlling distance(s) between the internal core and the film, and/or between the layers of the film, a graphite film accompanied by significantly ameliorated ruffling can be obtained.

19 Claims, 33 Drawing Sheets

(a)

(b)

(b)

(a)

(b)

GRAPHITE FILM AND METHOD FOR PRODUCING GRAPHITE FILM

TECHNICAL FIELD

The present invention relates to a graphite film for use as a heat radiation film and a heat spreader material of electronic instruments, precision instruments and the like, and particularly relates to a long and large-area graphite film being accompanied by ameliorated ruffling and being superior in thermal diffusivity, thermal conductivity and flex resistance, and a method for producing the graphite film.

BACKGROUND ART

When semiconductor elements mounted in various electronic/electric instruments such as computers, and in other heat-generating components and the like are used, the way for cooling down the heat generated in a large quantity is an issue to be investigated. In addition, as each instrument including heat generating parts such as semiconductor elements mounted therein has further reduced size, and also as the quantity of heat generation increases, the housing has become more compact, and heat generation source has been localized. In recent years, in order to deal with such localized and a large quantity of heat generation, use of a graphite film in cooling has been focused, and the demand therefore has been gradually increasing. In order to meet such demands for graphite films, investigation for production of a long and large-area graphite film using a polymer film in a state being wound to give a roll form as a raw material has been performed.

For example, Patent Document 1 discloses a method in which a long polymer film is wrapped around a cylinder and subjected to a heat treatment. Also, Patent Document 2 proposes a method in which expanded graphite and a polymer film are overlapped and wrapped around a graphitic carbon cylinder so as not to bring the polymer film layers into contact with each other, and then baked. Furthermore, Patent Document 3 proposes a method in which a material film having a width of 250 mm and a length of 30 m is wrapped around a carbonaceous cylindrical core having an external diameter of 150 mm, and is subjected to a heat treatment.

In Patent Document 1, graphitization is carried out while maintaining a state in which a film sheet is overlaid around a core. However, in this method, wrinkles and bents are generated at peripheral ends, and thus the size was limited to about 170×180 mm. Still further, when the winding number around the core is increased in this method, the film is broken due to fusion of the polymer film surfaces, and shrinkage of the polymer film resulting from the thermal degradation reaction. Furthermore, when this method is carried out in a greater scale of the size, change in dimension in graphitization leads to still larger wrinkles and bents generated at the peripheral ends.

In addition, according to Patent Document 2, graphitization is carried out while maintaining a state in which a polymer film is overlapped with filmy graphite around the core; however, the film is likely to be broken due to friction between the polymer film and the filmy graphite film according to this method, and wrinkles and bents are more likely to be generated due to restriction of the change in the dimension of the film during the heat treatment, thereby leading to a limitation of the size of about 400×1,600 mm. Moreover, an increase in the winding number around the core, or an increase in the size may result in further generation of breakages and wrinkles of the film, and thus it is difficult to obtain a long and large-area graphite film.

In Patent Document 3, graphitization is carried out while a film is wrapped around a carbon core having a diameter (ϕ) of not less than 120 mm; however, according to this method, graphitization of a material film having a width of 250 mm and a length of 30 m enables a long and large-area graphite film to be obtained without generation of wrinkles and/or bents which can be easily stretched to be flat by eliminating curling of the cylindrical shape without rolling. However, the resultant film is accompanied by significant ruffling, and unevenness of the thickness generated in the entirety as shown in FIG. 1.

Graphite films having ruffling as shown in FIG. 1 is very inferior in processibility and handlability. Thus, it is difficult to, for example, laminate with other sheet, and failure in winding with ends aligned occurs. Also, creases are generated even in rolling steps. In addition, when the graphite film is used as a heat radiation sheet, it fails to come into close contact well on a heat generator, and the heat spreading ability thereof cannot be sufficiently exerted. Also when the graphite film is used as a vacuum sealing, the presence of ruffling matters since it may be a factor that contributes to gas leakage.

CITATION LIST

Patent Documents

Patent Document 1: Japanese Unexamined Patent Application Publication No. S63-256508 (CLAIMS)

Patent Document 2: Japanese Unexamined Patent Application Publication No. H4-149012 (CLAIMS)

Patent Document 3: Japanese Unexamined Patent Application Publication No. 2006-327907 (EXAMPLES)

SUMMARY OF THE INVENTION

Problems to be Solved by the Invention

In order to produce a long and large-area graphite film, problems are explained below which are peculiar to the case in which graphitization is carried out in a state in which a carbonized polymer film is wrapped around a core.

(Change in Dimension During Heat Treatment)

When a graphite film is obtained by subjecting a carbonized film to a heat treatment (subjecting a carbonized film (for example, polymer film which had been heat-treated at 1,000° C.) to a heat treatment at a temperature of not less than 2,000° C.), the film is extended. However, this extension occurs by rearrangement of molecules of the carbonized film, and is an irreversible change in dimension. Thus, unlike thermal expansion of general films, the graphite film is kept larger than the carbonized film even if it is reset to a room temperature after the heat treatment. Furthermore, as a graphite film has higher crystallinity, and more superior thermal diffusivity and thermal conductivity, the degree of the change in dimension becomes greater. Additionally, as the graphitization temperature is higher, the degree of the change in dimension becomes greater, and the degree of the change may be not less than 1%, and at most not less than 5%. This irreversible change in dimension becomes causative of ruffling of the graphite film, and allows the ruffling to be caused. Additionally, when subjecting to a heat treatment at from room temperature to not less than 2,000° C., the ruffling becomes more likely to be caused as change in dimension is enhanced by thermal expansion.

FIG. 2 shows with respect to a polymer film (polyimide film: 50 μm), the retention rate of the size (a distance between arbitrary two points on the film; 50×50 mm square polyimide film employed, and the length of one side of the film being defined as the size in this experiment) and the thickness thereof, associated with a heat treatment. The change of the film associated with the heat treatment results from conversion of the chemical structure, and for example in FIG. 2, the film subjected to a heat treatment at 1,200° C. and consequently shrunk to 80% retains the state having the size of 80% even after the temperature is lowered to room temperature. As shown in FIG. 2, since the polymer film is greatly shrunk and expanded as the heat treatment proceeds, ruffling occurs as the film deforms.

(Influences of Impurities)

Due to the elongation of the film associated with graphitization, metal impurities such as iron that prevent proceeding of the graphitization penetrate from the space formed between the adjacent core and the film, and between the surfaces of the film. Accordingly, ruffling is more likely to be caused since a significant variation is generated between portions where the metal impurities did or did not affect.

(Friction Generated Between Core and Film, and Surfaces of Film)

The elongation of the film associated with the graphitization generates friction between the core and the film, and between the layers of the film. When the friction is generated nonuniformly, unevenness occurs in proceeding of the graphitization, and thus ruffling is caused.

(Strength and Thickness of Film)

The carbonized film that is a graphite film precursor is produced by subjecting a polymer film to a heat treatment, and is glassy and very fragile like a thin glass. Therefore, it is easily broken when folded. On the other hand, in order to obtain a graphite film that is superior in thermal conductivity, it is preferable that the carbonized film has a thickness as small as possible. Thus, it is desired that the polymer film used as a material has a thickness of not greater than 250 μm, and preferably not greater than 130 μm. However, a smaller thickness of the film results in less strength of the film, and accordingly, a slight force renders the film to be bent and wrinkled, or cause ruffling. Also, at high temperatures of not less than 2,000° C., the film has still less strength, and the ruffling further increases.

(Width, Length, and Winding Number)

In case where the film has a greater width and a greater length, and the winding number of the polymer film around the core increases, probability of occurrence of ruffling due to the change in dimension during graphitization dramatically increases, and the difficulty in ameliorating the ruffling is exponentially elevated.

As described in the foregoing, in a method for producing a long and large-area graphite film in which graphitization is carried out at a temperature of not less than 2,000° C. with a carbonized polymer film (carbonized film) wrapped around a core, it has been very difficult to ameliorate ruffling of a very fragile and thin carbonized film without deteriorating the thermal diffusivity, thermal conductivity and flexibility even under circumstances at a temperature of not less than 2,000° C. that may result in inferior strength.

Means for Solving the Problems

An object of the present invention is to provide a method for producing a graphite film capable of producing a long and large-area graphite film that is superior in thermal diffusivity, thermal conductivity and flex resistance, in a state in which a carbonized polymer film is wrapped around a core.

The present invention was completed by elucidating behaviors of shrinkage, expansion and loose of a long film associated with a heat treatment.

(1) A first aspect of present invention is characterized by comprising a winding up step of a heat-treated film.

(2) A second aspect of the present invention is characterized by controlling a spatial distance between a core and a film, and a spatial distance between the layers of the film, before and after a heat treatment.

(3) A third aspect of the present invention is characterized by comprising a heat treatment step by which the apparent cross sectional area of an internal core is increased by not less than 7% after the heat treatment as compared with that before the heat treatment.

(4) A fourth aspect of the present invention is characterized by comprising a heat treatment step by which the rate of decrease of the winding number of a heat-treated film becomes not greater than 3% after the heat treatment as compared with that before the heat treatment.

(5) A fifth aspect of the present invention is a graphite film characterized by being obtained by graphitization of a carbonized polyimide film in a state being wound to give a roll form, accompanied by ameliorated ruffling (camber and sag).

The first to fourth aspects of the invention may be performed alone, or in appropriate combination. As means for solving the problems of the present invention, more specific aspects are as in the following.

The method for producing a graphite film according to one aspect of the present invention is a method having a graphitization step in which a heat-treated film consisting of a carbonized polymer film is subjected to a heat treatment at a temperature of not less than 2,000° C. in a state being wrapped around an internal core, and the graphitization step is characterized by comprising a winding up step of winding up the heat-treated film.

Also, the method for producing a graphite film according to other aspect of the present invention is a method in which graphitization is carried out by subjecting a heat-treated film consisting of a carbonized polymer film to a heat treatment at a temperature of not less than 2,000° C. in a state being wrapped around an internal core, wherein the method is characterized by comprising a heat treatment step by which provided that the length of the outer periphery of the internal core is defined as $r_0$, and that the spatial distance between the internal core and the first layer of the heat-treated film is defined as $w_0$, $(w_0/r_0 \times 100)$ is maintained to be not greater than 7 before and after the heat treatment.

Further, the method for producing a graphite film according to another aspect of the present invention is a method in which graphitization of a heat-treated film consisting of a carbonized polymer film is carried out at a temperature of not less than 2,000° C. in a state being wrapped around an internal core, wherein the method is characterized by comprising a heat treatment step by which provided that winding number of the heat-treated film is defined as $N_h$, and that the spacial distance between the n-th layer of the heat-treated film and the n+one-th layer of the heat-treated film (wherein n represents an integer of 0 to $N_h-1$, and the null layer corresponds to the outer surface of the internal core) is defined as $w_n$, the distance $w_n$ is maintained to be not greater than 5 mm in $N_h \times 0.5$ or more spaces between the layers of the heat-treated film from among spaces between the layers of the heat-treated film that are present in the number of $N_h$.

Moreover, the method for producing a graphite film according to still other aspect of the present invention is a method in which graphitization of a heat-treated film consisting of a carbonized polymer film is carried out at a temperature of not less than 2,000° C. in a state being wrapped around an internal core, wherein the method is characterized by comprising a heat treatment step by which provided that the roll length of the n-th layer of the heat-treated film is defined as $r_n$, and that the roll length of the n+one-th layer of the heat-treated film is defined as $r_{n+1}$ (wherein n is 0 or a non-negative integer, and $r_0$ represents the length of the outer periphery of the internal core), $((r_{n+1}-r_n)/r_n\times100)$ is maintained to be not greater than 8 before and after the heat treatment.

Furthermore, the method for producing a graphite film according to yet another aspect of the present invention is a method in which graphitization of a heat-treated film consisting of a carbonized polymer film is carried out at a temperature of not less than 2,000° C. in a state being wrapped around an internal core, wherein the method is characterized by comprising a heat treatment step by which provided that the winding number of the heat-treated film is defined as $N_h$; the thickness of the heat-treated film per layer is defined as d; and that the apparent rolling thickness of the heat-treated film is defined as D, $(D/(N_h\times d))$ is maintained to be not less than 1 and not greater than 2.5 before and after the heat treatment.

In addition, the method for producing a graphite film according to yet another aspect of the present invention is a method in which graphitization of a heat-treated film consisting of a carbonized polymer film is carried out at a temperature of not less than 2,000° C. in a state being wrapped around an internal core, wherein the method is characterized by comprising a heat treatment step by which the apparent cross sectional area of the internal core is increased by not less than 7% after the heat treatment as compared with that before the heat treatment.

The method for producing a graphite film according to yet another aspect of the present invention is a method in which graphitization of a heat-treated film consisting of a carbonized polymer film is carried out at a temperature of not less than 2,000° C. in a state being wrapped around an internal core, wherein the method is characterized by comprising a heat treatment step by which the rate of decrease of the winding number $N_h$ of a heat-treated film becomes not greater than 3% after the heat treatment as compared with that before the heat treatment.

The graphite film according to still other aspect of the present invention is a graphite film obtained by carrying out graphitization using a heat-treated film as a carbonized polyimide film, in a state being wound to give a roll form, the graphite film being characterized in that: the number of double folds until the test piece is broken in an MIT folding endurance test is not less than 5,000; the thermal diffusivity in a planar direction is not less than $5.0\times10^{-4}$ m$^2$/s; the thickness is not less than 7 μm and not greater than 120 μm; the width $U_{gs}$ is not less than 100 mm, and the area is not less than 5 m$^2$; and as determined by a method of film windability evaluation in accordance with JIS C2151 with a load against the graphite film of 20 g/cm, the camber $R_{gs}$ is not greater than 35 mm, and the sag $Z_{gs}$ is not greater than 80 mm.

Effects of the Invention

According to the first aspect of the present invention, winding up of the heat-treated film around the internal core decreases the space between the internal core and the film, and between the layers of the film. In addition, according to the second aspect of the present invention, graphitization is carried out in a state in which the space between the internal core and the film, and between the layers of the film is made absent. Moreover, according to the third aspect of the present invention, since a heat treatment step is included in which the apparent cross sectional area of the internal core is increased after the heat treatment as compared with that before the heat treatment, the space between the internal core and the heat-treated film is not formed associated with the heat treatment. Additionally, since a heat treatment step is included in which the rate of decrease of the winding number of the heat-treated film is diminished after the heat treatment as compared with that before the treatment according to the fourth aspect of the present invention, the space between the layers of the film becomes small also in this case.

Therefore, according to these aspects of the invention, deformation of the film can be suppressed, and a graphite film accompanied by less ruffling can be obtained.

DESCRIPTION OF THE EMBODIMENTS

The present invention relates to a method for producing a graphite film capable of producing a long and large-area graphite film that is superior in thermal diffusivity, thermal conductivity and flex resistance, in a state in which a carbonized polymer film is wrapped around a core. The present invention involves the following five aspects of the invention.

(1) A first aspect of present invention is characterized by comprising a winding up step of a heat-treated film.

(2) A second aspect of the present invention is characterized by controlling a spatial distance between a core and a film, and a spatial distance between the layers of the film, before and after a heat treatment.

(3) A third aspect of the present invention is characterized by comprising a heat treatment step by which the apparent cross sectional area of an internal core is increased by not less than 7% after the heat treatment as compared with that before the heat treatment.

(4) A fourth aspect of the present invention is characterized by comprising a heat treatment step by which the rate of decrease of the winding number of a heat-treated film becomes not greater than 3% after the heat treatment as compared with that before the heat treatment.

(5) A fifth aspect of the present invention is a graphite film characterized by being obtained by graphitization of a carbonized polyimide film in a state being wound to give a roll form, accompanied by ameliorated ruffling (camber and sag).

The first to fourth aspects of the invention may be performed alone, or in appropriate combination.

<Cause of Ruffling of Graphite Film>

Figure 3:
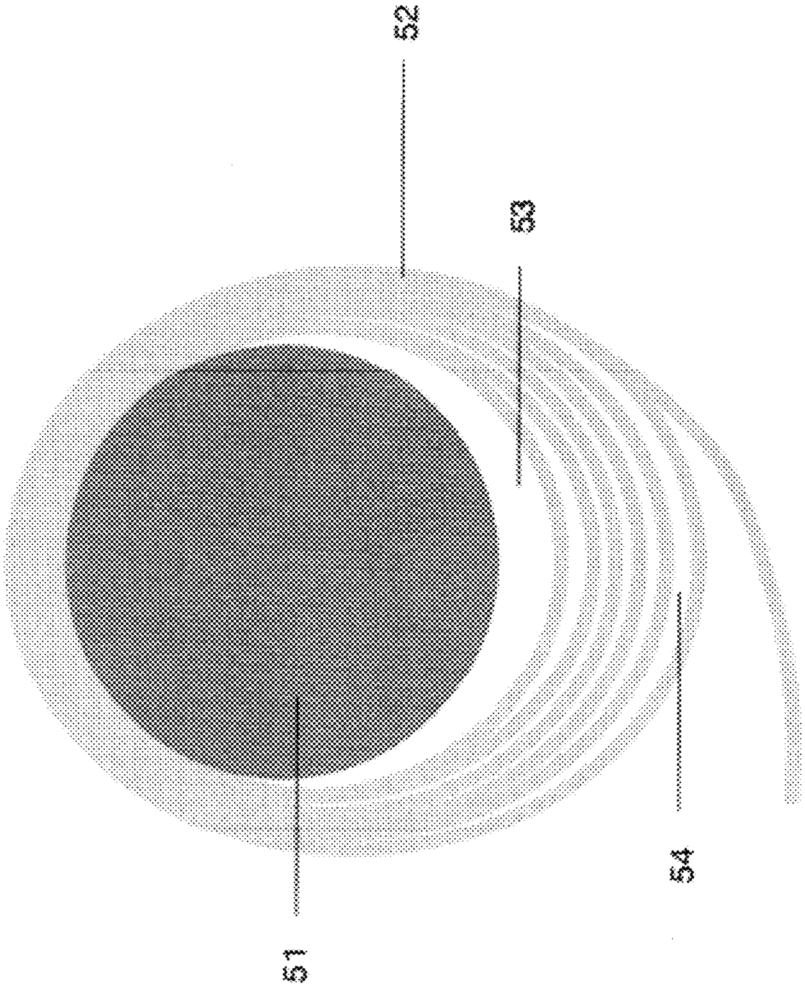
FIG. 3 shows a cross sectional view illustrating a film wrapped around a cylindrical internal core with a loose state.

The cause of ruffling of the graphite film is presumed as follows. Graphitization of a carbonized polymer film is accompanied by change in the size and thickness of the film, and generation of cracked gas from the film; therefore even if the film is uniformly wrapped around the internal core before the heat treatment, the dimension of the film is changed during the heat treatment, and thus the film is heat-treated in the state in which a load is nonuniformly applied. Since the film is fragile and weak, ruffling occurs in this process of the change in dimension. Particularly, when the change in dimension is great and loosening (i.e., unwinding) of the film becomes significant, the heat treatment is executed in the state as shown in FIG. 3. The heat treatment of the film in a loosened state (a state in which a space is present between the layers of the film) is this manner results in temperature irregularity along a longitudinal direction of the film (from the inner circumference to the outer periphery) and a width direction of the film (from the center to the end), thereby generating variation of extension of the film to cause ruffling.

In addition, when the space as shown in FIG. 3 is present, metal impurities that prevent graphitization penetrate from the space, leading to nonuniform graphitization, and thus ruffling is more likely to be caused.

In addition, when the heat treatment is carried out in a free state without load against the film, and when the winding number of the film around the cylinder increases, the film is still more likely to be loosen. Carbonized films are very fragile, and are further brittle at high temperatures of not less than 2,000° C. to be apt to be greatly deformed. Moreover, when the space between the core and the film, and/or the space between the layers of the film are nonuniform, nonuniform friction occurs between the core and the film, and/or between the layers of the film, and thus ruffling is more likely to be caused.

<Method of Graphitization in State in Which Carbonized Polymer Film is Wrapped Around Internal Core>

A method of graphitization in a state in which a carbonized polymer film is wrapped is explained below.

<Polymer Film>

Although a polymer film for use in the present invention is not particularly limited, and for example, film of a polymer selected from the group consisting of polyimide (PI), polyamide (PA), polyoxadiazole (POD), polybenzooxazole (PBO), polybenzobisoxazole (PBBO), polythiazole (PT), polybenzothiazole (PBT), polybenzobisthiazole (PBBT), polyparaphenylenevinylene (PPV), polybenzoimidazole (PBI), and polybenzobisimidazole (PBBI) may be exemplified. By using at least one of these, a graphite film that has favorable crystallinity, and is superior in thermal diffusivity and thermal conductivity can be easily obtained. On the other hand, when such a polymer film is used, the graphitization process is more likely to proceed, and thus significant change in dimension may occur in the graphitization process. The polymer film may be produced by a well-known production method. In the present invention, it is important to use a heat resistant aromatic polymer film.

For the following reasons, a polyimide film is preferably used as the polymer film. Also, a polyimide film obtained by performing a chemical curing method of a polyamic acid as a precursor using a dehydrating agent and an amine in combination to execute imide inversion is more preferably used.

(1) Carbonization and graphitization of a polyimide film, particularly a polyimide film obtained by a chemical curing method, more easily proceed than polymer films formed with other organic material. Therefore, favorable crystallinity can be attained, and thermal diffusivity is improved. On the other hand, due to ease in proceeding the graphitization process, change in dimension during the graphitization process can be significant.

(2) Polyimide having various structures and characteristics can be obtained by selecting a variety of material monomers ad libitum. In other words, the molecule designing can be comparatively facilitated.

<Thickness of Polymer Film>

The thickness of the polymer film used in the present invention is not less than 10 μm and not greater than 250 μm, preferably not less than 20 μm and not greater than 130 μm, and still more preferably not less than 20 μm and not greater than 80 μm. When the film thickness is not less than 10 μm, the strength of the film increases, and ruffling is ameliorated. Whereas, when the film thickness is not greater than 250 μm, outgas resulting from components not forming the graphite layer is likely to be released from the film, thereby preventing the graphite layer breaking, and suppressing change in dimension, leading to amelioration of ruffling.

<Polymer Film and Birefringence>

Since a higher birefringence indicates more favorable molecular in-plane-orientation of the polymer film itself, the graphitization reaction is more likely to proceed. When this polymer film is used as a material, a graphite film that is superior in thermal diffusivity, thermal conductivity and flexibility can be produced.

Therefore, the polymer film which may be used in the present invention has a birefringence Δn that concerns with molecular in-plane-orientation of not less than 0.08, preferably not less than 0.10, and still more preferably not less than 0.12 with respect to any direction in the film face. When the birefringence Δn is not less than 0.08 with respect to any direction in the film face, the graphitization process is more likely to proceed, and thus a graphite film that is superior in thermal diffusivity can be formed. On the other hand, change in dimension during the graphitization process can be significant.

In general, when a polymer film having a thickness of not greater than 30 μm and thus being hard to have plasticity is used, the birefringence is particularly preferably not less than 0.12 since a graphite film having superior flexibility can be readily obtained.

<Definition of Birefringence>

The term birefringence as referred to herein means the difference between a refractive index in an arbitrary direction within the film face, and a refractive index in a thickness direction. The birefringence, Δnx, in an arbitrary direction X within the film face is derived by the following formula (mathematical formula 1).

Birefringence $\Delta nx$=(refractive index $Nx$ in $X$ direction within the surface)−(refractive index $Nz$ in a thickness direction) (mathematical formula 1)

The birefringence of a polymer film may be determined using a measurement system of refractive index and film thickness manufactured by Metricon Corporation (Model: 2010 Prism Coupler). Using a light source having a wavelength of 594 nm, refractive indices are measured with TE mode and TM mode, respectively. Accordingly, a (TE−TM) value is determined as a birefringence value.

Figure 30:
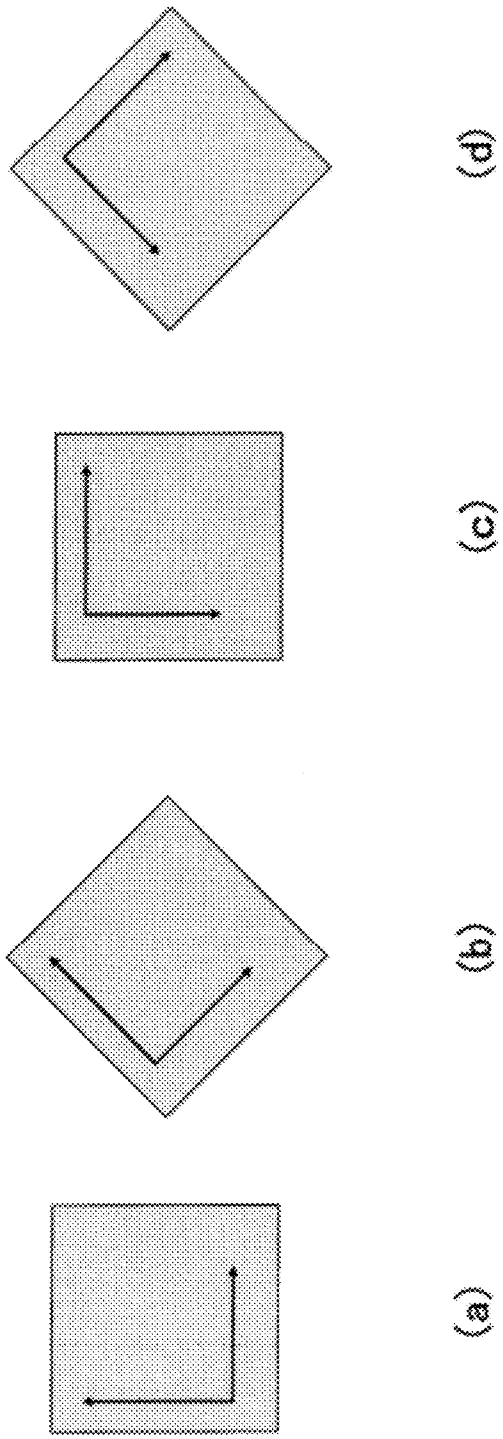
FIG. 30 shows plan views illustrating the setting angle of the sample in the measurement of the birefringence.

Note that the "arbitrary direction X within the film face" described above means that the X direction may be in any direction within the face such as 0° direction, 45° direction, 90° direction and 135° direction, as shown in FIG. 30 (*a*), by way of example, based on the direction along which the material flows in film formation (left to right in FIG. 30 (*a*)). Therefore, the determination of the birefringence is preferably carried out by setting the sample in an apparatus in 0° direction, 45° direction, 90° direction and 135° direction, and the birefringence at each angle is measured to determine the average as the birefringence value.

<Internal Core>

In the present invention, the shape of the internal core around which the polymer film or the carbonized polymer film (=raw material film) is wrapped is not particularly limited; however, a columnar shape such as a cylindrical shape or polygonal columnar shape may be employed. The internal core used may not necessarily be single, and two or more internal cores may be used by wrapping the raw material film. Also, the internal core may not be integrated, and may be composed of two or members. The internal core is particularly preferably formed with divided two or more lengthwise split members that are aligned in parallel with a longitudinal direction of the columnar body.

<Particularly Preferable Shape of Internal Core>

Figure 1:
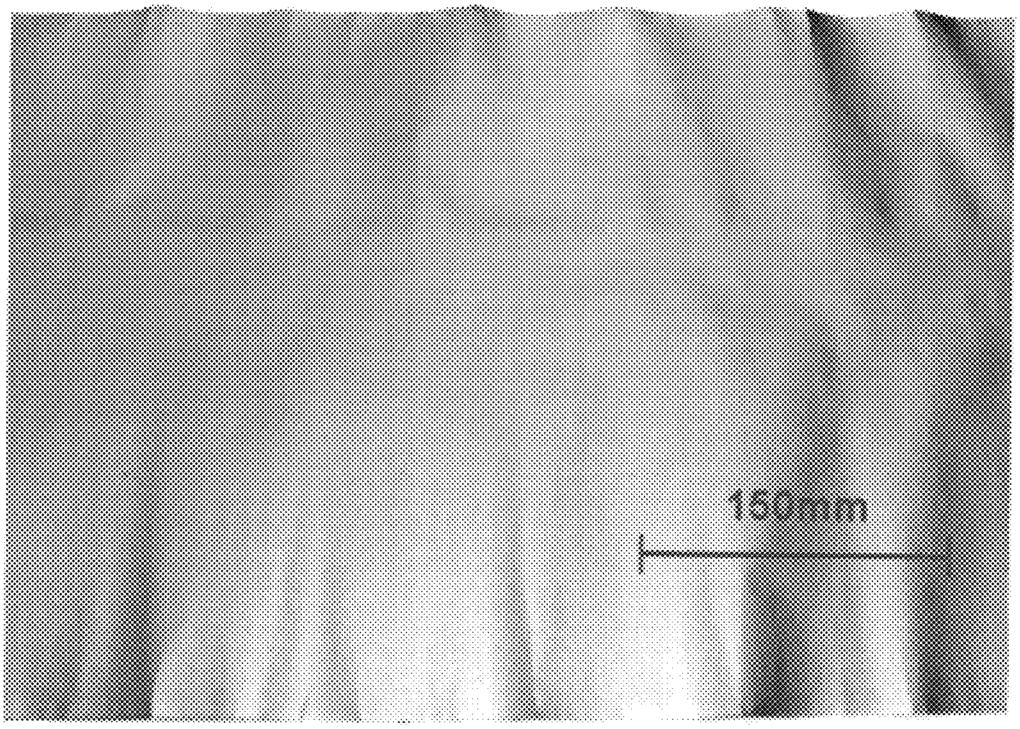
FIG. 1 shows an overview photograph illustrating a graphite film accompanied by ruffling.
Figure 2:
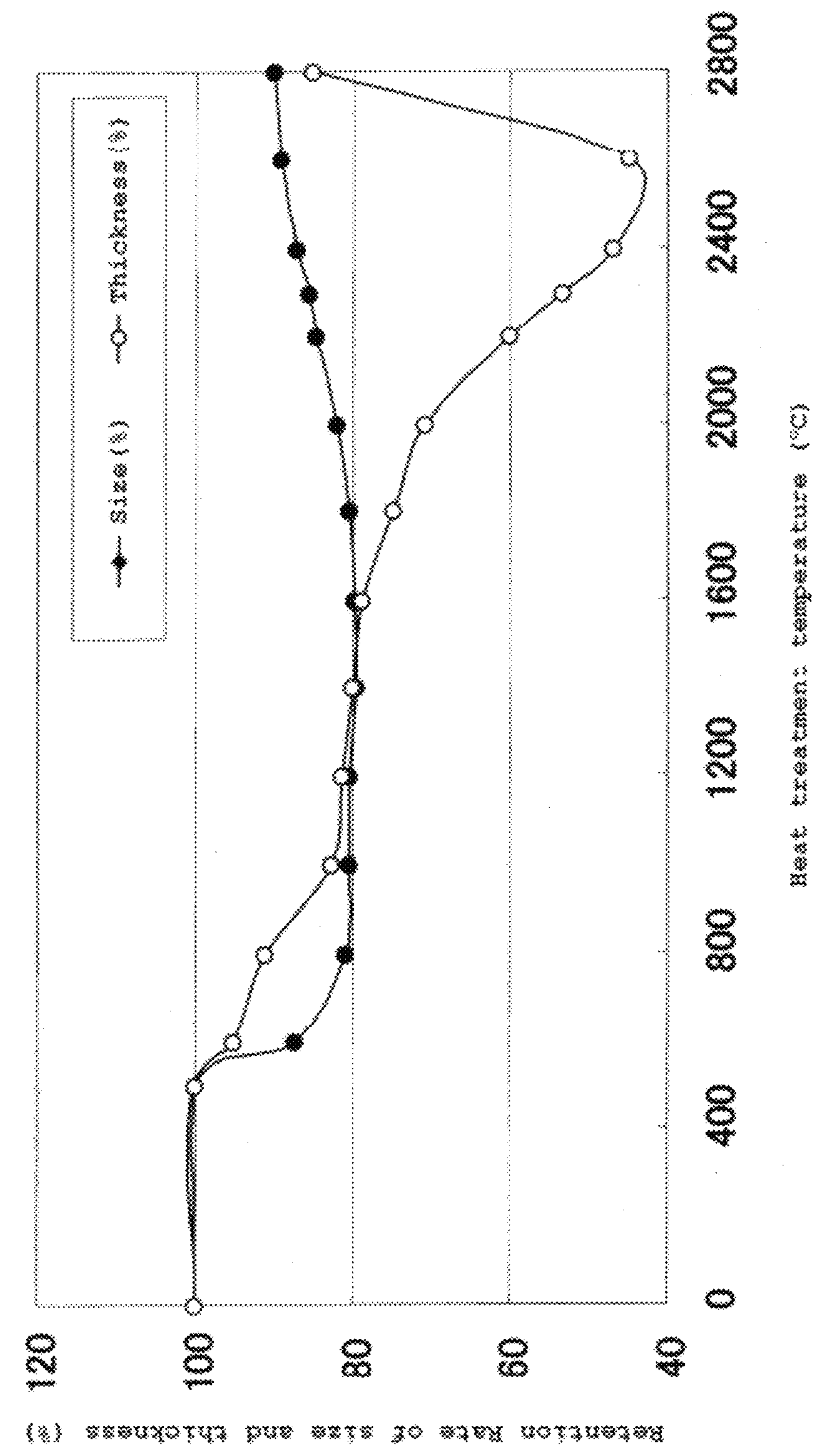
FIG. 2 shows a view illustrating the retention rate of the size and the thickness of a polymer film associated with a heat treatment.

Among the internal cores as described above, the internal core having a cylindrical shape is particularly preferred since a high-quality graphite film can be obtained, because smooth shrinkage and expansion of the raw material film associated with a heat treatment can be realized with less irregular internal core. When angularity exits as in the case of polygonal columnar shapes, the film may be caught and may be strained. Particularly, in the carbonization step, the film rotates around the internal core as it shrinks (as shown in FIG. 2, the film shrunk to about 80% of the original size); therefore, the internal core is suitably less irregular, and thus a cylindrical internal core is suited. In addition, also carrying out the winding up step of the film as described later, the internal core suitably has a cylindrical shape for similar reasons.

<Material of Internal Core>

The most important requirement for materials of the internal core used in the present invention is durability in environments of continuous use at not less than 1,000° C. The materials of the vessel that meet such a requirement may include carbon materials such as extruded articles, molded articles and cold isostatic pressed articles, ceramics such as alumina ($Al_2O_3$), zirconia ($ZrO_2$), quartz ($SiO_2$), silicon carbide (SiC), titania ($TiO_2$), magnesia (MgO), silicon nitride ($Si_3N_4$) aluminum nitride (AlN), yttria ($Y_2O_3$), mullite ($3Al_2O_3.2SiO_2$), cordierite ($2MgO.2Al_2O_3.5SiO_2$), steatite ($MgO.SiO_2$) and forsterite ($2MgO.SiO_2$), as well as composite materials produced by reinforcement of graphite with carbon fibers, i.e., C/C composite, and the like. Of these, in light of ease in processing, production cost, and versatility, carbon materials can be preferably used. Additionally, ceramics may be molten, decomposed, or deformed at treatment temperatures required for the graphitization process (not less than 2,200° C.); therefore, carbon materials are preferable also in light of the heat resistance.

<Diameter of Internal Core Having Cylindrical Shape>

The diameter of the internal core having a cylindrical shape may be not less than 30 mm and not greater than 400 mm, preferably not less than 50 mm and not greater than 200 mm, and still more preferably not less than 70 mm and not greater than 120 mm. The internal core having a diameter of not less than 30 mm is preferred since the resulting graphite film is prevented from peculiar winding, and ruffling is less likely to occur. On the other hand, the internal core having a diameter of not greater than 400 mm is preferred in terms of increase in the amount of treatment per unit volume. In addition, when the internal core has a great diameter, the space can be effectively used so as to increase the amount per one treatment by using the internal core having a tubular shape, and providing inside thereof an additional internal core around which the heat-treated film is wound.

<Heat-Treated Film>

The heat-treated film in the present invention refers to a polymer film which was subjected to a heat treatment.

<Carbonized Polymer Film (i.e., Carbonized Film)>

Among the aforementioned heat-treated films, in particular, a polymer film after subjecting to carbonization is hereafter described. The carbonized polymer film which is used in the present invention is preferably obtained by subjecting a polymer film as a starting material to a preheat treatment under a reduced pressure or in inert gas. This preheat treatment is generally carried out at a temperature of about 1,000° C., and it is preferable to maintain the temperature range of around 1,000° C. for about 30 min. More specifically, the carbonization temperature employed in carbonizing the polymer film is not less than 600° C. and not greater than 2,000° C., preferably, not less than 1,000° C. and not greater than 1,800° C., and still more preferably not less than 1,200° C. and not greater than 1,600° C.

The treatment carried out at a temperature of not less than 600° C. enables sufficient carbonization, thereby being capable of converting into a high-quality graphite film. On the other hand, although the polymer film carbonized at a temperature of not greater than 2,000° C. has inferior strength in terms of the absolute value, favorable handlability can be achieved.

One example of the method of carbonizing a long and large-area polymer film in the form of a roll is as in the following.

Figure 4:
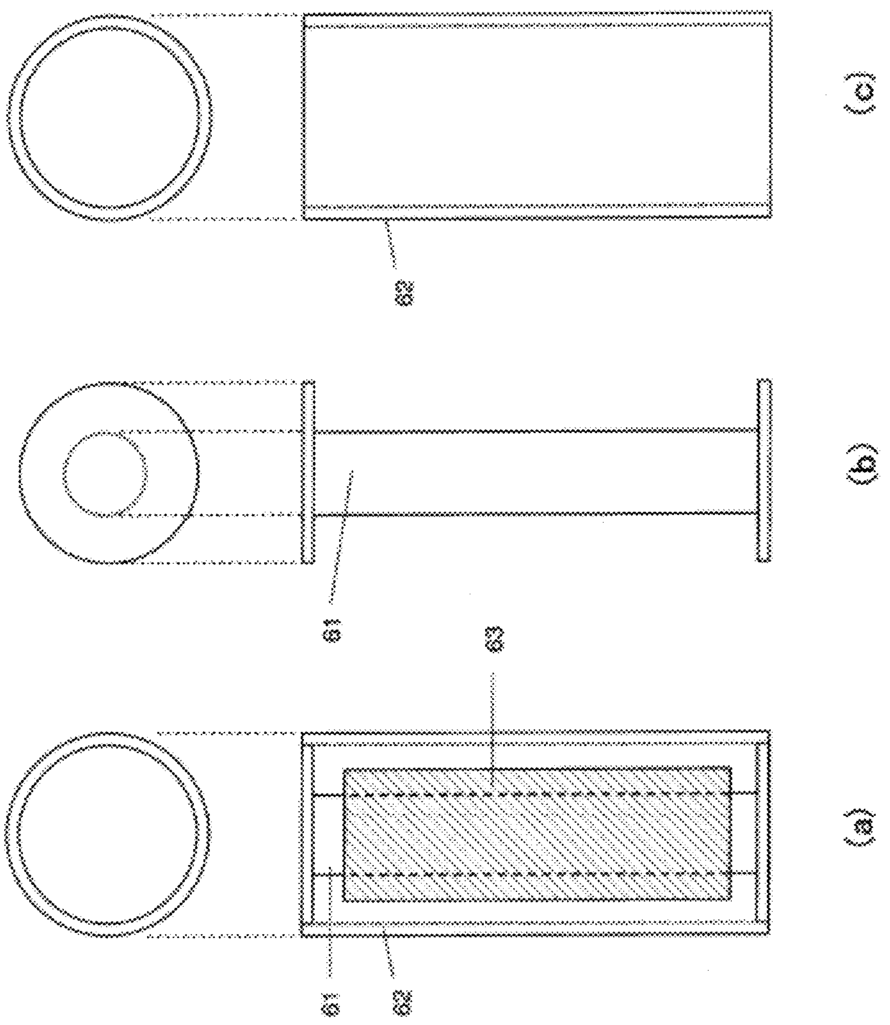
FIG. 4 shows (a) a plan view (top) and a lateral view (bottom) illustrating a state of a polymer film wrapped around a cylindrical internal core; (b) a plan view (top) and a lateral view (bottom) of the internal core; and (c) a plan view (top) and a lateral view (bottom) of the external cylinder.

FIG. 4 (*a*) shows a state in which a polymer film is wrapped around a graphite internal core 61; FIG. 4 (*b*) shows a plan view (top) and a lateral view (bottom) of the internal core 61; and FIG. 4 (*c*) shows a plan view (top) and a lateral view (bottom) of the external cylinder 63. As shown in FIG. 4 (*a*), a polymer film 63 having a width of 500 mm and a length of 50 m is wrapped about 150 times around a cylindrical internal core 61 having an external diameter of 100 mm and a length of 600 mm, and a graphite external cylinder 62 having an inner diameter of 130 mm covers therearound. The internal core 61 and the external cylinder 62 are disposed concentrically, and the polymer film will be situated between walls of the graphite double pipe. The carbonization treatment is preferably carried out by transversely setting in an electric furnace a vessel in which the polymer film 63 was placed (transversely means to set such that an height direction of the internal core 61 runs horizontally), and elevating the temperature to 1,000° C.

Accordingly, the polymer film carbonize in the form of a roll is suited for graphitization in the form of a roll. When graphitization is carried out using the carbonized film thus obtained, the internal core used in the carbonization may be directly used, or removed and another internal core may be used.

<Graphitization Step>

In the graphitization step, a carbonized film that is an aggregate of amorphous carbon is heated to a high temperature, thereby rearranging molecules to achieve conversion into graphite. In general, a heat treatment is carried out under a reduced pressure or in inert gas, to a temperature of not less than 2,000° C.

The maximum temperature in the heat treatment for allowing the graphitization to proceed further is not less than 2,700° C., preferably not less than 2,800° C., and still more preferably not less than 2,900° C. When the heat treatment temperature falls within this range, the graphite layer grows along a planar direction, and thus a graphite film that is superior in flex resistance and thermal diffusivity is formed. In addition, a higher graphitization temperature, particularly a temperature of not less than 2,700° C. leads to promotion of the graphitization, and thus change in dimension during the graphitization process can be significant.

<Graphitization of Carbonized Film in a State Being Wrapped Around Internal Core>

Figure 24:
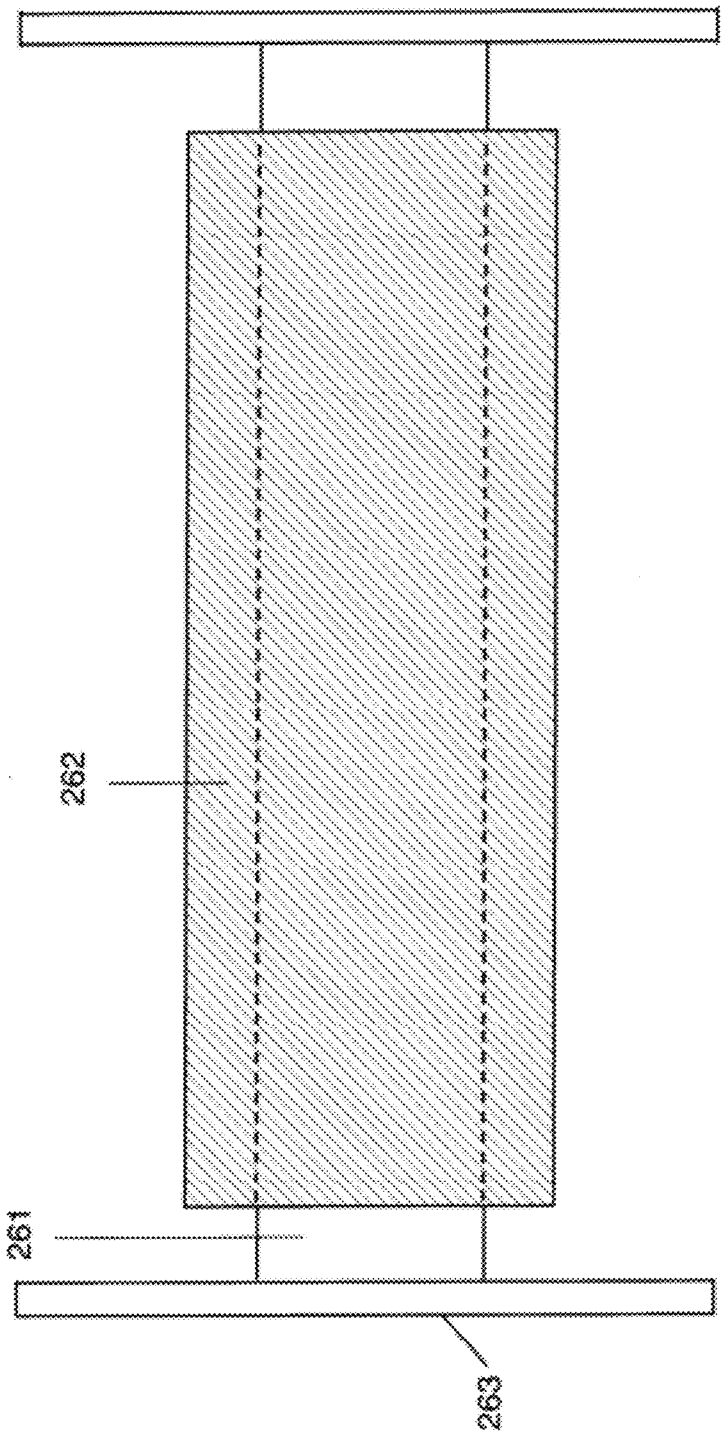
FIG. 24 shows a lateral view illustrating a state of a film floating by means of an internal core as an anchorage.

On the ground that restriction by the size in the furnace is more likely to be avoided for obtaining a long and large-area graphite film, the heat treatment of the film in the form of a roll is efficacious. In the present invention, a heat treatment of a carbonized film in the form of a roll is performed in a state being wrapped around the internal core. In this procedure, it is particularly preferred for obtaining a graphite film accompanied by less variation in physical properties due to uniform heat transfer when, as shown in FIG. 24, the heat treatment is carried out while an internal core 261 is floated by attaching a support member 263 to the internal core 261 such that a carbonized film 262 is not substantially in contact with any substance other than the internal core 261.

<Graphitization by a Plurality of Times of Heat Treatment>

The graphitization step can be performed with a plurality of times of the heat treatment. In this case, at least one time of the heat treatment is carried out preferably at a temperature of not less than 2,700° C., and the other heat treatment temperature can be changed appropriately such as a temperature lower than 2,700° C. After the heat treatment, the film may be cooled, for example, to room temperature, and after cooling, the heat-treated film may be removed from the furnace. One typical example of the step may include the heat treatment at 2,000° C. and further to 2,200° C., cooling, removing from the furnace, again placing in the furnace, and the heat treatment to 2,900° C.

Also in connection with the winding up step of the film described later, this step may be carried out among the plurality of times of the heat treatment, or during any of the heat treatment. In addition, the internal core may be changed, for example, during the heat treatment or among the plurality of times of heat treatment.

<<First Aspect of the Invention: Comprising Winding Up Step of the Heat-Treated Film>>

The first aspect of the present invention is characterized by comprising a winding up step of the heat-treated film.

<Winding Up Step>

As shown in FIG. 2 described above, the length of the heat-treated film increases with graphitization at a temperature of about not less than 2,000° C.; therefore, even if the film is tightly wrapped around the internal core before the heat treatment, the film gradually takes apart from the internal core during the heat treatment. Accordingly, the space between the film and the internal core formed during this treatment is a causation of ruffling of the film. In addition, the film is unwound while rotating during the heat treatment, whereby the space is formed between the layers of the film. The space between the layers of the film is also a causative of ruffling of the film since deteriorated close contact between the layers of the film resulting from the space formed between the layers of the film may increase of the possibility of deformation of the film. Moreover, if the degree of close contact between the layers of the film varies, variation of heat history in a longitudinal direction and a width direction of the film is caused, leading to occurrence of ruffling. In addition, ruffling becomes more likely to be caused also due to the action of metal impurities penetrates from the space. Furthermore, when the film is loosen and subjected to the heat treatment in the state as shown in FIG. 3, the space 53 between the internal core 51 and the film 52, and/or the space 54 between the layers of the film 52 become nonuniform. Thus, the friction generated between the internal core 51 and the film 52, and/or between the layers of the film 52 becomes nonuniform, whereby ruffling is even more likely to occur. The winding up step of the heat-treated film in the present invention is carried out for amelioration these events.

Figure 17:
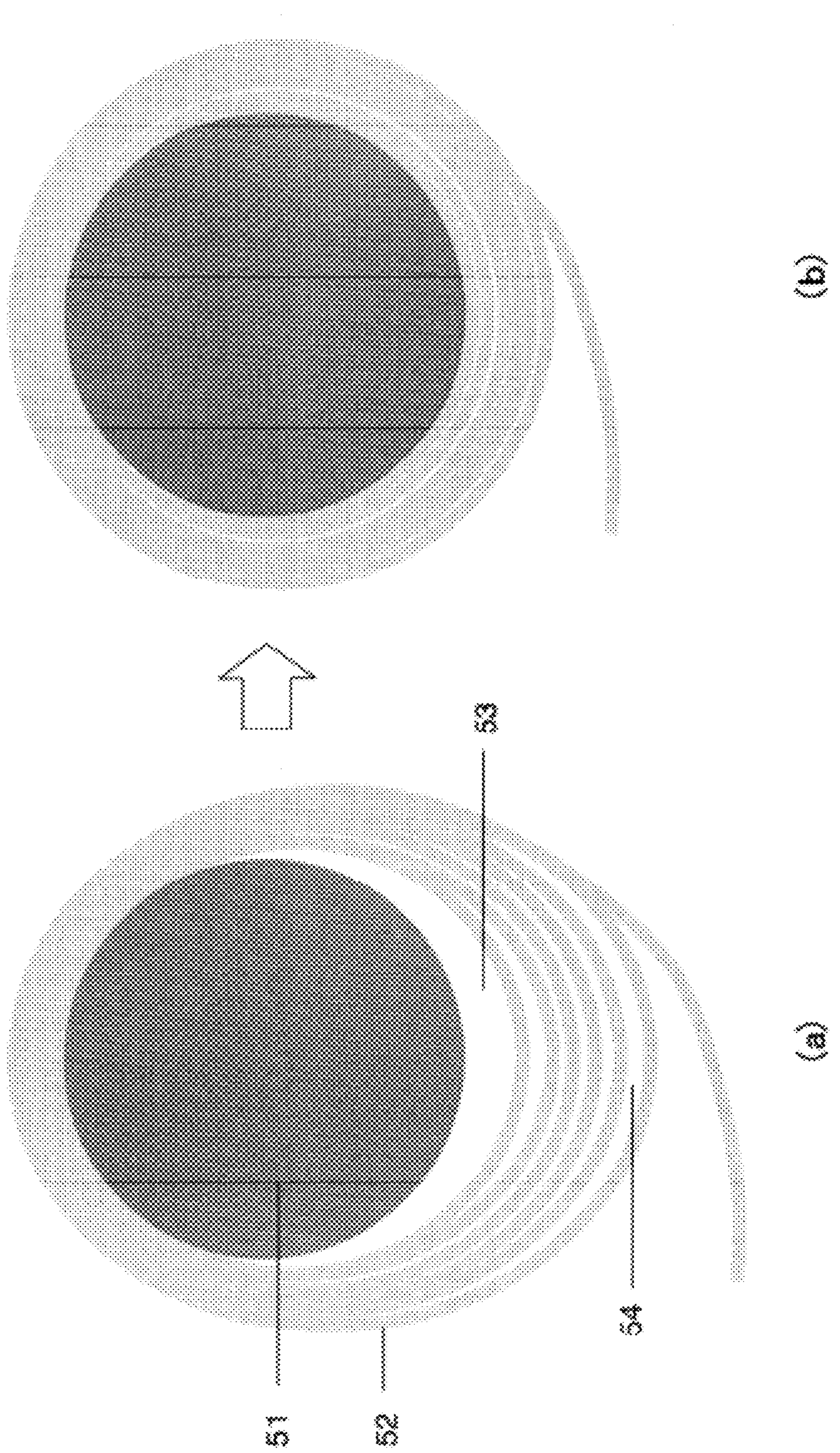
FIG. 17 shows cross sectional views for illustrating a winding up step.

According to the winding up step of the present invention, as shown in FIGS. 17 (*a*) and (*b*), the film 52 is wound off around the internal core 51 so as to prevent from formation of the space 53 between the film 52 and the internal core 51, and the space 54 between the layers of the film 52.

The method for the winding up is not particularly limited, and may be performed by a machinery, or a manual work. Also, the internal core 51 may be rotated to wind up, or the heat-treated film 52 may be rotated to wind up. Still further, the winding up may be executed after unwinding the film 52 from the internal core 51, or without unwinding. Additionally, when winding up is executed after unwinding, the film may be wound off such that the innermost layer portion before winding up turns into the outermost layer.

Also, the time point when the winding up step is carried out is not particularly limited, but the winding up step is efficiently carried out when loosening of the film occurs. This step may be carried out during the heat treatment, after the heat treatment, or after cooling to the room temperature. Alternatively, the step may be continuously carried out during the heat treatment (i.e., the heat treatment may be carried out while winding up as needed to meet loosening), and may be carried out a plurality of times also after lowering the temperature.

Furthermore, in the method for producing a graphite film of the present invention, the internal core may be changed during the step. In case where the internal core was changed, it is preferred to carry out the winding up step to conform to the novel internal core. For example, in case where the diameter of the internal core after the change is smaller than the diameter of the internal core before the change, the space between the heat-treated film and the internal core increases, and thus the winding up is preferably carried out until there is no space therebetween. The winding up may be also carried out while changing from the former internal core to another internal core.

In such a winding up step, it is most preferred that the internal core has a cylindrical shape since defects such as breakage of the heat-treated film may be caused if the core has irregularities as in polygonal column due to the rotation of the film around the core in the winding up step.

<Winding Up Step During the Heat Treatment>

Figure 18:
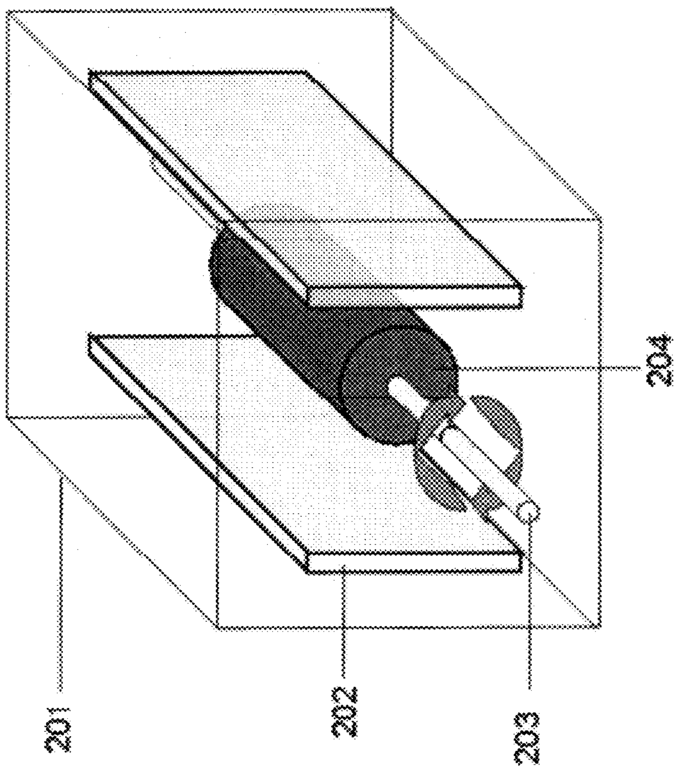
FIG. 18 shows a perspective view illustrating a winding up operation of a film in a furnace.

The winding up step during the heat treatment is now more specifically explained. As described above, the degree of loosening of the film varies any time resulting from the heat treatment temperature; therefore, it is efficacious to wind up during the heat treatment as needed to meet the loosened heat-treated film. In one example, as shown in FIG. 18, a method in which an internal core 203 situated in a furnace 201 and heated by a heater 202 is rotated by an operation executed outside the furnace to wind up a film 204 may be performed. In addition, a method may be conceived in which a rotation mechanism is attached to the external side of a heat insulating material in the furnace, and the internal core is rotated. The speed of rotation of the internal core 203 may be adjusted to meet the speed of loosening of the film 204, or the internal core 203 may be rotated at a certain speed by applying a certain torque.

Figure 19:
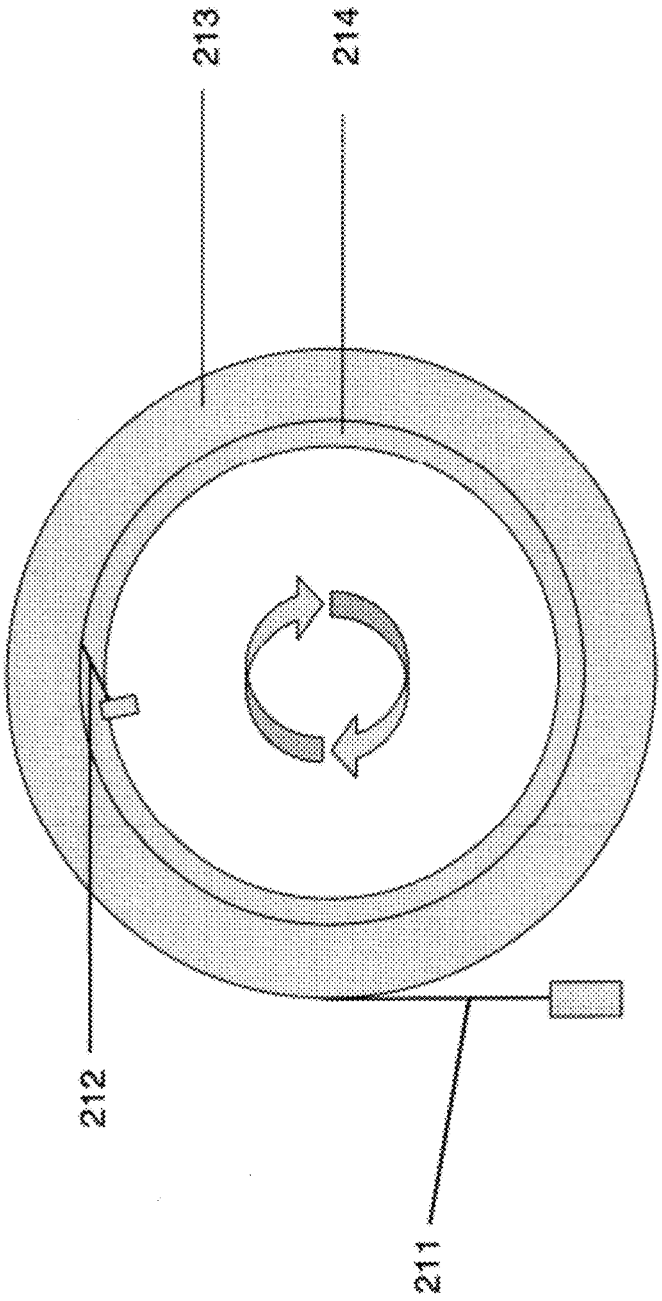
FIG. 19 shows a cross sectional view for illustrating a method of fixing the film.

Moreover, in order to prevent the internal core from spinning around in aimless circles, it is also efficacious to, as shown in FIG. 19, fix the end 212 of the innermost layer of the film 213 to the internal core 214. It is more efficacious to fix also the end 211 of the outermost layer of the film 213, for example, in a direction opposite to the direction of rotation of the internal core 214.

Figure 16:
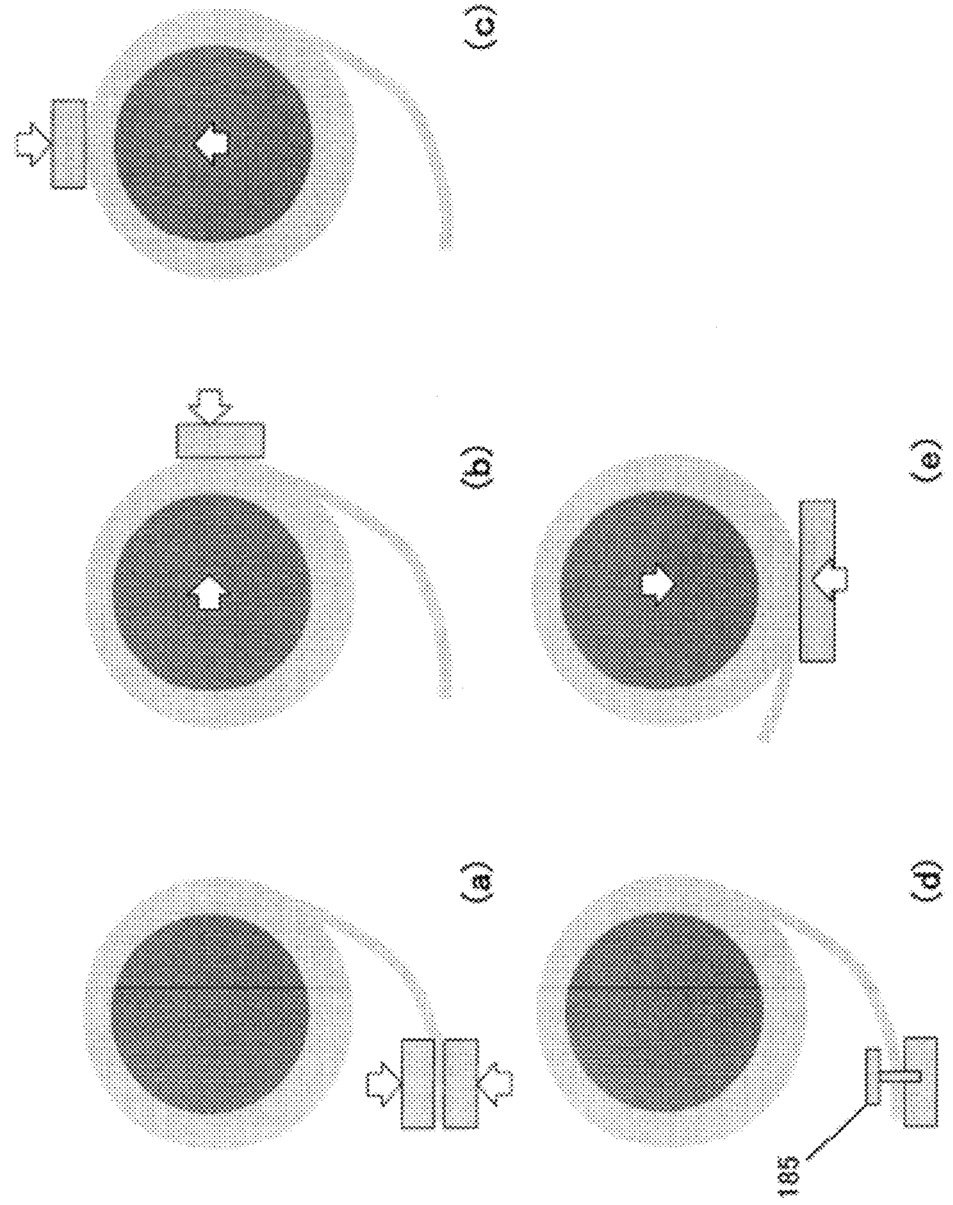
FIG. 16 shows cross sectional views for illustrating a method of suppressing rotation of the heat-treated film.

Furthermore, by applying a pressure to the outermost film layer as shown in FIG. 16 (*a*) to (*e*), spinning around in aimless circles of the film can be also prevented. Also, adjustment of the pressure enables the film to spin around in aimless circles as is when the film was wound up. When such a situation can be achieved by adjusting the pressure, loosening of the heat-treated film can be eliminated constantly by merely rotating the internal core continuously at a constant rate during the heat treatment.

<Temperature Range Suited for Winding Up Step During the Heat Treatment>

In the method in which winding up for loosening is executed as needed during the heat treatment, the temperature range in which winding up is particularly necessary is 1,400 to 2,800° C. in which graphitization of the carbonized polymer film proceeds, and the length of the heat-treated film is extended (see FIG. 2).

Therefore, the temperature range suited for the winding up step of the film is not less than 1,400° C. and not greater than 3,100° C., preferably not less than 1,600° C. and not greater than 3,000° C., and still more preferably, not less than 1,800° C. and not greater than 2,900° C. The winding up carried out at temperatures of lower than 1,400° C. exhibits inferior effects as the film is further loosen at temperatures higher than 1,400° C. Also, at temperatures higher than 3,100° C., rotation can be difficult since the strength of members in the furnace is impaired.

<Winding Up Step After the Heat Treatment>

A method of carrying out the winding up step after the heat treatment is explained in detail below. When the winding up step is carried out after the heat treatment, it is preferred to carry out the graphitization step a plurality of times. Therefore, in this case, the loosened film is wound up during the plurality of times of the heat treatment, and the subsequent heat treatment step will be carried out.

Alternatively, in the winding up step after the heat treatment, the heat-treated film may be subjected to the winding up step after cooling to for example, the room temperature. As described above, the change of the film associated with the heat treatment results from conversion of the chemical structure, and thus the deformation of the film that occurs in the heat treatment is not eliminated even if cooled to room temperature.

More specifically, for example, after heating to the intended temperature and cooled to room temperature, the heat-treated film may be taken out from the furnace, and the winding up may be executed by a manual work. The heat treatment in a state with no loosening of the film is enabled by further carrying out the subsequent heat treatment step after executing the winding up.

Also, if the graphitization step is separated into a large number of heat treatments, and a plurality of winding up steps are carried out among these heat treatments, the graphite film accompanied by more ameliorated ruffling can be obtained with larger number of winding up steps. For example, as is seen from FIG. 2, loosening occurs due to enlargement of the film size as the temperature is elevated occasionally in the temperature range of 1,800 to 2,700° C. Therefore, for example, the treatment is carried out to 1,800° C., followed by cooling to perform the winding up operation, and then the treatment is carried out to 1,900° C., followed by cooling again to perform the winding up operation. These are repeated with the treatment temperature increased by an increment of 100° C., i.e., 2,000° C., 2,100° C. . . . to perform the winding up step. Accordingly, a graphite film accompanied by significantly ameliorated ruffling can be obtained.

<Heat Treatment Temperature Immediately Before Carrying Out the Winding Up Step>

With respect to the method in which a winding up step is carried out after the heat treatment, the heat treatment temperature immediately before carrying out the winding up step is not less than 1,400° C., preferably not less than 1,600° C., and still more preferably, not less than 1,800° C. Since the heat-treated film is accompanied by loosening according to the winding up step of the film which had been subjected to the heat treatment at a temperature of not less than 1,400° C., the effect by winding up is more likely to be exhibited.

<Winding Up Step Before Graphitization Step>

It is preferred that carbonized polymer film is also subjected to a winding up step, before the graphitization step, to wind up around the internal core before the graphitization step.

When the carbonized polymer film is graphitized in a state being wrapped around the internal core, carbonization of the polymer film is often also performed in a state being wrapped around the internal core. However, the polymer film immediately after the carbonization is accompanied by both the space between the core and the film, and the space between the layers of the film; therefore, the winding up step is preferably carried out before subjecting to the graphitization step.

This step is also included in the winding up step as referred to herein, and is important for obtaining a flat graphite film.

<Control of Spatial Distance Between Core and Film, and Spatial Distance Between the Surfaces of the Film>

When the winding up step is carried out, it is important to control the spatial distance between the core and the film, and the spatial distance between the layers of the film in order to ameliorate ruffling of the graphite film.

<Length $r_0$ of the Outer Periphery of the Internal Core>

Figure 6:
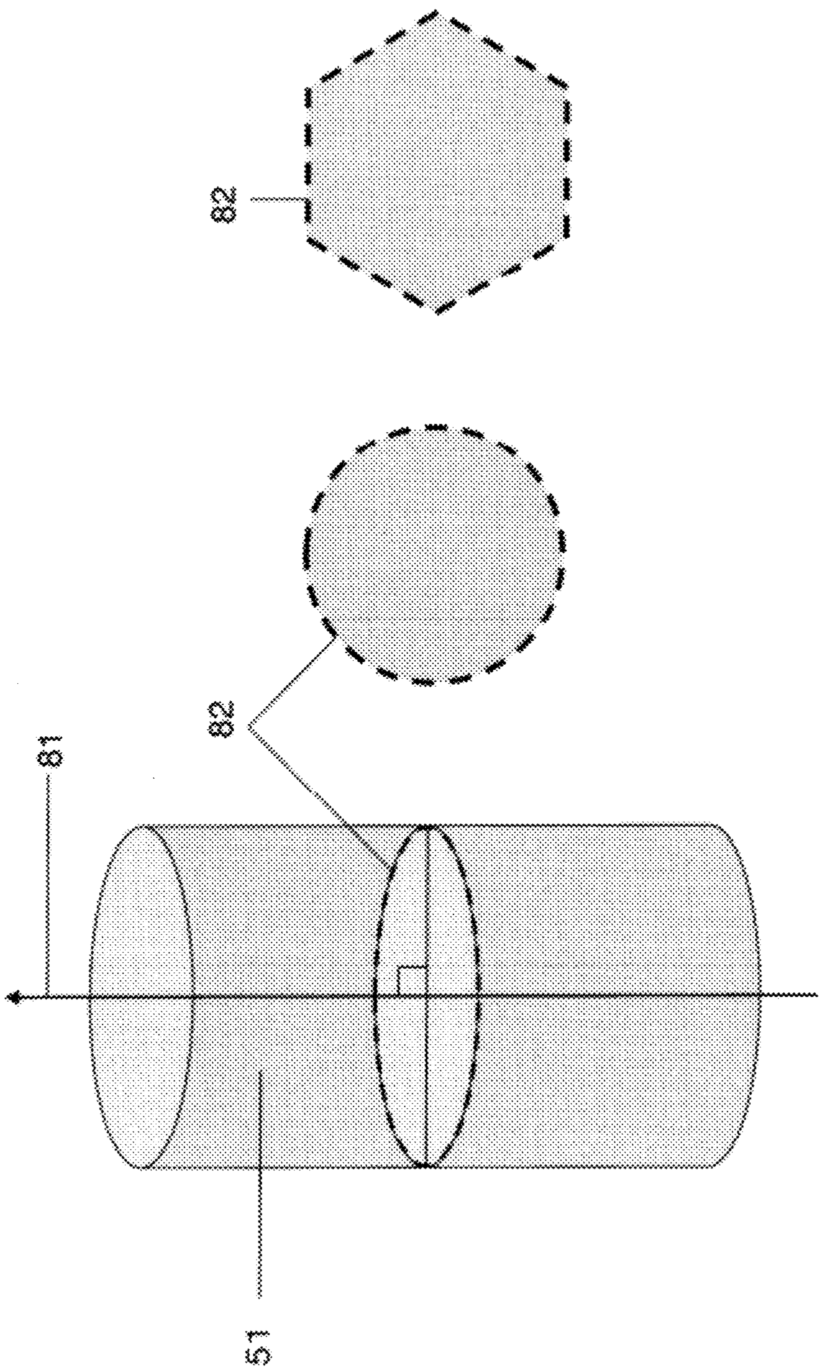
FIG. 6 shows cross sectional views for explaining the length $r_0$ of the outer periphery of the internal core.
Figure 7:
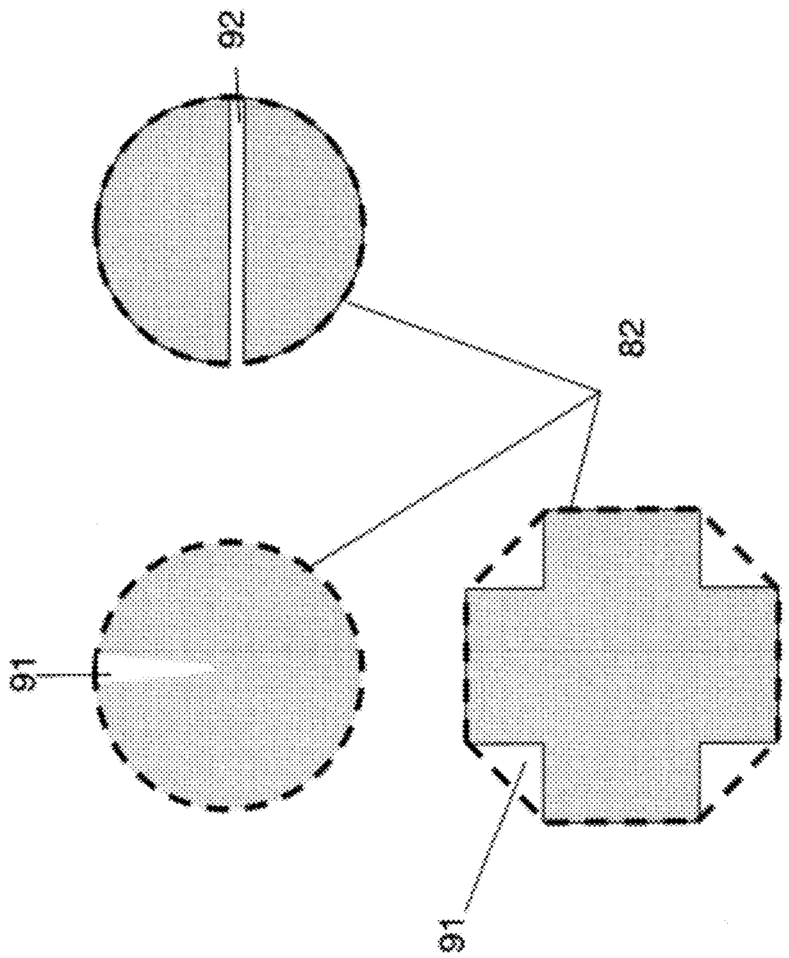
FIG. 7 shows cross sectional views illustrating the length of the outer periphery of the internal core $r_0$ having recession(s).

As shown in FIG. 6, the length $r_0$ of the outer periphery of the internal core in the present invention corresponds to the outer periphery of the cross sectional view 82 given by cutting perpendicularly to a height direction of the internal core 51. In case where the thickness of the internal core varies, it is regarded as the outer periphery of the cross section at the midpoint along a vertical direction in the same Figure. When the internal core is recessed, or separated into two or more lengthwise split members as shown in FIG. 7, the part along the dotted line is regarded as the outer periphery.

<Spatial Distance $w_0$ Between the Internal Core and the First Layer of the Heat-Treated Film>

Figure 8:
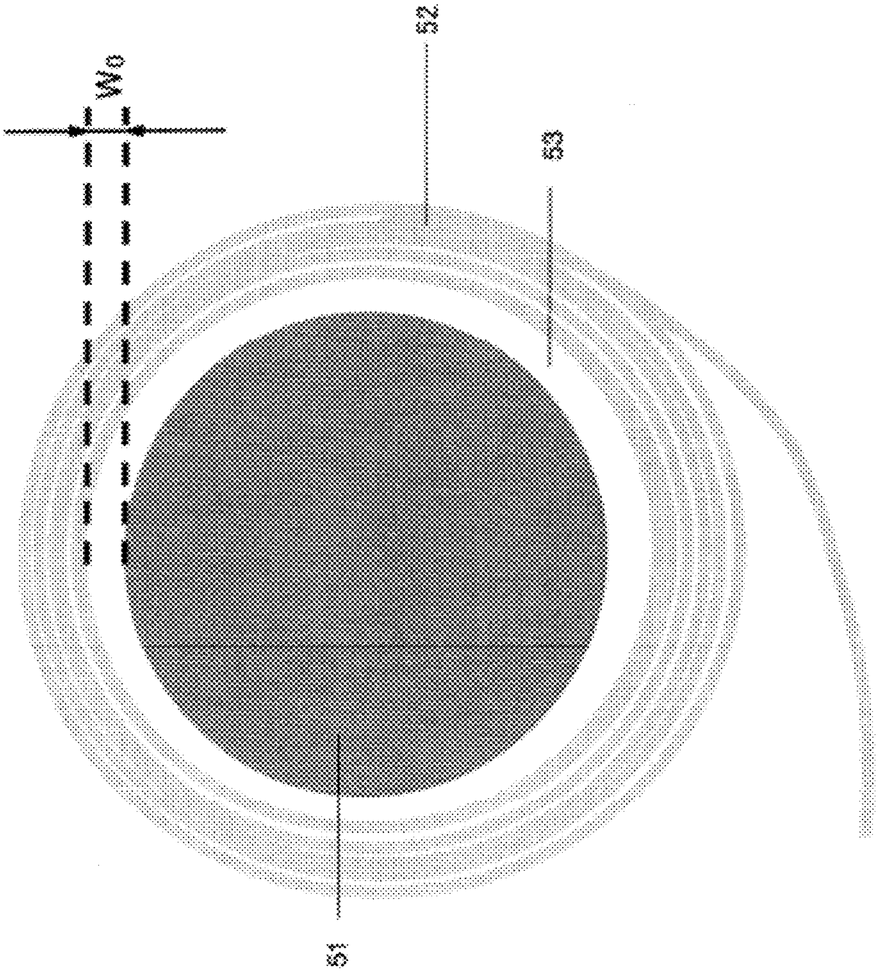
FIG. 8 shows a cross sectional view illustrating the space between the internal core and the first layer of the heat-treated film.
Figure 9:
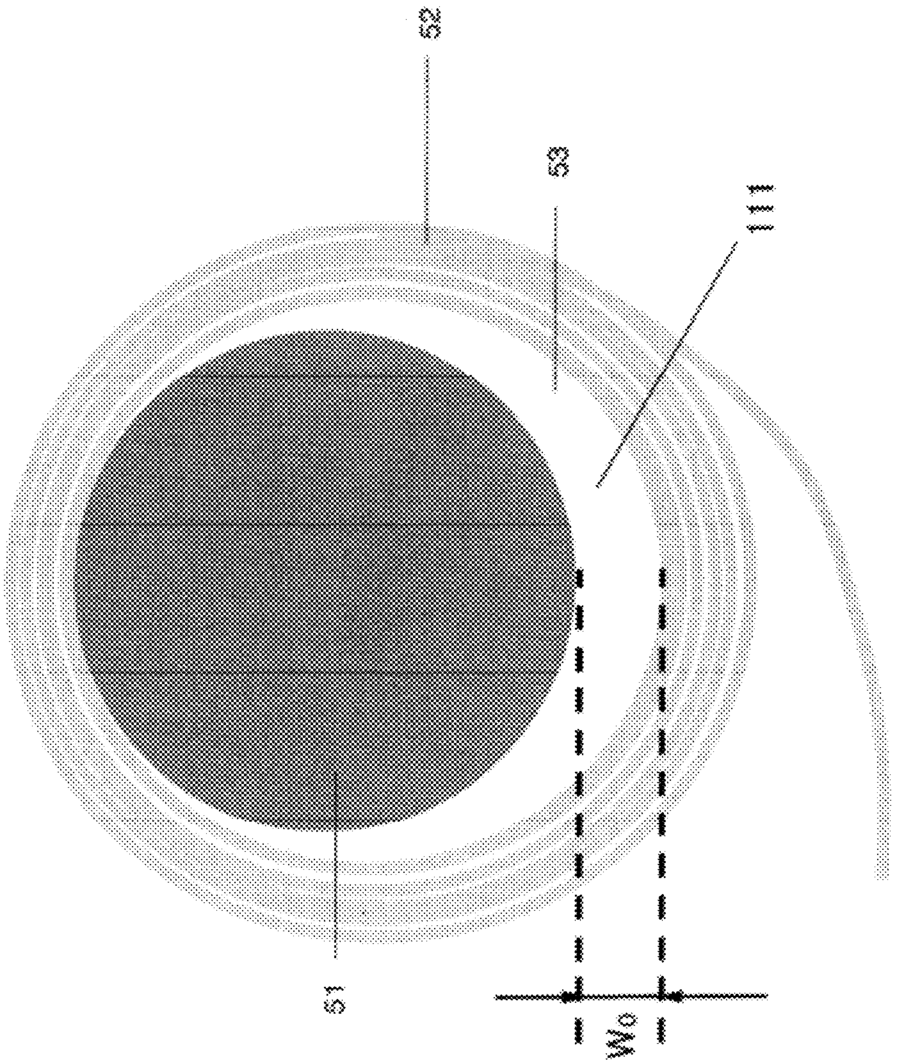
FIG. 9 shows a cross sectional view for illustrating the space between the internal core and the first layer of the heat-treated film, indicating a case in which the space is not uniform.

The spatial distance $w_0$ between the outer surface (null layer) of the internal core and the first layer of the heat-treated film is, as shown in FIG. 8, the linear distance between the internal core 51 and the first layer of the heat-treated film. Also, when the space is not constant as shown in FIG. 9, the maximum spatial distance 111 of the heat-treated film is defined as $w_0$. For example, when the internal core 51 around which the heat-treated film 52 was wrapped is placed transversely (to make a height direction of the internal core horizontal) as shown in FIG. 9, the bottom will have a large space 111.

<$w_0/r_0 \times 100$ in Winding Up Step>

When the winding up step is carried out, the proportion ($w_0/r_0 \times 100$) of the spatial distance $w_0$ between the internal core and the first layer of the heat-treated film with respect to the length $r_0$ of the outer periphery of the internal core is preferably as small as possible. When the core and the film completely came into contact, ($w_0/r_0 \times 100$) is 0; therefore, ($w_0/r_0 \times 100$) is not less than 0.

In the winding up step of the present invention, the winding up is preferably executed such that ($w_0/r_0 \times 100$) becomes not greater than 7, preferably not greater than 5.5, and still more preferably not greater than 4. When ($w_0/r_0 \times 100$) is not greater than 7, the space between the internal core and the first layer of the heat-treated film can be made smaller, and thus deformation of the film can be suppressed.

<Spatial Distance $w_n$ Between the n-th Layer and the n+one-th Layer of the Heat-Treated Film in Winding Up Step>

When the winding up step is carried out, not only the space between the internal core and the first layer of the heat-treated film, but also the space between the layers of the film is preferably as small as possible. More specifically, when the space between the n-th layer, the n being counted from the layer close to the internal core, and the n−one th layer closer to the core than the n-th layer by one layer, and the space between the n-th layer and the n+one-th layer further to the core than the n-th layer by one layer of the heat-treated film are as small as possible, the graphite film accompanied by ameliorated ruffling on the n-th layer can be obtained.

Figure 10:
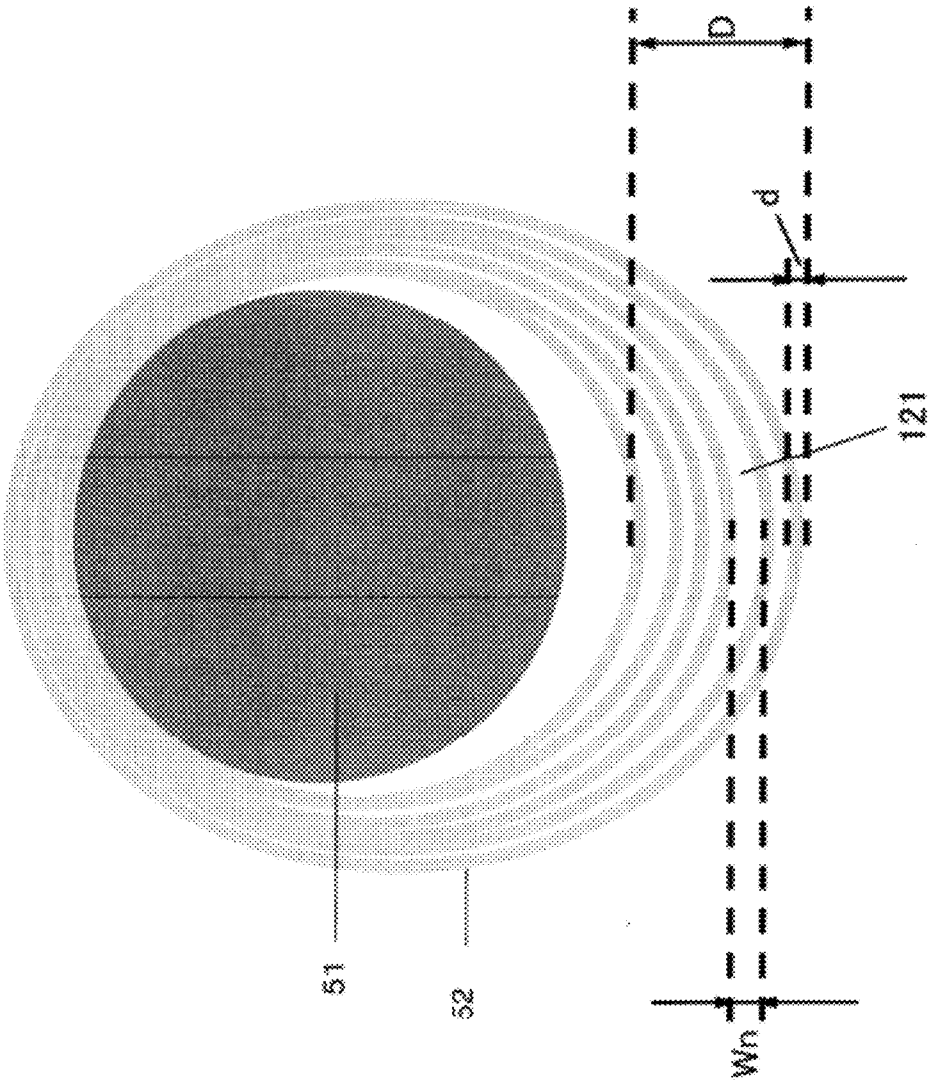
FIG. 10 shows a cross sectional view for illustrating the space between the film and the film, and an apparent thickness D of the film.

As shown in FIG. 10, the linear distance between the n-th layer and the n+one-th layer of the heat-treated film is defined as $w_n$. Herein, when the space is not constant, the maximum spatial distance is defined as $w_n$. When the layers of the film completely came into close contact with each other, $w_n$ is 0; therefore, $w_n$ is not less than 0.

In the winding up step of the present invention, the winding up is preferably executed such that $w_n$ becomes not greater than 5 mm, preferably not greater than 4 mm, and still more preferably not greater than 3 mm. When the spatial distance is not greater than 5 mm, the space between the layers of the heat-treated film can be made smaller, and thus deformation of the film can be suppressed.

It is to be noted that when the winding number of the heat-treated film is defined as $N_h$, for example, the wound film corresponding to several layers (about 10 layers) from the circumference may be greatly wound down toward the external side; however, such states is also included in the scope of the present invention, as long as the distance $w_n$ of the spaces between the layers of the heat-treated film of $N_h \times 0.5$ or more satisfies the above requirements.

<($(r_{n+1}-r_n)/r_n) \times 100$ in Winding Up Step>

When the winding up step is carried out, the proportion ($((r_{n+1}-r_n)/r_n) \times 100$) of the difference of the roll lengths between the n+one-th layer and the n-th layer of the heat-treated film to the roll length of the n-th layer of the heat-treated film is preferably as small as possible. Wherein, n is 0 or a nonnegative integer, and $r_0$ represents the length of the outer periphery of the internal core. When the layers of the film completely came into close contact with each other, $((r_{n+1}-r_n)/r_n) \times 100$ is 0; therefore, $((r_{n+1}-r_n)/r_n) \times 100$ is not less than 0.

In the winding up step of the present invention, the winding up is preferably executed such that the ratio $((r_{n+1}-r_n)/r_n \times 100)$ becomes not greater than 8, preferably not greater than 6, and still more preferably not greater than 4. When the proportion $((r_{n+1}-r_n)/r_n) \times 100$ is not greater than 8, the spaces between the internal core and the first layer, and n+one-th layer and the n-th layer of the heat-treated film can be made smaller, and thus deformation of the film can be suppressed. Accordingly, obtaining a graphite film associated with less ruffling is enabled. In this regard, since the outer periphery of the internal core $r_0$ (n=0) does not vary by heat, the distance between the internal core and the first layer of the film increases by heat as compared with the distance between the layers of the film. Therefore, the value $((r_1-r_0)/r_0\times100)$ when n is 0 in particular, is preferably made smaller than the value when n is not 0.

<Thickness d per Layer of Heat-Treated Film>

The thickness d per layer of the heat-treated film is the thickness of one layer of the heat-treated film, and determined as an average of values at nine points measured as in <Measurement of Thickness of Polymer Film and Graphite Film> described later in EXAMPLES. The measurement of the thickness is enabled by conventional measuring method with a micrometer or the like.

<Apparent Rolling Thickness D of the Heat-Treated Film>

The apparent rolling thickness D of the heat-treated film is, as shown in FIG. 10, a linear distance from the inner face of the first layer (innermost layer) to the external surface of the outermost layer in a state being wrapped around the internal core. The term "apparent" as used herein means measurement of D taking also into consideration the space between the film layers. More specifically, when there is a space between film layers, the thickness D can be estimated to be smaller by applying a pressure; however, the apparent rolling thickness D is measured without applying a pressure such that the space between the film layers can be maintained.

In addition, when the space is not constant as shown in FIG. 10, the maximum rolling thickness is defined as D. It is to be noted that for example, the wound film corresponding to several layers (about 10 layers) from the circumference may be greatly wound down toward the external side, and thus the apparent rolling thickness may be significantly increased. In such cases, the thickness D is preferably measured while supporting such that the outermost layer does not wind down.

<$D/(N_h\times d)$ in Winding Up Step>

When the winding up step is carried out, the proportion $(D/(N_h\times d))$ of the apparent rolling thickness D of the heat-treated film with respect to an ideal rolling thickness $(N_h\times d)$ (d: thickness per layer of the film) in the case of wrapping such that the space between the layers of the film became 0 is desirably as approximate to 1 as possible. When the layers of the film completely came into close contact with each other, $(D/(N_h\times d))$ is 1; therefore, $(D/(N_h\times d))$ is not less than 1.

In the winding up step of the present invention, the winding up is preferably executed such that $1\leq(D/(N_h\times d))\leq2.5$, preferably $1\leq(D/(N_h\times d))\leq2$, and still more preferably $1\leq(D/(N_h\times d))\leq1.5$. When the proportion $(D/(N_h\times d))$ is not less than 1 and no greater than 2.5, the space between the layers of the film can be made smaller, and thus deformation of the film can be suppressed by bringing into close contact the film layers.

<Winding Up Step of Heat-Treated Film Subjected to Heat Treatment to Not Less Than 2,200° C.>

In the winding up step of the present invention, the winding up step after the film was stretched is very efficacious for obtaining a flat graphite film due to small loosening heat treatment that follows. The heat-treated film which is to be subjected to the winding up step of the present invention is preferably subjected beforehand to the heat treatment to at least not less than 2,000° C., further not less than 2,200° C., and finally not less than 2,700° C., more preferably not less than 2,800° C., and still more preferably not less than 2,900° C. In the film subjected to the heat treatment to a temperature of higher than 2,200° C., change in the dimension of the film is significant, and thus exhibits the enhanced effect of amelioration according to the method of the present invention.

<Loosening Step>

Figure 20:
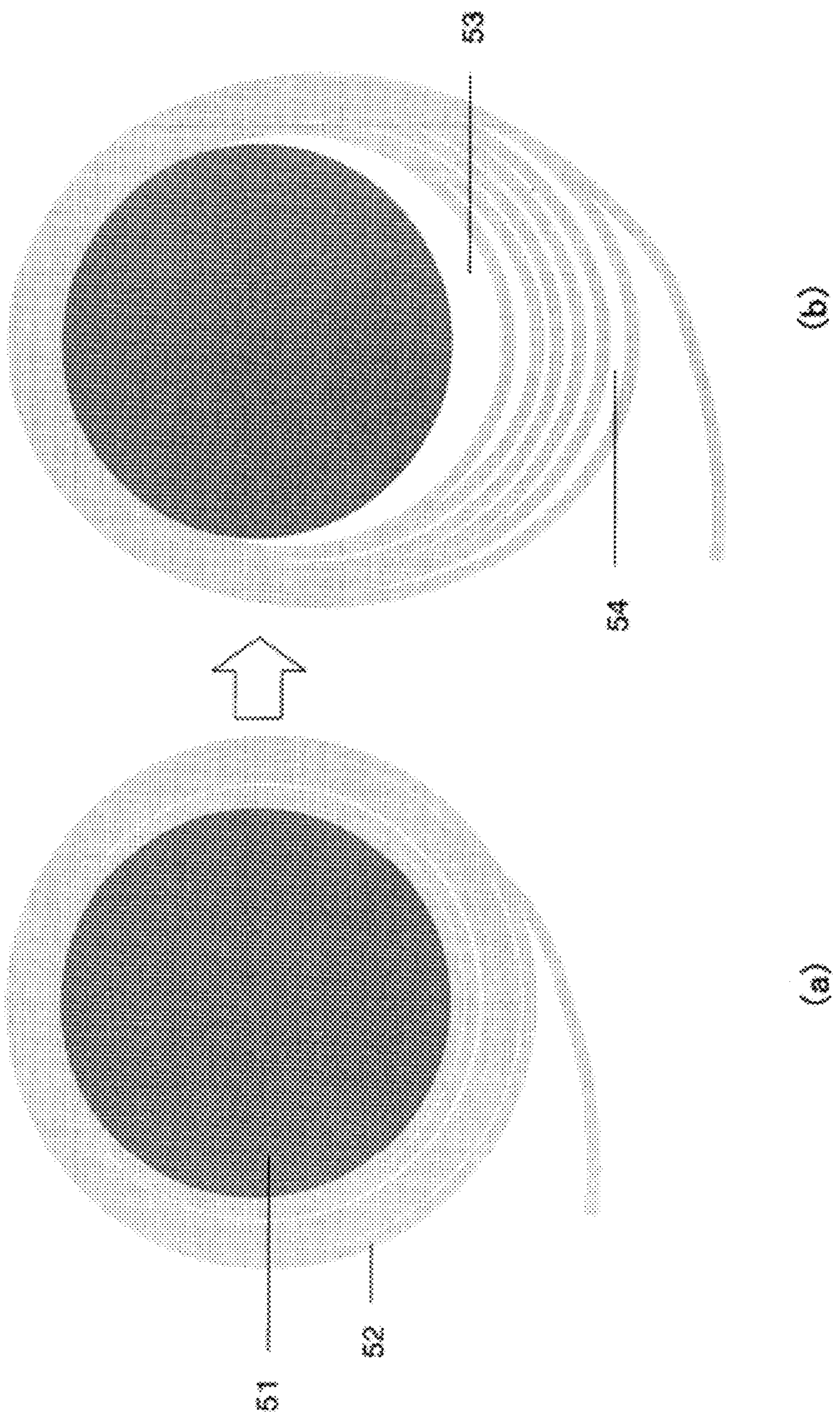
FIG. 20 shows cross sectional views for illustrating a loosening step.

The present invention preferably comprises a loosening step of loosening the heat-treated film once, prior to the winding up during the heat treatment. The loosening step of loosening the heat-treated film is, as shown in FIG. 20, to enable a space 53 to be formed between the internal core 51 and the film 52, or a space 54 to be formed between the film 52 and the film 52, after the heat treatment. Since the loosened heat-treated film can be readily subjected to the winding up step, the graphite film accompanied by ameliorated ruffling can be finally obtained.

If the polymer film wrapped around the core was not loosened at all by the heat treatment, the film may be broken due to significant shrinkage and expansion associated with the heat treatment.

The loosening step of the present invention may be carried out in the range of 1,400 to 2,900° C. in which the graphitization of the film can proceed to lead to extension of the length.

<Winding Up Step at Room Temperature>

The winding up step of the present invention may be carried out following the heat treatment, after cooling the heat-treated film to around room temperature. When the heat-treated film is cooled after the heat treatment to not greater than 300° C., preferably not greater than 200° C., and still more preferably not greater than 100° C., the operation can be easily performed.

<<Second Aspect of the Invention: Control of Spatial Distance Between the Core and the Film, and Spatial Distance Between the Layers of the Film>>

The second aspect of the present invention is characterized by controlling the spatial distance between the core and the film, and the spatial distance between the layers of the film, before and after the heat treatment. For ameliorating the ruffling, it is important to minimize the space that permits the film to be deformed during the graphitization step, and specifically, characterized by carrying out the heat treatment in a space-free state between the internal core and the film or between the layers of the film, as shown in FIG. 3. Accordingly, ruffling of the graphite film can be ameliorated.

<Before and after Heat Treatment>

The "before and after the heat treatment" of the present invention refers to before elevating the temperature, and after carrying out the heat treatment and lowering the temperature. Herein, states of the film and the internal core are often compared before and after the heat treatment, and this comparison is made between the state determined before elevating the temperature before the heat treatment, and the state determined after carrying out the heat treatment and lowering the temperature. The change of the states of the film and the internal core results only from elevation of the temperature, and does not result from any intentionally applied physical operation.

<Winding Number $N_h$ of the Carbonized Polymer Film Around the Internal Core>

The winding number $N_h$ of the carbonized film around the internal core in the present invention is not less than 10, preferably not less than 30, and more preferably not less than 50. When the winding number $N_h$ is not less than 10, a long and large-area graphite film having sufficient size can be obtained. However, as the winding number increases, production of the graphite film accompanied by ameliorated ruffling may be difficult.

Figure 5:
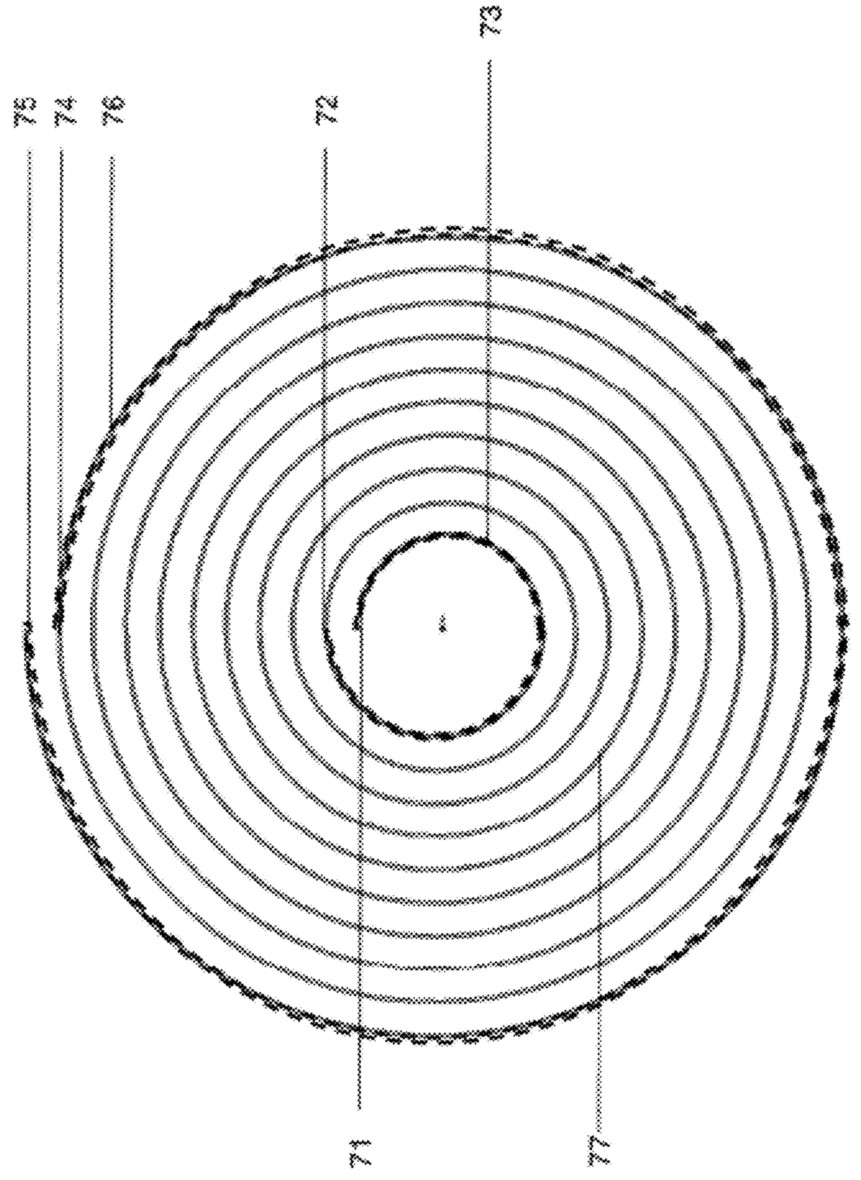
FIG. 5 shows a schematic view illustrating a film wound around an internal core.

FIG. 5 schematically shows only a part of a film in a state being wound around an internal core. FIG. 5 shows a schematic view, and in effect, a space may be present between the film layers, or the film layers may be brought into close contact. As shown in FIG. 5, the first layer 73 is defined as a region designated by a dotted line that is most approximate to the internal core (from roll start 71 to boundary 72 of the first layer 73 and the second layer). Then, layers are sequentially designated as second layer, third layer and the following layers, and the winding number to the outermost layer 76 is designated as the winding number $N_h$ of the polymer film. If the final rolling cannot be wound by 360 degree, the number is designated by one decimal place (i.e., in the case of winding by 180 degree, designated by 0.5).

<Change in ($w_0/r_0\times100$) Before and after Heat Treatment>

The graphitization step of the present invention preferably comprises a heat treatment step by which the proportion ($w_0/r_0\times100$) of the spatial distance $w_0$ between the internal core and the first layer of the heat-treated film with respect to the length of the outer periphery of the internal core $r_0$ can be maintained to be not greater than 7, preferably not greater than 5.5, and still more preferably not greater than 4 before and after the heat treatment. When the ratio ($w_0/r_0\times100$) is maintained to be not greater than 7 before and after the heat treatment according to any of the heat treatment, the space between the internal core and the first layer of the heat-treated film can be made smaller, and thus deformation of the film can be suppressed.

<Change in Spatial Distance $w_n$ Between n-th Layer and n+One-th Layer of Heat-Treated Film Before and after the Heat Treatment>

The graphitization step of the present invention preferably includes heat treatment step by which $w_n$ can be maintained to be not greater than 5 mm, preferably not greater than 4 mm, and still more preferably not greater than 3 mm before and after the heat treatment. When the spatial distance can be maintained to be not greater than 5 mm, the space between the layers of the heat-treated film can be made smaller, and thus deformation of the film can be suppressed.

Similarly to the foregoing, provided that the winding number of the heat-treated film is defined as $N_h$, when the distance $w_n$ satisfies the above requirements in $N_h\times0.5$ or more spaces between the layers of the heat-treated film, such states is included in the scope of the present invention.

<Roll Length $r_1$ of First Layer of Heat-Treated Film>

The roll length $r_1$ of the first layer of the heat-treated film in the present invention is, as shown in FIG. 5 by Reference Symbol 73, a region designated by a dotted line that is closer to the internal core (from roll start 71 to boundary 72 of the first layer 73 and the second layer).

<Change in ($(r_{n+1}-r_n)/r_n\times100$) Before and after the Heat Treatment>

In the present invention, ($(r_{n+1}-r_n)/r_n\times100$) represents a proportion of the difference ($r_{n+1}-r_n$) of the roll lengths of n+one-th layer and the n-th layer of the heat-treated film with respect to the roll length $r_n$ of the n-th layer of the heat-treated film. Therefore, since greater ($(r_{n+1}-r_n)/r_n\times100$) means a greater space between the n+one-th layer and the n-th layer of the heat-treated film, ($(r_{n+1}-r_n)/r_n\times100$) is preferably as small as possible. Wherein, n is 0 or a nonnegative integer, and $r_0$ represents the length of the outer periphery of the internal core. When the layers of the film completely came into close contact with each other, ($(r_{n+1}-r_n)/r_n\times100$) is 0; therefore ($(r_{n+1}-r_n)/r_n\times100$) is not less than 0.

The graphitization step of the present invention preferably comprises heat treatment step by which ($(r_{n+1}-r_n)/r_n\times100$) can be maintained to be not greater than 8, preferably not greater than 6, and still more preferably not greater than 4 before and after the heat treatment. When the proportion ($(r_{n+1}-r_n)/r_n\times100$) can be maintained to be not greater than 8 before and after the heat treatment according to any of the heat treatment, the spaces between the internal core and the first layer, and the n+one-th layer and the n-th layer of the heat-treated film can be made smaller, and thus deformation of the film can be suppressed. Accordingly, obtaining a graphite film associated with less ruffling is enabled. In this regard, since the outer periphery of the internal core $r_0$ (n=0) does not vary by heat, the distance between the internal core and the first layer of the film increases by heat as compared with the distance between the layers of the film. Therefore, the value ($(r_1-r_0)/r_0\times100$) when n is 0 in particular, is preferably smaller than the value when n is not 0.

<Change in $D/(N_h\times d)$ Before and after the Heat Treatment>

Also in the graphitization step of the present invention, before and after the heat treatment, the proportion ($D/(N_h\times d)$) of the apparent rolling thickness D of the heat-treated film to an ideal rolling thickness ($N_h\times d$) in the case of wrapping such that the space between the layers of the film became 0 is preferably maintained to fall within the range of $1\le D/(N_h\times d)$ 2.5, preferably $1\le D/(N_h\times d)\le2$, and still more preferably $1\le D/(N_h\times d)\le1.5$. When the range of $1\le D/(N_h\times d)\le2.5$ can be maintained before and after the heat treatment according to any of the heat treatment, the space between the layers of the film can be made smaller, and thus deformation of the film can be suppressed by bringing into close contact the film layers.

In any of the heat treatment step carried out while maintaining ($w_0/r_0\times100$) to be not greater than 7, the heat treatment step carried out while maintaining $w_n$ to be not greater than 5 mm, the heat treatment step carried out while maintaining to be ($(r_{n+1}-r_n)/r_n\times100$) to be not greater than 8, and the heat treatment step carried out while maintaining the range of $1\le D/(N_h\times d)\le2.5$ described in the foregoing, the highest temperature required is desirably at least not less than 2,000° C., further not less than 2,200° C. and finally not less than 2,700° C., preferably not less than 2,800° C., and still more preferably not less than 2,900° C. Since the process of the heat treatment at a temperature of not less than 2,700° C. determines amelioration of the ruffling of the graphite film, the heat treatment to not less than 2,700° C. in a space-free state is very efficacious.

<<Third Aspect of the Invention: Comprising Heat Treatment Step to Increase Apparent Cross Sectional Area of the Internal Core after Heat Treatment as Compared with that Before the Treatment>>

The third aspect of the present invention is characterized by comprising a heat treatment step to increase an apparent cross sectional area of the internal core by not less than 7% after the heat treatment as compared with that before the treatment.

<Change in the Cross Sectional Area of Internal Core Before and after the Heat Treatment>

The cross sectional area of the internal core in the present invention is, as shown in FIG. 6, an area of the cross section 82 given by cutting perpendicularly to a length direction of the internal core. When the internal core has varying thickness, and thus the cross sectional area is not constant, the cross sectional area is that at the midpoint of the internal core.

Figure 11:
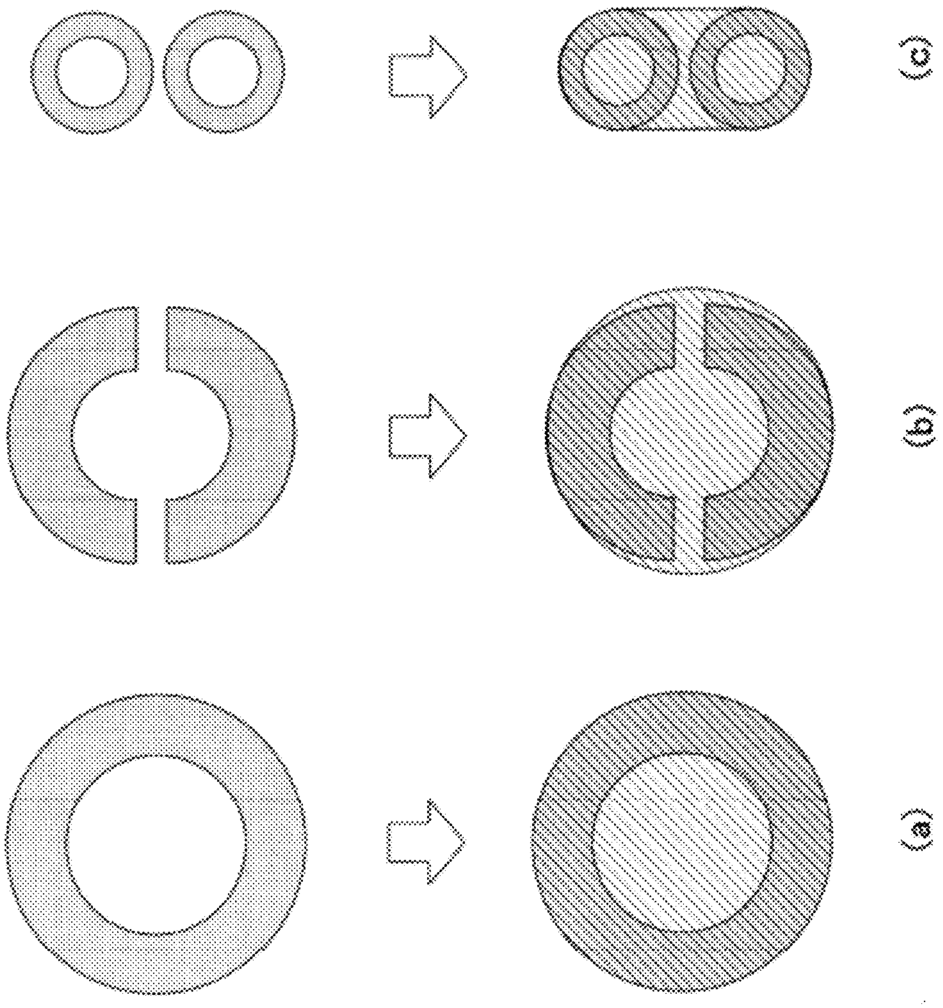
FIG. 11 shows (a) to (c) cross sectional views for illustrating the apparent cross sectional area of the internal core.

Also, in the case of the internal core which is not completely solid, provided that a completely flat virtual graphite film is tightly wrapped around an internal core, the apparent cross sectional area is made a cross sectional area at a region inside the virtual graphite film. For example, when the internal core is a cylinder from which the center area is hollow out, the cross section will have a doughnut shape as shown in FIG. 11 (*a*). In such case, the apparent cross sectional area is defined to also include the space portion. In addition, in case where the internal core is separated into two or more lengthwise split members as shown in FIG. 11 (*b*), or also in case where two or more internal cores are used as shown in FIG. 11 (*c*), the apparent cross sectional area is made hatched area as shown in FIGS. 11 (*a*) to (*c*) at the bottom, including each space portion.

The length of the heat-treated film increases with graphitization; therefore, even if the film is tightly wrapped around the internal core before the heat treatment, the film gradually takes apart from the internal core during the heat treatment. Accordingly, the space between the film and the internal core formed during this treatment causes the occurrence of ruffling.

Therefore, the graphitization step of the present invention preferably comprises a heat treatment step to increase the apparent cross sectional area of the internal core by not less than 7%, preferably not less than 10%, and still more preferably not less than 12% after the heat treatment as compared with that before the treatment. Increase in the apparent cross sectional area of the internal core to follow the increase in the size of the heat-treated film is preferred since the space between the internal core and the heat-treated film cannot be formed. When the apparent cross sectional area of the internal core is increased by not less than 7% after the heat treatment as compared with that before the treatment according to any of the heat treatment, filling in the space between the film and the internal core is enabled, and thus ruffling of the graphite film is ameliorated.

The highest temperature required for increasing the internal core by not less than 7% in the heat treatment step is not less than 2,200° C., preferably not less than 2,400° C., and still more preferably not less than 2,700° C. Along with the heat treatment at a temperature of not less than 2,200° C., the size of the heat-treated film significantly increases, and significant increase in the apparent cross sectional area of the internal core during this event is very efficacious.

<Procedure for Increasing Apparent Cross Sectional Area of the Internal Core>

Figure 12:
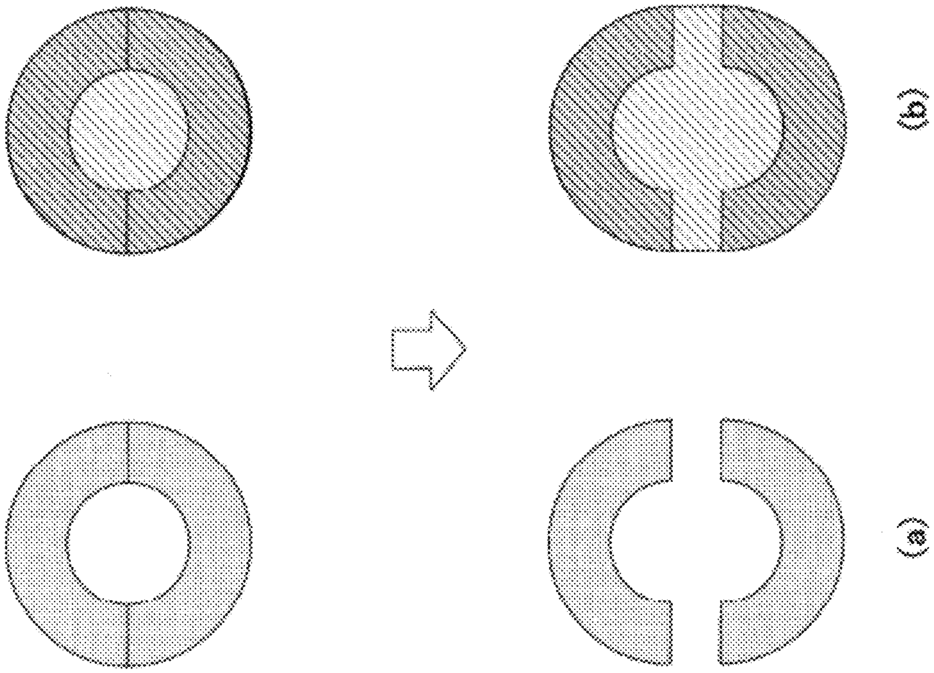
FIG. 12 shows cross sectional views for illustrating increase in the cross sectional area with a split internal core.
Figure 13:
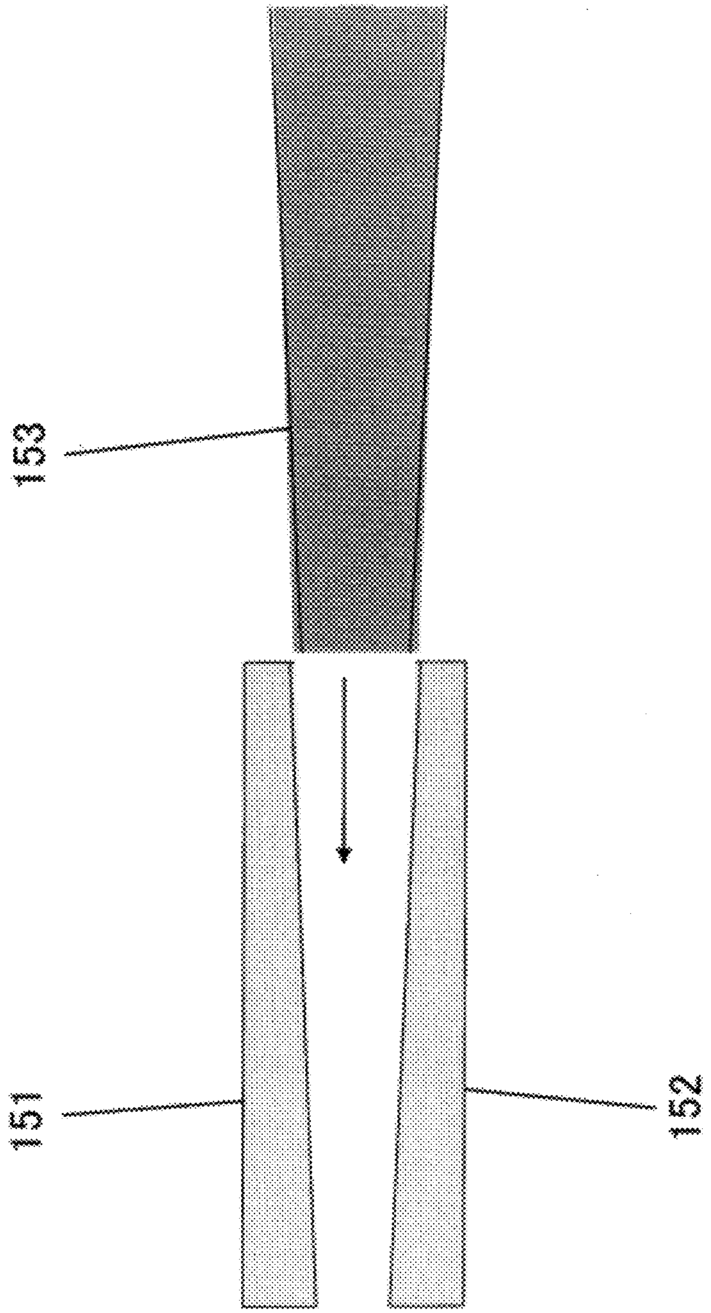
FIG. 13 shows a schematic view for illustrating a method of separating the split internal core.

Although the procedure for increasing the apparent cross sectional area of the internal core in the present invention is not particularly limited, the cross sectional area can be increased so far as the internal core is constituted with two or more lengthwise split members made of graphite. In one example, a procedure in which the cross sectional area is increased by constituting with two lengthwise split members which had been divided as shown in the top of FIG. 12 (*a*), and separating these lengthwise split members may be exemplified. Also the method for separating the lengthwise split members provided by dividing into two portions is not particularly limit, and for example, as shown in FIG. 13, a method in which a tapered stick is pressed into the space between two lengthwise split members from outside the furnace, or a method for separation with gas pressure may be exemplified. Wherein, the number of split of the internal core is not particularly limited, and the internal core may be constituted with two or more lengthwise split members.

In addition, a method for producing an internal core using a material that leads to increase in the size by a heat treatment may be also exemplified. In one example, when the internal core is produced with a carbonized polymer film used as a raw material of the graphite film in the present invention, the cross sectional area is increased by not less than 7% with the heat treatment, whereby a graphite film accompanied by ameliorated ruffling can be produced.

<Method for Increasing Cross Sectional Area to Follow Loosening of the Heat-Treated Film from the Internal Core>

When the apparent cross sectional area of the internal core is increased to follow the loosening of the heat-treated film from the internal core in the graphitization step of the present invention, a graphite film accompanied by significantly ameliorated ruffling can be obtained. When the cross sectional area is significantly increased by loosening of the heat-treated film from the internal core, the film may be broken. To the contrary, when the cross sectional area is only slightly increased by the loosening of the heat-treated film from the internal core, deformation of the film fails, and thus a graphite film accompanied by significant ruffling may be formed.

Figure 14:
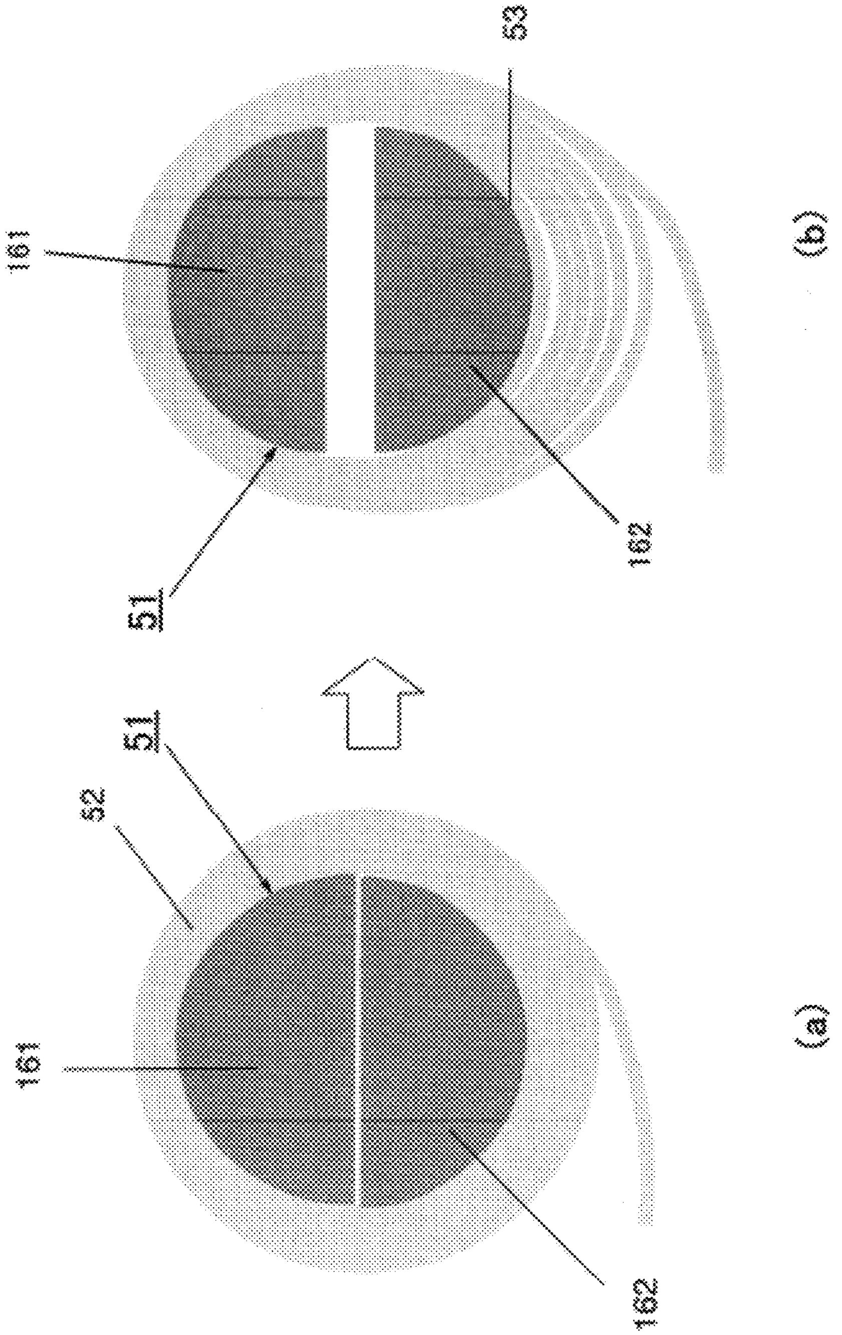
FIG. 14 shows cross sectional views for illustrating a method of enlarging the internal core so as to follow the extension of the film.
Figure 25:
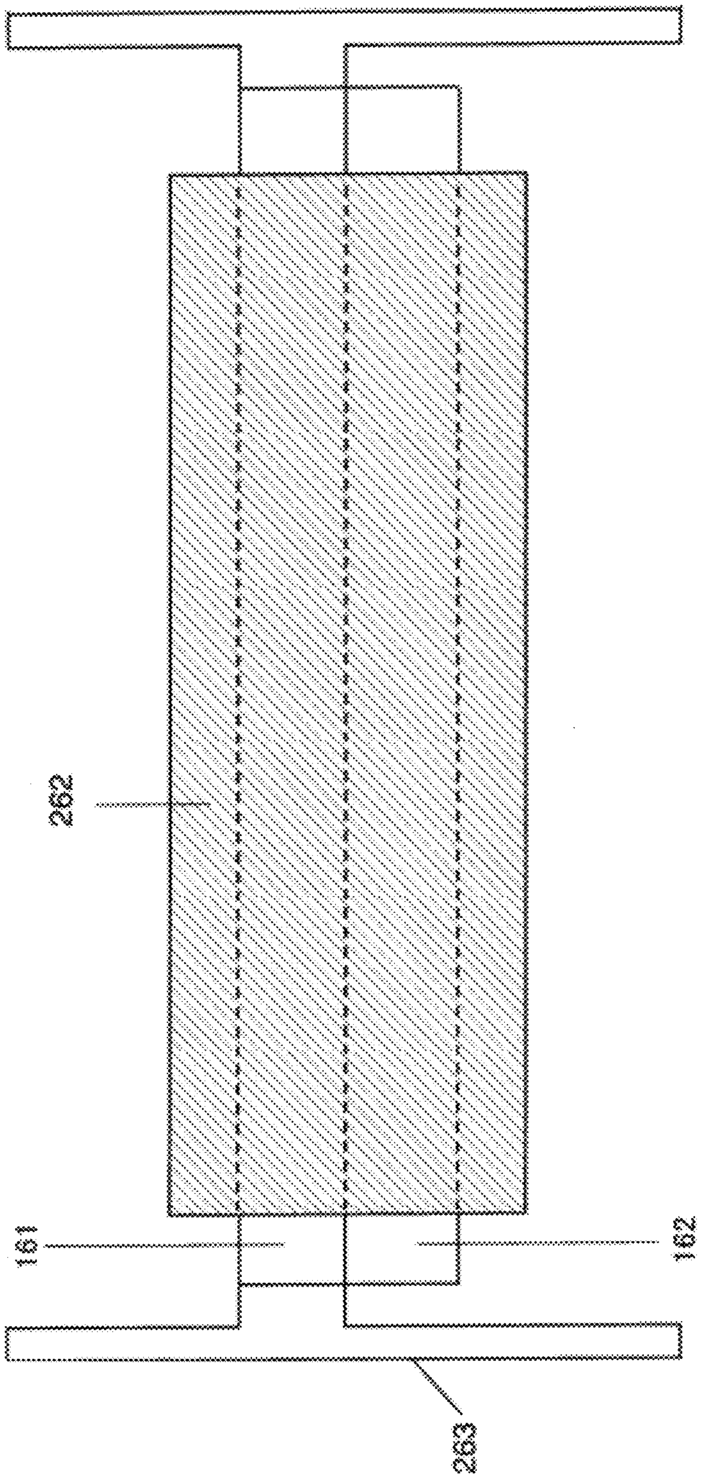
FIG. 25 shows a lateral view for illustrating a method of using an internal core composed of two lengthwise split members.

Therefore, a method in which the cross sectional area of the internal core is increased to follow the loosening of the heat-treated film from the core is a procedure capable of most efficiently ameliorating ruffling. As one example, the following method may be referred to. First, as shown in FIG. 14 (*a*), the carbonized film is tightly wrapped around the internal core consisting of two lengthwise split members. Next, as shown in FIG. 25, one lengthwise split member 161 is fixed, whereas another lengthwise split member 162 is made free (in fact, being fixed by the film), and then set such that the free lengthwise split member 162 is positioned at the bottom. When the size of the heat-treated film increases as the heat treatment proceeds, as shown in FIG. 14 (*b*), the lengthwise split member 162 is released from the constraint by the film and moves according to the own weight, whereby the apparent cross sectional area of the internal core is increased. Use of such a procedure enables, a graphite film accompanied by significantly ameliorated ruffling to be obtained.

Although the number of division of the internal core is not particularly limited, the constitution with two or more lengthwise split members is preferred and is acceptable as long as at least one of the two or more lengthwise split members is fixed, and is not moved by not less than 2 mm, preferably not less than 1.5 mm, and still more preferably not less than 1 mm after the heat treatment as compared with the position before the treatment. When it is moved by not less than 2 mm, efficient increase in the cross sectional area fails, and thus a graphite film accompanied by ruffling may be formed. Also, it is preferred that at least one lengthwise split member is constrained by the film wrapped therearound, and another lengthwise split member is free and moves by not less than 5 mm, preferably not less than 7 mm, and still more preferably not less than 10 mm after the heat treatment as compared with the position before the treatment. When another lengthwise split member moves by not less than 5 mm, the apparent cross sectional area of the internal core can be efficiently increased, and the space between the core and the film can be made smaller.

<Change in ($w_0/r_0\times100$) with Increase in the Cross Sectional Area Before and after the Heat Treatment>

As the cross sectional area increases as described above, the proportion ($w_0/r_0\times100$) of the spatial distance between the internal core and the first layer of the heat-treated film, with respect to the length of the outer periphery of the internal core as described above is also changed.

In this step, it is desired that the state in which ($w_0/r_0\times100$) is maintained to be not greater than 7, preferably not greater than 5.5, and still more preferably not greater than 4 before and after the heat treatment. When the apparent cross sectional area of the internal core is increased by not less than 7%, and ($w_0/r_0\times100$) can be maintained to be not greater than 7 before and after the heat treatment, the space between the internal core and the first layer of the heat-treated film becomes small, and thus a graphite film accompanied by ameliorated ruffling can be obtained.

<Change in $((r_1-r_0)/r_0\times100)$ with Increase in Cross Sectional Area Before and after the Heat Treatment>

As the cross sectional area increases, the proportion $((r_1-r_0)/r_0\times100)$ of the difference between the roll lengths of the first layer of the heat-treated film and the length of the outer periphery of the internal core with respect to the length of the outer periphery of the internal core is also changed.

In the heat treatment step that increases by not less than 7% the apparent cross sectional area of the internal core in the present invention, it is preferred that the state in which $((r_1-r_0)/r_0\times100)$ is maintained to be not greater than 8, preferably not greater than 6, and still more preferably not greater than 4 before and after the heat treatment. When the apparent cross sectional area of the internal core is increased by not less than 7%, and $((r_1-r_0)/r_0\times100)$ can be maintained to be not greater than 8 before and after the heat treatment, the space between the internal core and the first layer of the heat-treated film can be made smaller, and thus a graphite film accompanied by ameliorated ruffling can be obtained.

<<Fourth Aspect of the Invention: the Rate of Decrease of the Winding Number of Heat-Treated Film being not Greater than 3% after Heat Treatment as Compared with that Before the Treatment>>

The fourth aspect of the present invention is characterized by comprising a heat treatment step by which the rate of decrease of the winding number of a heat-treated film becomes not greater than 3% after the heat treatment as compared with that before the heat treatment.

<Rate of Decrease of the Winding Number $N_h$ of Heat-Treated Film after the Heat Treatment as Compared with that Before the Heat Treatment>

In the graphitization step, the film is moved due to change in the dimension of the film. In this process, a space is formed between the film and the internal core, and/or between the film layer and the film layer, and this becomes a causative of occurrence of ruffling. In addition, even if the film is tightly wrapped in the graphitization process before the heat treatment, between the space is formed between the layers of the film during the heat treatment (FIG. 3). When the space is formed between the layers of the film and results in deterioration of the close contact between the layers of the film and may increase the possibility of deformation of the film. Furthermore, variation of heat history in a longitudinal direction and a width direction of the film is caused, leading to occurrence of ruffling. The reason for formation of the space between the layers of the film is unwinding of the heat-treated film while rotation, just as if unwinding of intimately wound calendar, due to generation of the cracked gas in the process of the heat treatment, as shown by an arrow in FIG. 15 (*a*). When the heat-treated film is unwound, winding number $N_h$ of the heat-treated film decreases. The rate of decrease of the winding number of the heat-treated film in this procedure is defined as $((N_{hbf}-N_{haf})/N_{hbf}\times100)$ provided that the winding number before the heat treatment is $N_{hbf}$, and the winding number after the heat treatment is $N_{haf}$.

The graphitization step of the present invention preferably comprises a heat treatment step by which the rate of decrease of the winding number $N_h$ of a heat-treated film becomes not greater than 3%, preferably not greater than 2%, and still more preferably, not greater than 1%, after the heat treatment as compared with that before the heat treatment. In any of the heat treatment, if the rate of decrease of the winding number $N_h$ of a heat-treated film is not greater than 3% after the heat treatment as compared with that before the heat treatment, the space between the layers of the film can be made smaller, and the space between the layers of the heat-treated film can make also smaller. Thus, deformation of the film can be suppressed, and the graphite film associated with less ruffling can be obtained.

In the heat treatment step by which the rate of decrease of the winding number $N_h$ of a heat-treated film of not greater than 3% is achieved, the highest temperature required is at least not less than 2,200° C., preferably not less than 2,400° C., and still more preferably not less than 2,700° C. The heat-treated film is unwound with the heat treatment at a temperature of not less than 2,200° C., and therefore suppression of the decrease of the winding number in this temperature range is very efficacious.

<Method that Prevents Change of Winding Number $N_h$ of the Heat-Treated Film>

Figure 15:
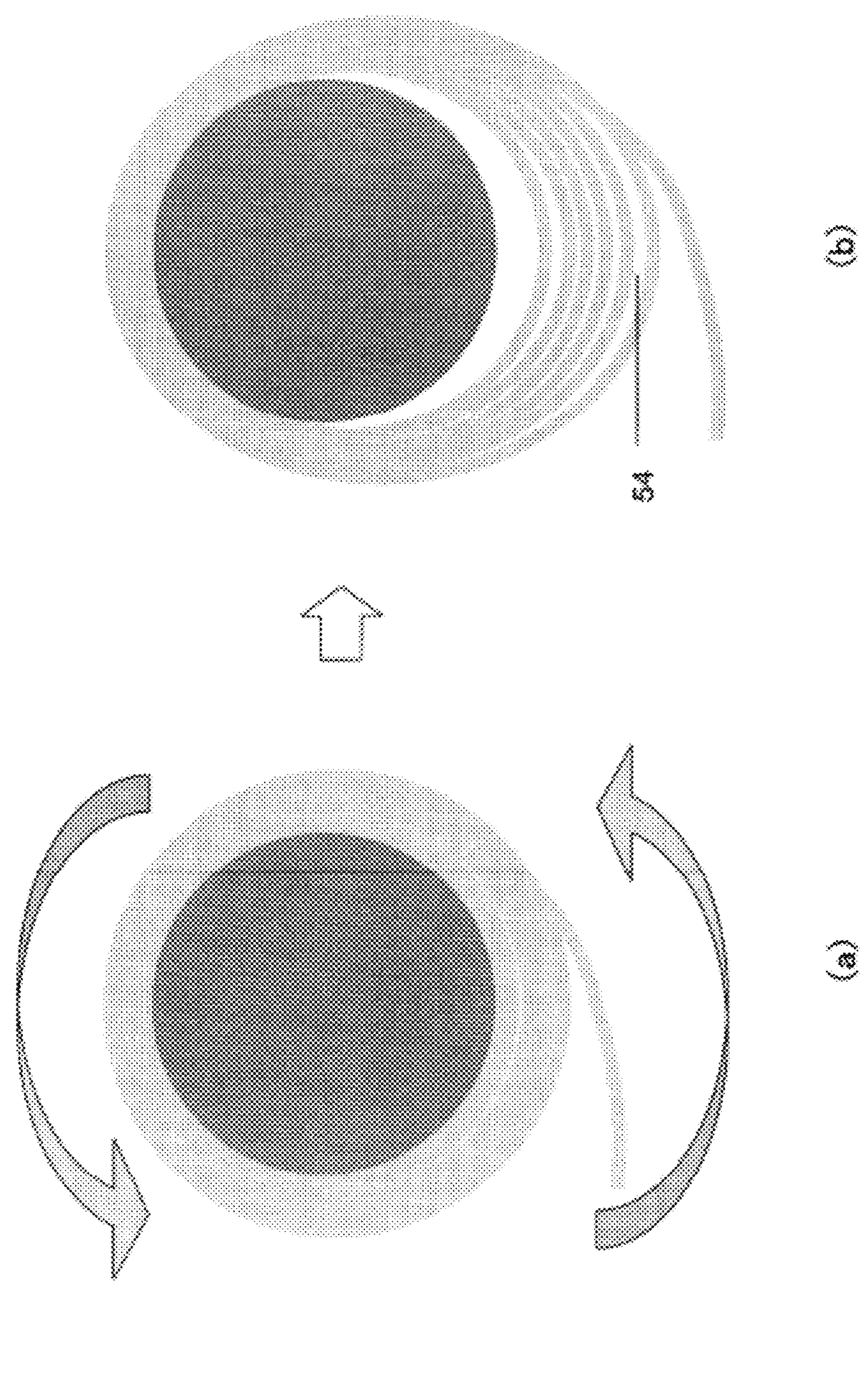
FIG. 15 shows cross sectional views for illustrating unwinding by rotation of the heat-treated film.

Although the method that prevents decrease of the winding number $N_h$ of the heat-treated film in the present invention is not particularly limited, decrease of the winding number occurs by unwinding while rotating around the core from the outermost layer of the film as shown in FIG. 15; therefore, fixation that renders the outermost layer unmovable enables formation of the space between the layers of the film to be prevented. Therefore, by fixing at least a part of the outermost layer, a graphite film accompanied by ameliorated ruffling can be obtained.

In one example, loosening of the film can be suppressed by carrying out the heat treatment while applying a pressure to at least a part of the outermost layer of the heat-treated film in a thickness direction of the film. The site to which the pressure is applied may be any place on the outermost layer of the film. FIGS. 16 (*a*) to (*c*) and (*e*) show examples.

Of these, in particular, when the pressure is applied to any point of the film in the form of a roll on its lateral face to upper surface (FIGS. 16 (*b*) and (*c*)), a graphite film accompanied by particularly ameliorated ruffling can be obtained. Application of the pressure to the upper surface (FIG. 16 (*c*)) is more preferred than application thereof to the inferior face (FIG. 16 (*e*)), since extension of the film is less likely to be interfered.

The pressure applied to the film is not less than 0.2 g/cm$^2$ and not greater than 500 g/cm$^2$, preferably not less than 0.5 g/cm$^2$ and not greater than 300 g/cm$^2$, and still more preferably not less than 1.0 g/cm$^2$ and not greater than 200 g/cm$^2$. When the pressure is greater than 0.2 g/cm$^2$, fixation of the film is enabled, and the loosening can be suppressed. Whereas, when the pressure is less than 500 g/cm$^2$, fixation without occurrence of breaking of the film is enabled.

Although the method of applying the pressure is not also particularly limited, the following method may be employed. There are a method in which a weight is placed on one outermost layer of the film (FIG. 16 (*a*)), or a method in which a weight is applied to the entirety of the film (FIG. 16 (*c*)). Additionally, a method in which the heat treatment is carried out while the vessel around which the film is wound is pressed against a side wall (FIG. 16 (*b*)) may be included, and the pressure can be applied by the own weight even if the vessel is placed as it is (FIG. 16 (*e*)). Furthermore, an opening is formed through the film, and may be fixed with a bolt (FIG. 16 (*d*)). The method in which a weight is placed on one outermost layer of the film is preferred due to simplicity. The method in which a weight is applied to the entirety of the film is more preferred since the film is less likely to be broken, and thus a long and large-area graphite film can be stably obtained. Also, when a weight is applied to a film, the effect can be enhanced by using a weight having a curved face so as to fit the curved face of the film in the form of a roll.

<Change in Spatial Distance $w_n$ Between n-th Layer and n+one-th Layer of Heat-Treated Film Before and after the Heat Treatment with Regulated Rate of Decrease of the Winding Number $N_h$>

Also, in case where the rate of decrease of the winding number $N_h$ is regulated as described above, the space between film layers is preferably as small as possible. When the spaces of the heat-treated film between the n-th layer and the n−one th layer, inside by one layer, and between the n-th layer and the n+one-th layer, external side by one layer, with the number being counted from the most approximate side to the internal core, are as small as possible, deformation of the film of the n-th layer can be suppressed by sandwiching between the n−one th layer and the n+one-th layer in a similar manner to that described above, and thus a graphite film accompanied by ameliorated ruffling can be obtained.

More specifically, in the heat treatment step in which the rate of decrease of the winding number $N_h$ of the present invention is regulated, it is preferred that the heat-treated film linear distance $w_n$ between the n-th layer and the n+one-th layer is maintained to be not greater than 5 mm, preferably not greater than 4 mm, and still more preferably not greater than 3 mm before and after the heat treatment. When the spatial distance can be maintained to be not greater than 5 mm before and after the heat treatment by regulating the rate of decrease of the winding number $N_h$, the space between the layers of the heat-treated film can be made smaller, and thus ruffling of the graphite film can be ameliorated.

When the winding number of the heat-treated film is defined as $N_h$ in a similar manner to that described above, for example, about the tenth film layer from the outermost layer may be greatly wound down toward the external side; however, such states is also included in the scope of the present invention, as long as the distance $w_n$ of the spaces between the layers of the heat-treated film of $N_h \times 0.5$ or more satisfies the above requirements.

<Change in $((r_{n+1}-r_n)/r_n \times 100)$ Before and after the Heat Treatment Under Regulation of Rate of Decrease of the Winding Number $N_h$>

As described above, when the rate of decrease of the winding number $N_h$ is regulated, the space of the film layers is preferably as small as possible. Wherein, n is 0 or a nonnegative integer, and $r_0$ represents the length of the outer periphery of the internal core. Since greater proportion $((r_{n+1}-r_n)/r_n \times 100)$ of the difference between the roll lengths of the heat-treated film of the n+one-th layer and the n-th layer, with respect to the roll length of the n-th layer of the heat-treated film means that the space between the n+one-th layer and the n-th layer of the heat-treated film is greater, the proportion $((r_{n+1}-r_n)/r_n \times 100)$ is preferably as small as possible.

More specifically, according to the heat treatment step in which the rate of decrease of the winding number $N_h$ of the present invention is regulated, it is desired to maintain the proportion $((r_{n+1}-r_n)/r_n \times 100))$ to be not greater than 8, preferably not greater than 6, and still more preferably not greater than 4 before and after the heat treatment. Even if the rate of decrease of the winding number $N_h$ is regulated, when the proportion $((r_{n+1}-r_n)/r_n \times 100)$ can be maintained to be not greater than 8 before and after the heat treatment, the spaces between the internal core and the first layer, and between the n+one-th layer and the n-th layer of the heat-treated film can be made small, and thus deformation of the film can be suppressed. Accordingly, obtaining a graphite film associated with less ruffling is enabled. Wherein, since the outer periphery (n=0) of the internal core $r_0$ is not changed by heat, the distance between the internal core and the first layer of the film becomes greater by heat as compared with the distance between the film layers. Therefore, the value $((r_1-r_0)/r_0 \times 100)$ particularly when n is 0 is preferably smaller than the value when n is not 0.

<Change in $(D/(N_h \times d))$ Before and after the Heat Treatment Under Regulation of Rate of Decrease of the Winding Number $N_h$>

As described above, under regulation of the rate of decrease of the winding number $N_h$, the spaces between film layers are preferably as small as possible, and a greater proportion $(D/(N_h \times d))$ of the apparent rolling thickness of the heat-treated film with respect to an ideal rolling thickness in the case of wrapping such that the space between the layers of the film became 0 means greater space between the layers of the film present; therefore, $(D/(N_h \times d))$ is preferably as approximate to 1 as possible.

In the heat treatment step the present invention under regulation of the rate of decrease of the winding number $N_h$, it is preferred to maintain to fall within the range of $1 \le D/(N_h \times d) \le 2.5$, preferably $1 \le D/(N_h \times d) \le 2$, and still more preferably $1 \le D/(N_h \times d) \le 1.5$ before and after the heat treatment according to the heat treatment step. When the range of $1 \le D/(N_h \times d) \le 2.5$ can be maintained before and after the heat treatment by regulating the rate of decrease of the winding number $N_h$, the space between the layers of the film can be made smaller, and thus deformation of the film can be suppressed via close contact between the layers of the film.

<Combination of the Fourth Aspect of the Invention and the Third Aspect of the Invention>

Combination of the method according to the fourth aspect of the present invention with the third aspect of the present invention makes the space between the core and the film, and the space between the layers of the film smaller, thereby allowing the layers of the film to be adhered. Accordingly, deformation of the film can be suppressed.

<<Fifth Aspect of the Invention: Graphite Film Accompanied by Ameliorated Ruffling (Camber and Sag)>>

The fifth aspect of the present invention is a graphite film obtained by carrying out graphitization using a heat-treated film as a carbonized polyimide film, in a state being wound to give a roll form, and the film is characterized in that: the number of double folds until the test piece is broken in an MIT folding endurance test is not less than 5,000; the thermal diffusivity in a planar direction is not less than $5.0 \times 10^{-4}$ $m^2/s$; the thickness is not less than 7 μm and not greater than 120 μm; the width $U_{gs}$ is not less than 100 mm; the area is not less than 5 $m^2$; and further, the camber $R_{gs}$ is not greater than 35 mm, and the sag $Z_{gs}$ is not greater than 80 mm, as determined by a method of film windability evaluation in accordance with JIS C2151 with a load against the graphite film of 20 g/cm.

<Ratio $W_{gs}/T_{pi}$ of Weight per Unit Area $W_{gs}$ of Graphite Film, with Respect to Thickness $T_{pi}$ of Polyimide Film Before Carbonization>

It has been known so far that thermophysical properties and electric characteristics of a graphite film can be improved by allowing a graphite film layer to grow in a planar direction. The present inventors thoroughly investigated in order to produce a large-area film, and consequently elucidated that there is a relationship between crystallinity in a micro region of graphite, with the degree of ruffling of the graphite film. In other words, if individual graphite crystals in a graphite film can be grown sufficiently in a planar direction, the degree of graphitization at each point on the film becomes constant, leading to reduction of distortion. As a result, ruffling of the film can be ameliorated.

Also, when the film has a low weight per unit area $W_{gs}$, growth of the film in a planar direction may be promoted. The weight per unit area $W_{gs}$ of a film varies depending on the conditions of heat treatments such as a carbonization treatment and a graphitization treatment. If the graphite layer can be highly orientated to the planar direction by way of the heat treatment conditions, the weight per unit area can be lowered since the size increases along the planar direction. On the other hand, if the graphite layer fails to grow in a planar direction, the weight per unit area becomes higher. Therefore, lower $W_{gs}$ means that the graphite layer has greatly grown in the planar direction, and this can be a marker of amelioration of ruffling.

Various conditions for allowing this graphite layer to grow on a planar direction are involved such as the rate of temperature rise, the highest temperature heat treatment, the pressure applied in a thickness direction of the film during the heat treatment, and the like. Optimum conditions may vary depending also on the thickness of the polyimide film as a material, and thus if a graphite film is produced such that a $W_{gs}/T_{pi}$ value falls within the range described below, a film accompanied by ameliorated ruffling can be obtained.

The ratio $W_{gs}/T_{pi}$ of the weight per unit area $W_{gs}$ of the graphite film of the present invention with respect to the thickness $T_{pi}$ of a polyimide film before carbonization is not greater than 0.99 g/μm, preferably not greater than 0.96 g/μm, and still more preferably not greater than 0.93 g/μm. By carrying out the heat treatment such that the ratio $W_{gs}/T_{pi}$ becomes not greater than 0.99 g/μm, a graphite film accompanied by ameliorated ruffling can be produced. In particular, the ratio can be more likely to be controlled to fall within the above range when a polyimide film is used as the polymer film, and further when the birefringence is adjusted to be not less than 0.08 and a polyimide film obtained by a chemical curing method which includes permitting imide inversion using a polyamic acid that is a precursor, a dehydrating agent and an amine in combination.

<Ratio $S_{gs}/S_{pi}$ of Area $S_{pi}$ of Polymer Film with Respect to the Area of the Graphite Film $S_{gs}$ Obtained>

It was revealed that for ameliorating the ruffling of the graphite film, there exists an optimal range of the ratio $S_{gs}/S_{pi}$ of the area $S_{pi}$ of the polymer film before carbonization, with respect to the area $S_{gs}$ of the obtained graphite film.

Various conditions for accelerating growth of this graphite layer in a planar direction are involved such as the rate of temperature rise, the highest temperature heat treatment, the pressure applied in a thickness direction of the film during the heat treatment, and the like. Optimum conditions may vary depending also on the size of the polyimide film as a raw material; however, by adjusting the ratio $S_{gs}/S_{pi}$ to fall within the range described below, growth on the planar direction is promoted, whereby a long and large-area graphite film accompanied by ameliorated ruffling that is superior in thermal diffusivity, thermal conductivity and flexibility can be obtained.

The ratio $S_{gs}/S_{pi}$ of the area $S_{pi}$ of the polymer film before carbonization of the present invention to the area $S_{gs}$ of the obtained graphite film is not less than 0.79 and not greater than 0.83, preferably not less than 0.795 and not greater than 0.825, and still more preferably not less than 0.80 and not greater than 0.82. When the ratio $S_{gs}/S_{pi}$ is greater than 0.79, ruffling of the graphite film is ameliorated. On the other hand, also when the ratio $S_{gs}/S_{pi}$ is less than 0.83, the graphite film exhibits ameliorated thermal conductivity, thermal diffusivity, and flexibility. By regulating the ratio to fall within this range, a long and large-area graphite film accompanied by ameliorated ruffling that is superior in thermal diffusivity, thermal conductivity and flexibility can be obtained. In particular, the ratio $S_{gs}/S_{pi}$ can be more likely to be controlled to fall within the above range when a polyimide film is used as the polymer film, and further when the film has a birefringence of not less than 0.08 and a polyimide film obtained by a chemical curing method which includes permitting imide inversion using a polyamic acid that is a precursor, a dehydrating agent and an amine in combination.

<Thickness of the Polymer Film and Graphite Film>

The graphite film of the present invention has a thickness of not less than 3 μm and not greater than 250 μm, not less than 7 μm and not greater than 120 μm, preferably not less than 9 μm and not greater than 80 μm, and more preferably, not less than 20 μm and not greater than 50 μm. When the graphite film has a thickness of not less than 3 μm, sufficient film strength can be achieved. Whereas, when the thickness is not greater than 250 μm, sufficient bending strength can be achieved.

<Width $U_{gs}$ of Graphite Film>

Although the width $U_{gs}$ of the graphite film obtained according to the present invention is not particularly limited, in light of an object of the present invention to produce a long and large-area graphite film, the width $U_{gs}$ is not less than 100 mm, preferably not less than 150 mm, and still more preferably not less than 200 mm. When the width is not less than 100 mm, favorable processibility of the graphite film can be achieved, and a graphite film suited for use with a large area is obtained.

<Area of Polymer Film, Carbonized Film and Graphite Film>

Although the area of the graphite film obtained according to the present invention is not particularly limited, in light of the object of the present invention to produce a long and large-area graphite film, the area is not less than 5 $m^2$, preferably not less than 10 $m^2$, and still more preferably not less than 20 $m^2$. The graphite film having an area of not less than 5 $m^2$, exhibits favorable processibility, and is suited for use with a large area.

<Flex Resistance of Graphite Film>

In the MIT folding endurance test described later, the number of double folds until a strip test piece having a width of 15 mm is broken may be not less than 5,000, preferably not less than 10,000, and still more preferably not less than 50,000. The number of double folds of not less than 5,000 indicates superior flex resistance; therefore, resistance to breakage can be achieved even if actually used in a bent portion. Specifically, also in the case of use in foldable portions of small electronic instruments and hinges of mobile phones, it can be used without deteriorating its functions. Furthermore, owing to superior flex resistance, handlability in mounting to electronic instruments, and the like can be also improved. Additionally, in the case of large-area graphite films, handlability may be inferior since they are very easily broken; however, flex resistance of not less than 5,000 is preferred due to resistance to breakage. Favorable flex resistance results in resistance to breakage at film bent portions during use, and further results in excellent handlability in manipulation. In particular, also in the case that a large bending angle or a small bend radius is employed, the film is less likely to be deteriorated.

<Thermal Diffisicity in Planar Direction>

The thermal diffusivity in a planar direction of the graphite film of the present invention is not less than $5.0\times10^{-4}$ $m^2/s$, preferably not less than $6.0\times10^{-4}$ $m^2/s$, and still more preferably not less than $7.0\times10^{-4}$ $m^2/s$. When the thermal diffusivity is greater than $5.0\times10^{-4}$ $m^2/s$, a great heat transfer capacity is attained, and thus the film is suited for heat radiation materials of recent electronic instruments.

<Bend Radius and Bending Angle>

Bend radius and bending angle of a graphite film can be evaluated by the MIT folding endurance test described later. In the MIT folding endurance test, the bend radius of the graphite film may be appropriately selected from 5 mm, 2 mm, 1 mm and the like, and the bending angle of the graphite film may be also selected from 45 degree, 90 degree, 135 degree and the like. In general, the test is more severe with a smaller bend radius R, and a greater bending angle. In electronic instruments having small spaces such as mobile phones, game machines, liquid crystal display television and PDP in which a graphite film is to be used, foldability with a small bend radius and a great bending angle is required. Therefore, the MIT folding endurance test of a graphite film is preferably performed under conditions involving a bend radius of 2 mm, and a bending angle of 135 degree.

Preferable number of times of folding in the MIT folding endurance test (with bend radius of 2 mm and bending angle of 135 degree) of the graphite film of the present invention is not less than 5,000, more preferably not less than 10,000, and still more preferably not less than 50,000. A graphite film that exhibits this number of times of folding of not less than 5,000 is superior in flex resistance, therefore, resistance to breakage can be achieved even if used in a bent portion. Specifically, also in the case of use in foldable portions of small electronic instruments and hinges of mobile phones, it can be used without deteriorating its functions. Furthermore, owing to superior flex resistance, handlability in mounting to electronic instruments, and the like can be also improved.

<Windability of Graphite Film>

As determined by a method in accordance with JIS C2151 described later, a camber $R_{gs}$ of the graphite film obtained according to the present invention according to windability evaluation of a film is not greater than 35 mm, preferably not greater than 30 mm, and still more preferably not greater than 25 mm. When the camber $R_{gs}$ is not greater than 35 mm, favorable winding is enabled, and lamination with other material may be also favorable. Additionally, the film is less likely to be meandering, and thus use with a large-area is enabled.

Furthermore, sag $Z_{gs}$ of the graphite film of the present invention according to windability evaluation of a film as determined by a method in accordance with JIS C2151, is not greater than 80 mm, preferably not greater than 65 mm, and still more preferably not greater than 40 mm. When the sag $Z_{gs}$ is not greater than 80 mm, favorable winding is enabled, and lamination with other material may be also favorable. Additionally, ruffling of the film is ameliorated, and thus use with a large-area is enabled.

<Correlation between Width $U_{gs}$ and Sag $Z_{gs}$ of Graphite Film>

The degree of sag of a graphite film correlates with a width $U_{gs}$ of the graphite film. A graphite film having a smaller width will be accompanied by less sag. Therefore, if a graphite film having a smaller width has the same sag $Z_{gs}$ as that of a graphite film having a greater width, it can be concluded that more significant amelioration of ruffling is indicated in the graphite film having a greater width.

According to the present invention, in order to evaluate amelioration of ruffling of a graphite film irrespective of the width of the graphite film, amelioration of ruffling will be evaluated based on $Z_{gs}/U_{gs}$ derived by dividing the sag $Z_{gs}$ by the width $U_{gs}$.

Therefore, $Z_{gs}/U_{gs}$ of the graphite film of the present invention is not greater than 0.3 mm/mm, preferably not greater than 0.2 mm/mm, and still more preferably not greater than 0.1. When $Z_{gs}/U_{gs}$ is not greater than 0.3 mm/mm, favorable winding is enabled, and lamination with other material may be also favorable. Accordingly, use as a large-area graphite film the film accompanied by ameliorated ruffling is enabled.

<Camber $R_{gs}$ of Slit Long Graphite Film>

A slit graphite film (particularly, portions at the roll end after baking) has a particularly great camber $R_{gs}$. In this case, it is desired that the camber $R_{gs}$ of a portion cut away by 100 mm from the roll end, in particular, of the graphite film of the present invention is not greater than 35 mm, preferably not greater than 30 mm, and still more preferably not greater than 25 mm. When the camber $R_{gs}$ of the portion cut away by 100 mm from the roll end is greater than 35 mm, a variety of defects may be caused such as unfavorable winding, defective lamination with other material, and a difficulty in use with large-area.

<Vacuum in Atmosphere at not Less than 1,000° C. and not Greater than 2,400° C.>

Another important feature of the present invention is suppression of actions of metal impurities on the film. Due to the action of the metal impurities, production of a uniform film may be inhibited, and thus a graphite film accompanied by ruffling tends to be formed. Particularly, in production of a long and large-area graphite film as in the present invention, the action of metal impurities can be remarkable. The present inventors elucidated from the investigations hitherto that the action of the metal impurities on a film occurs in a temperature range of not less than 1,000° C. and not greater than 2,400° C. in which the metal substances vaporize. Thus, in an effort to avoid negative effects of the metal impurities on the film, elimination of metal components in the form of gas filling in the furnace was intended. Specifically, the atmosphere was kept at reduced pressure in at least a part of the temperature range of not less than 1,000° C. and not greater than 2,400° C. As a result, it was found that nonuniform graphitization of the film was suppressed, and thus a long and large-area graphite film accompanied by ameliorated ruffling was successfully produced.

It is desired that the heat treatment of the present invention is carried out in the temperature range of not less than 1,000° C. and not greater than 2,400° C., preferably not less than 1,200° C. and not greater than 2,300° C., still more preferably at least a part of the temperature range of not less than 1,400° C. and not greater than 2,200° C., while maintaining a reduced pressure of not greater than −0.08 MPa, not greater than preferably −0.09 MPa, and even more preferably not greater than −0.099 MPa. Also, it is most desired that the heat treatment is carried out while maintaining a reduced pressure of not greater than −0.08 MPa in any of the temperature ranges described above.

The effect as described above can be expected as long as the temperature is not less than 1,000° C. under a reduced pressure. In addition, when the temperature is not greater than 2,400° C. under reduced pressure, deterioration in the furnace does not proceed even if reduced pressure is employed.

<Compression of Graphite Film>

Compression of a graphite film serves in obtaining a graphite film that is very superior in flex resistance. Compression method of a graphite film is exemplified by a post-sheet compression step of compression in a sheet form, or a post-rolling step as disclosed in JP-A No. H3-75211.

The post-rolling step disclosed is specifically, a method carried out by passing between two rollers made of ceramic or stainless. The post-sheet compression step is a method of compression of a film in the form of a film using a pressing machine or the like. In this method, the compression can be uniformly executed in a planar direction; therefore, superior flex resistance is achieved as compared with the post-rolling step, and production of a high-quality graphite film accompanied by significantly less variation in thickness, wrinkles, etc., is enabled.

EXAMPLES

Hereinafter, various Examples of the present invention are explained together with some Comparative Examples.

[Production Method of Polyimide Film A]

To a DMF (dimethylformamide) solution dissolving 1 equivalent of 4,4'-oxydianiline was dissolved 1 equivalent of pyromellitic dianhydride to obtain a polyamic acid solution (18.5% by weight).

To this solution were added while cooling 1 equivalent of acetic anhydride, 1 equivalent of isoquinoline, and an imidization catalyst including DMF, relative to carboxylic acid groups included in the polyamic acid, and then the mixture was degassed. Next, this mixed solution was applied on an aluminum foil so as to give a certain thickness after drying. A layer of the mixed solution layer on the aluminum foil was dried using a hot air oven and a far infrared heater.

Drying conditions when a film having a final thickness of 75 μm was produced are as in the following. The layer of the mixed solution on the aluminum foil was dried in a hot air oven at 120° C. for 240 sec to form a gel film having a self-supporting property. The gel film was stripped from the aluminum foil, and fixed in a frame. The gel film was further dried by heating stepwise in a hot air oven at 120° C. for 30 sec, at 275° C. for 40 sec, at 400° C. for 43 sec and at 450° C. for 50 sec, and then in a far infrared heater at 460° C. for 23 sec.

When films having other thickness (25, 50, 125 μm) were produced, the baking time was adjusted depending on the thickness. For example, in the case of the film having a thickness of 50 μm, the baking time was changed to ⅔ times the baking time when the thickness was 75 μm. It is to be noted that when the thickness is greater, sufficiently long baking time at low temperatures is necessary in order to prevent foaming that results from evaporation of the solvent of the polyimide film and the imidization catalyst.

[Production Method of Polyimide Film B]

To a DMF solution dissolving 3 equivalents of 4,4'-oxydianiline were dissolved 4 equivalents of pyromellitic dianhydride to synthesize a prepolymer having acid anhydride at both ends. Thereafter, 1 equivalent of p-phenylenediamine was dissolved in the solution containing the prepolymer to obtain a solution containing 18.5% by weight of the resulting polyamic acid.

To this solution were added while cooling 1 equivalent of acetic anhydride, 1 equivalent of isoquinoline, and an imidization catalyst including DMF, relative to carboxylic acid groups included in the polyamic acid, and then the mixture was degassed. Next, this mixed solution was applied on an aluminum foil so as to give a certain thickness after drying. A layer of the mixed solution layer on the aluminum foil was dried using a hot air oven and a far infrared heater.

Drying conditions when the final thickness was adjusted to be 75 μm are as follows. The layer of the mixed solution on the aluminum foil was dried in a hot air oven at 120° C. for 240 sec to form a gel film having a self-supporting property. The gel film was stripped from the aluminum foil, and fixed in a frame. The gel film was further dried by heating stepwise in a hot air oven at 120° C. for 30 sec, at 275° C. for 40 sec, at 400° C. for 43 sec and at 450° C. for 50 sec, and then in a far infrared heater at 460° C. for 23 sec. For adjusting to other thicknesses, the baking time was adjusted depending on the thickness. For example, in the case of the film having a thickness of 25 μm, the baking time was shortened to ⅓ times the baking time for the thickness of 75 μm.

In Examples and Comparative Examples, a polyimide film manufactured by Kaneka Corporation (trade name: Apical AV, NPI) was used which had been manufactured similarly to the production method of polyimide films A and B.

<Conditions for Measuring Various Types of Physical Properties>

<Measurement of the Area of Polymer Film, Carbonized Film and Graphite Film>

The area of polymer film, carbonized film, the graphite film may be evaluated from the product of measurements of the width and the length of the film. However, when the measurement of the length is difficult due to distorted shape, or due to the film property being easily broken, total weight the graphite film in the form of a roll is measured, and the area may be determined based on the ratio to the weight of a piece cut away in part (100 mm×100 mm).

<Measurement of Birefringence of Polymer Film>

The birefringence of the polymer film was measured using a refractive index·film thickness measurement system manufactured by Metricon Corporation (Model: 2010 Prism Coupler). When measured, a light source having a wavelength of 594 nm was used, and refractive indices were measured with TE mode and TM mode, respectively. Thus, the birefringence was determined as the value (TE−TM).

Figure 29:
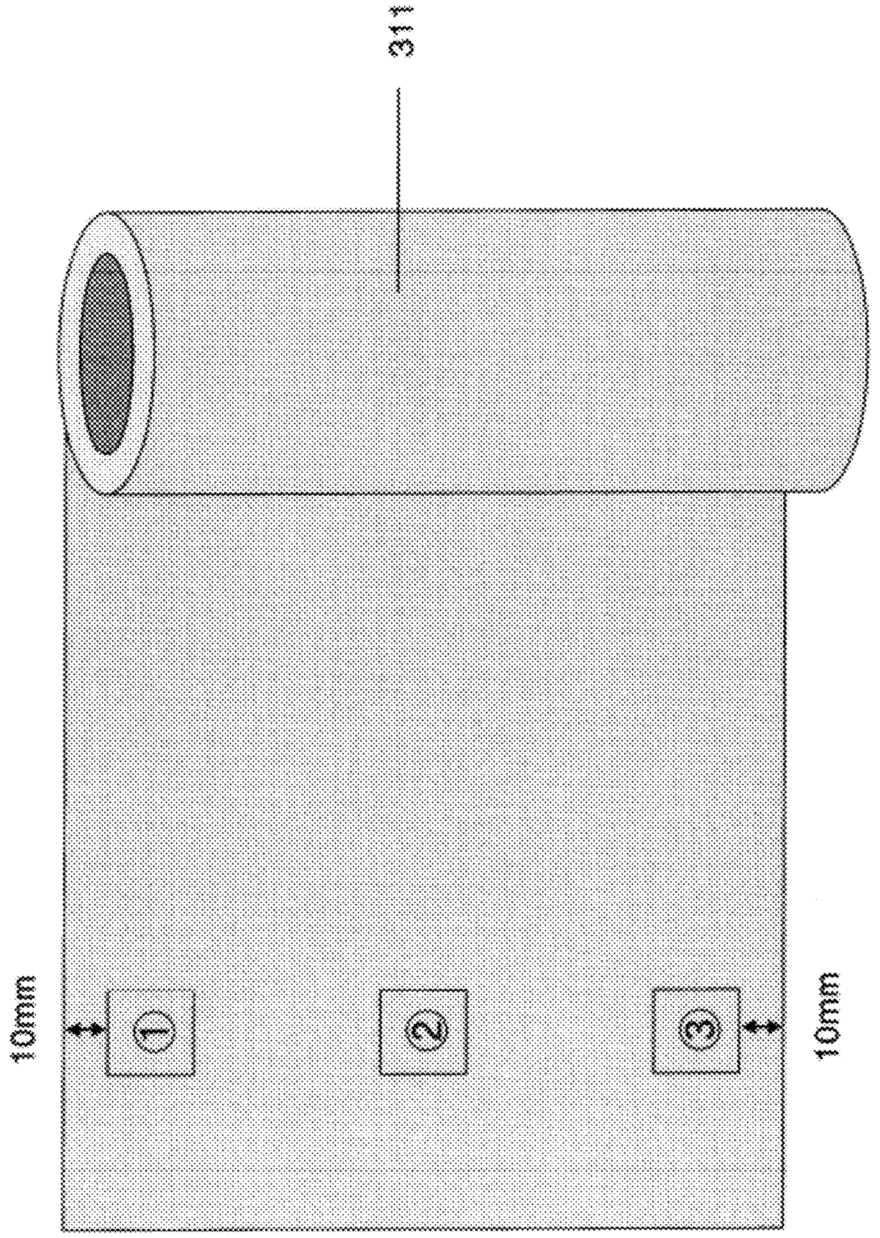
FIG. 29 shows an explanatory diagram illustrating extraction points of a sample for measuring the birefringence.

For the measurement, specimens of 50 mm were extracted from three positions of the film 311 at both ends in a width direction and the center portion as shown in FIG. 29, and the specimen was set in the apparatus with each of directions of 0°, 45°, 90° and 135° angles as shown in FIGS. 30 (*a*) to (*d*). The birefringence was measured at each angle, and the average is shown in Table 1.

<Measurement of Thickness of Polymer Film and Graphite Film>

Figure 23:
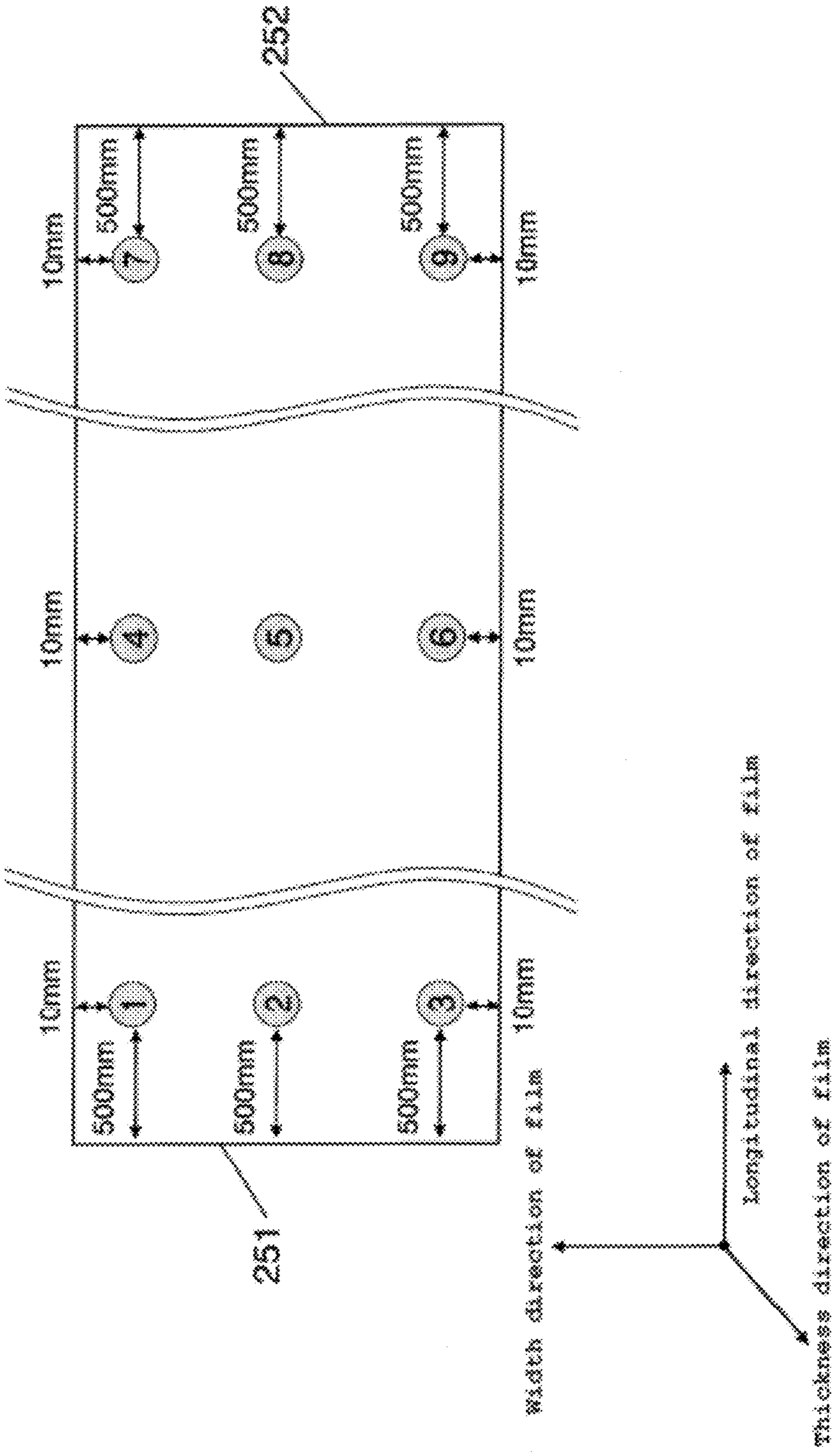
FIG. 23 shows an explanatory diagram illustrating measurement points of the thickness of a graphite film.

In the measurement of the thickness of the polymer film and the graphite film, a thickness gauge available from Heidenhain (HEIDENHAIN-CERTO) was used, in a temperature-controlled room at a room temperature of 25° C. The measurement positions were, as shown in FIG. 23, nine points of the polymer film and the graphite film in the form of a roll including points 1 to 3 aligning 500 mm away from the external end (roll start 251 of the film), points 7 to 9 aligning 500 mm away from the internal end of the film (roll end 252 of the film), and points 4 to 6 aligning at midpoints of them, respectively (the point 2 being midpoint between the point 1 and the point 3, and the point 5 being the midpoint of the point 2 and the point 8).

<Measurement of Weight of Graphite Film>

For the measurement of the weight of the graphite film, the weight (g) of a graphite film (10 cm×square) was measured, and the measurement was multiplied by 100 to determine the weight per unit area (1 $m^2$).

<Measurement of Width $U_{gs}$ of Graphite Film>

The width $U_{gs}$ of the graphite film is a length of the film in a direction perpendicular to the length direction of the film. The measurement points included, as shown in FIG. 23, points aligning 500 mm away from the external end (roll end 252 of the film), points aligning 500 mm away from the internal end (roll start 251 of the film), and midpoints of the two points thereof, respectively.

<Evaluation of Unevenness of the Thickness of the Graphite Film>

The unevenness of the thickness of the graphite film was evaluated based on the difference between the minimum value and the minimum value at each of the aforementioned nine measurement points shown in FIG. 23. The difference between the minimum value and the minimum value was employed for evaluation as: A for 0 to 1 μm; B for 1 to 2 μm; C for 2 to 3 μm; and D for 3 μm or greater.

<Evaluation of Breakage of Graphite Film>

The degree of breakage of the graphite film was observed. Evaluation was made as: A for the absence of breakage of not less than 10 mm; B for the presence of the breakage at 1 to 5 sites; C for the presence of the breakage at 6 to 20 sites; and D for the presence of the breakage at 21 or more sites.

<Elimination of Peculiar Winding>

The graphite films obtained in Examples and Comparative Examples were evaluated as: "B" when wrinkles or curves were not generated, or easily stretchable from cylindrical peculiar winding to flat without rolling; and "D" when stretching from peculiar winding to flat failed with rolling necessary.

<Bend Radius of Graphite Film by MIT Folding Endurance Test, and Evaluation of Bending Angle>

Evaluation of bend radius and bending angle of the graphite film was made by a MIT folding endurance test. The graphite film was cut into a size of 1.5×10 cm, and the measurement was carried out using a MIT crease-flex abrasion fatigue tester Model D manufactured by TOYO SEIKI Co., Ltd., with a test load of 100 gf (0.98 N), a speed of 90 times/min, and a curvature radius R of folding clamp of 2 mm. The bending angle was measured with 135° to right and left.

<Measurement of the Thermal Diffusivity in Planar Direction of the Graphite Film>

The thermal diffusivity in a planar direction of the film after subjecting to a graphitization treatment was measured using a Thermal Constant Analyzer ("LaserPit" available from ULVAC-RIKO, Inc.) according to an AC calorimeter Method, with a specimen of 4×40 mm cut away from the graphite film in an atmosphere of 20° C. at 10 Hz.

<Thermal Conductivity of Graphite Film>

Thermal conductivity of the graphite film was calculated using the following formula:

$$\lambda=\alpha\gamma C$$

λ: thermal conductivity (W/mK)

α: thermal diffusivity ($m^2$/mK)

γ: density (kg·$m^3$)

C: heat capacity (J/kg).

<Tensile Test of Graphite Film>

The tensile test of the graphite film was performed in accordance with a tensile test method of plastic film and sheet defined in JIS K7127.

<Measurement of Electric Conductivity of the Graphite Film in Planar Direction>

The electric resistivity of a graphite film cut away into 50 mm×square in a planar direction was measured using Loresta AP manufactured by Mitsubishi Petrochemical Co., Ltd. (currently, Dia Instruments Co., Ltd.,), and the electric conductivity of the graphite film in the planar direction was determined from the measurement value.

<Evaluation of Ruffling of the Graphite Film (JIS C2151)>

Evaluation of ruffling of the graphite film was made in accordance with windability evaluation of a film defined in JIS C2151. The windability evaluation of a film defined in JIS C2151 includes the following evaluations of camber and sag.

<Measurement Principles for Evaluation of Camber and Sag>

The "Evaluation of Camber and Sag" in the present invention is made according to "A method in accordance with JIS C2151, windability evaluation of a film" described below. The method in accordance with JIS C2151, windability evaluation of a film herein is different from the method of JIS C2151 in that the weight on the film was changed from 50 g/cm to 20 g/cm. Specific measuring method of the method in accordance with JIS C2151, windability evaluation of a film is explained below.

The windability is evaluated on the basis of "distortion" that appeared on the film supplied in the form of a roll. The film can have the following two patterns of appearance of "distortion" which can deteriorate adequate windability.

a) Film having "camber": not having a straight film edge.

b) Film having "sag": when the film is pulled, a part of the film sags to a height not exceeding that of common films falling within the same scope.

Although two measurement method of "method A" and "method B" are defined, evaluations of ruffling of the graphite film for camber and sag in the present invention are made in accordance with the method A.

<Evaluation of Camber>

The film in a certain length is wound off, placed on a plane, and each deviation from the straight line is measured for two edges of the film.

(Apparatus) Apparatuses employed are as in the following.

a) Table

The table employed has a width sufficiently greater than the maximum width of the film to be tested, a length of 1,500 mm±15 mm, and a degree of parallelization at two ends being not greater than 0.1 degree (or not greater than 1.8 mm/m of the width of the table). The surface should be flat and horizontal which had been (satin) finished with an appropriate material entity, but not subjected to abrasive finishing. When the table has a greater length than that defined, two parallel reference lines with an interval of 1,500 mm±15 mm should be clearly marked on the surface of the table. The degree of parallelization of the reference lines is to be not greater than 0.1 degree (i.e., not greater than 1.8 mm/m of the length of the reference line).

b) Brush

A soft brush for flattening the film placed on the surface of the table.

c) Straight edge ruler

A steel ruler having a length of not less than 1,525 mm.

d) Measuring ruler

A steel ruler having a length of 150 mm, and being graduated with 1 mm intervals.

(Test Piece) Three fresh test pieces having a length of about 2 m are taken up from the roll. When the test piece is taken, it is slowly drawn out with a minimum tensile force required for winding off. In this process, the test piece is taken from around the center of the wound roll. More specifically, in the case of a roll of 100 m, the three test pieces are taken from around 50 m away from the roll end.

Figure 21:
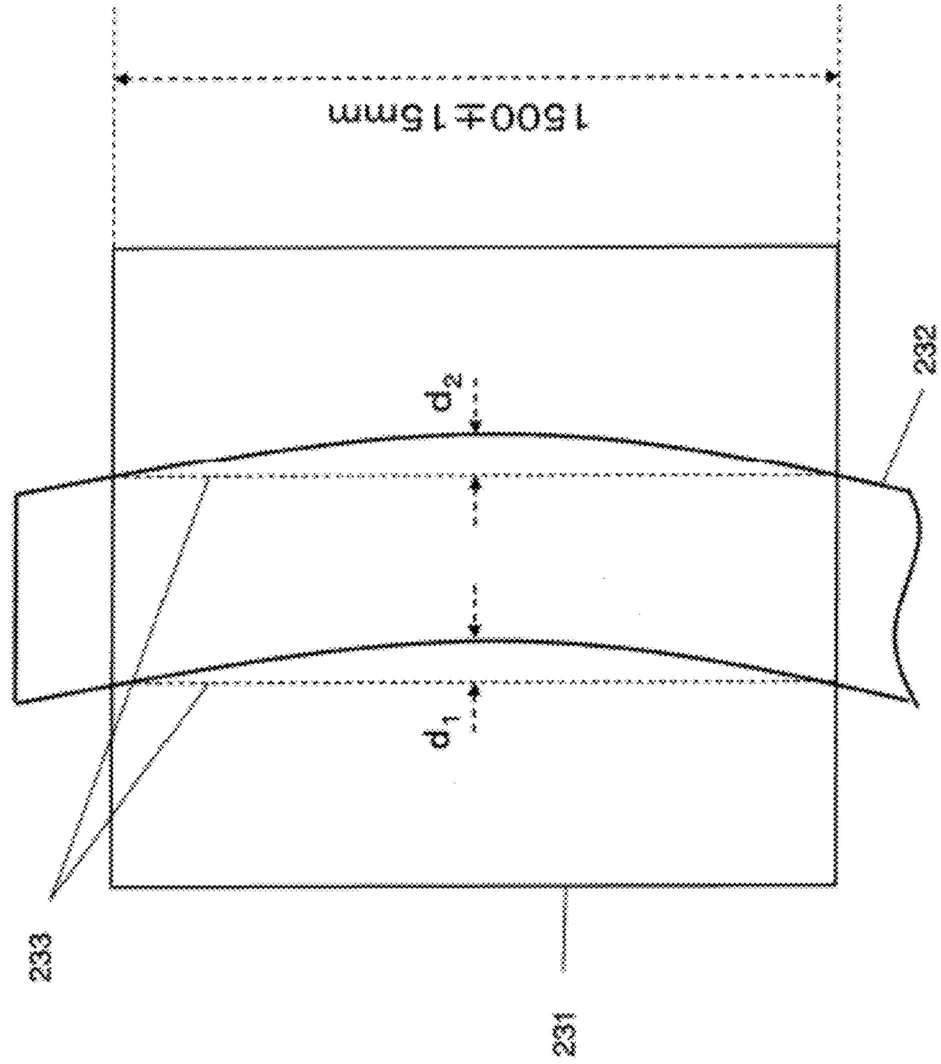
FIG. 21 shows an explanatory diagram illustrating evaluation of ruffling of a graphite film (evaluation of the camber) by a method in accordance with JIS C2151, windability evaluation of a film.

(Measurement Procedure) Test piece 232 is placed on table 231 along a longitudinal direction as shown in FIG. 21. The film is gently brushed with weak force from one end to allow the test piece 232 to be in close contact with the table 231 such that trapped air does not remain as far as possible.

An edge of the straight edge ruler is placed along one edge of the film such that the deviation of the film edge from the straight line can be well observed. The steel straight edge ruler is adjusted so as to agree with the edges of the film at two ends of the table (or on reference line). In almost middle between the reference positions, deviation $d_1$ of the film edge from the steel straight edge ruler is measured at a minimum scale of 1 mm using the steel measuring ruler. Deviation $d_2$ of another edge of the film from the straight edge ruler is also measured according to the same method.

The camber value of the test piece is determined as sum ($d_1+d_2$) of deviations of the film edge from the edge of the straight edge ruler represented by millimeter at two ends of the film in the middle of the interval of the reference lines. Furthermore, this process is repeated for other two test pieces. $R_{gs}$ is defined as ($d_1$+$d_2$).

(Results) The camber $R_{gs}$ was determined as a median of three measurements, and the median value is shown in Table 1.

<Evaluation of Sag>

The film having a certain length was wound off, and placed on two parallel sticks in a perpendicular direction under specified conditions, and the deviation from a uniform suspended line.

Although rollers of a winding machine may be used as a device for evaluating sag, if the result is uncertain, the apparatus described below is used.

Figure 22:
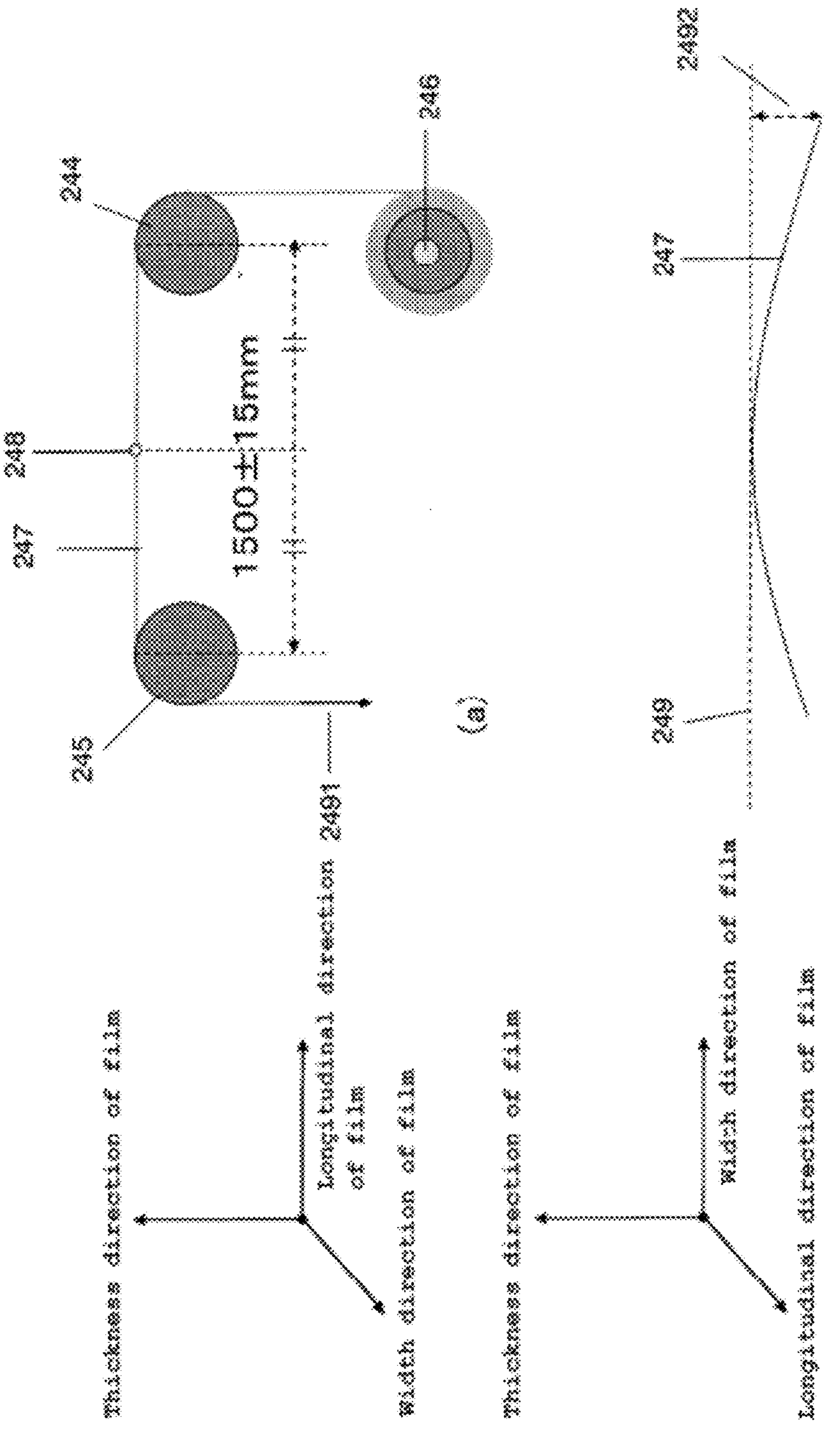
FIG. 22 shows explanatory diagrams illustrating evaluation of ruffling of a graphite film (evaluation of sag) by a method in accordance with JIS C2151, windability evaluation of a film.

(Apparatus) Next, the apparatus is explained (FIG. 22).

a) Mount Equipped with Rollers

Two metal rollers 244 and 245 that rotate freely are supported on a rigid mount such that these two rollers are in parallel. Each of the rollers 244 and 245 has a diameter of 100 mm±10 mm, and a length on which the maximum width of the film to be tested can be placed sufficiently. Axes of the two rollers 244 and 245 are aligned on single horizontal plane, and fixed in parallel within 0.1 degree from one another with an interval of 1,500 mm±15 mm (i.e., not greater than 1.8 mm per the roller having a length of 1 m). The rollers 244 and 245 are cylindrical having a cylindricity of not greater than 0.1 mm, and having a surface which had been appropriate satin finished, but not subjected to abrasive finishing. To the mount is attached a device (axis for permitting attachment/detachment, not shown in the Figure) for mounting a film roll 246 to be tested immediately below one roller 244 (first roller). The device is as in the following.

1) The axis of the film roll 246 on which the film is placed is in parallel with the axis of the first roller 244 within 1 degree.

2) Position of lateral portion of the film can be freely adjusted.

3) Drawing of the film from the film roll 246 while adjusting the tensile force for winding off is enabled.

b) Device for Applying Tensile force to the Film

At opposite end of the mount, fixation of the film freely sagged from another roller 245 (second roller) to a weight or a spring-joint clamp is enabled. The load 2491 with the weight or spring is 20 g weight per cm of the width of the film 247, and enables a tensile force to be applied as uniformly as possible in the width direction of the film 247. Alternatively, the film may be wrapped around a tension roller, and a uniform tensile force of 20 g weight per cm of the width may be applied thereto.

c) Device for Measuring Dimension

At a measurement point 248, i.e., a midpoint between two rollers 244 and 245, a distance from the plane between two rollers to the film sagged downward is measured along a line parallel to the rollers. The device for use in the measurement is a steel straight edge ruler having a length of not less than 1,525 mm, and a steel measuring ruler having a length of 150 mm and being graduated with 1 mm intervals. Instead, a complex system may be also used that indicates the position of the film automatically or semiautomatically.

(Test Piece) Fresh test piece having a length of about 2 m slowly drawn from the roll with a minimum tensile force required for winding off is used. In this process, the test piece is taken from around the center of the wound roll. More specifically, in the case of a roll of 100 m, the three test pieces are taken from around 50 m away from the roll end.

(Measurement Procedure) As shown in FIG. 22, a test piece 247 is placed in a length direction on two rollers 244 and 245 of the apparatus. A tensile force 2491 is applied to the free end of the film. Final position of the film that passes over the second roller 245 is regulated such that the film becomes almost horizontal at the measurement point 248, in the middle of the two rollers.

Using a steel straight edge ruler and a graduated steel measuring ruler, or other appropriate system, the film is confirmed along the width direction at the measurement point 248 between the two rollers, and a sag 2492 with a maximum depth among all sags that went down than normally lying film therearound (FIG. 22 (*b*)) was measured at a minimum scale of 1 mm. This measurement is defined as a value of sag $Z_{gs}$ of the test piece.

(Results) The value of sag is determined as a median of three measurements.

TABLE 1

| | Operation | Polymer film: Thickness μm | Polymer film: Birefringence | Polymer film: Width mm | Polymer film: Length m | Polymer film: Area m² | Carbonization: Internal core: Type | Carbonization: Internal core: Diameter mm | Carbonization: Treatment temperature ° C. | Carbonization: Area m² |
|---|---|---|---|---|---|---|---|---|---|---|
| Example 1 | Winding up | 50 | 0.115 | 500 | 50 | 25 | cylinder | 100 | 1,400 | 16.0 |
| Example 2 | Winding up | 50 | 0.115 | 500 | 50 | 25 | cylinder | 100 | 1,400 | 16.0 |
| Example 3 | Winding up | 50 | 0.115 | 500 | 50 | 25 | cylinder | 100 | 1,400 | 16.0 |
| Example 4 | Winding up | 25 | 0.14 | 500 | 50 | 25 | cylinder | 100 | 1,400 | 16.0 |
| Example 5 | Winding up | 50 | 0.115 | 500 | 50 | 25 | cylinder | 100 | 1,400 | 16.0 |
| Example 6 | Winding up | 75 | 0.113 | 500 | 50 | 25 | cylinder | 100 | 1,400 | 16.0 |
| Example 7 | Winding up | 50 | 0.115 | 500 | 50 | 25 | cylinder | 100 | 1,400 | 16.0 |
| Example 8 | Winding up | 50 | 0.115 | 500 | 50 | 25 | cylinder | 100 | 1,400 | 16.0 |
| Example 9 | Winding up | 50 | 0.115 | 500 | 50 | 25 | cylinder | 100 | 1,400 | 16.0 |
| Example 10 | Winding up | 50 | 0.115 | 500 | 50 | 25 | cylinder | 250 | 1,000 | 16.0 |
| Example 11 | Winding up | 50 | 0.115 | 500 | 50 | 25 | cylinder | 100 | 1,400 | 16.0 |
| Example 12 | Winding up | 50 | 0.115 | 500 | 50 | 25 | cylinder | 100 | 1,400 | 16.0 |
| Example 13 | Winding up | 50 | 0.115 | 500 | 50 | 25 | cylinder | 100 | 1,400 | 16.0 |
| Example 14 | Winding up | 50 | 0.115 | 250 | 50 | 13 | cylinder | 100 | 1,400 | 8.0 |
| Example 15 | Winding up | 50 | 0.115 | 250 | 50 | 13 | cylinder | 100 | 1,400 | 8.0 |
| Example 16 | Rotation (1,400° C. to 2,800° C.) | 50 | 0.115 | 500 | 50 | 25 | cylinder | 100 | 1,400 | 16.0 |
| Example 17 | Rotation (1,400° C. to 2,200° C.) | 50 | 0.115 | 500 | 50 | 25 | cylinder | 100 | 1,400 | 16.0 |
| Example 18 | Division by own weight | 50 | 0.115 | 500 | 50 | 25 | cylinder | 100 | 1,400 | 16.0 |
| Example 19 | Division by pressing in of tapered stick | 50 | 0.115 | 500 | 50 | 25 | cylinder | 100 | 1,400 | 16.0 |

TABLE 1-continued

| | Operation | Polymer film: Thickness µm | Polymer film: Birefringence | Polymer film: Width mm | Polymer film: Length m | Polymer film: Area $m^2$ | Carbonization: Internal core: Type | Carbonization: Internal core: Diameter mm | Carbonization: Treatment temperature ° C. | Carbonization: Area $m^2$ |
|---|---|---|---|---|---|---|---|---|---|---|
| Example 20 | Application of pressure to one outermost layer | 50 | 0.115 | 500 | 50 | 25 | cylinder | 100 | 1,400 | 16.0 |
| Example 21 | Application of pressure from lateral face of roll | 50 | 0.115 | 500 | 50 | 25 | cylinder | 100 | 1,400 | 16.0 |
| Example 22 | Application of pressure from upper surface of roll | 50 | 0.115 | 500 | 50 | 25 | cylinder | 100 | 1,400 | 16.0 |
| Example 23 | Application of pressure from lateral face of roll | 50 | 0.115 | 250 | 50 | 13 | cylinder | 100 | 1,400 | 8.0 |
| Example 24 | Division by own weight + application of pressure from upper surface of roll | 25 | 0.115 | 500 | 50 | 25 | cylinder | 100 | 1,400 | 16.0 |
| Example 25 | Division by own weight + application of pressure from upper surface of roll | 50 | 0.115 | 500 | 50 | 25 | cylinder | 100 | 1,400 | 16.0 |
| Example 26 | Division by own weight + application of pressure from upper surface of roll | 75 | 0.115 | 500 | 50 | 25 | cylinder | 100 | 1,400 | 16.0 |
| Example 27 | Division by own weight + application of pressure from upper surface of roll | 50 | 0.115 | 500 | 50 | 25 | cylinder | 100 | 1,400 | 16.0 |
| Example 28 | Winding up | 75 | 0.113 | 250 | 20 | 5 | cylinder | 150 | 1,000 | 3.2 |
| Example 29 | Division by own weight + application of pressure from upper surface of roll | 75 | 0.115 | 250 | 20 | 5 | cylinder | 150 | 1,000 | 3.2 |
| Comparative Example 1 | Nothing, transversely placed | 50 | 0.115 | 500 | 50 | 25 | cylinder | 100 | 1,400 | 16.0 |
| Comparative Example 2 | Triple rolling | 50 | 0.115 | 180 | 0.213 | 0 | cylinder | 68 | 1,400 | 0.0245 |
| Comparative Example 3 | Internal cylinder having an external diameter of 250 mm | 75 | 0.115 | 250 | 30 | 8 | cylinder | 250 | 1,000 | 4.8 |
| Comparative Example 4 | Internal cylinder having an external diameter of 250 mm | 50 | 0.115 | 250 | 30 | 8 | cylinder | 250 | 1,000 | 4.8 |
| Comparative Example 5 | Internal cylinder having an external diameter of 150 mm | 75 | 0.115 | 250 | 20 | 5 | cylinder | 150 | 1,000 | 3.2 |

TABLE 2

| | Operation | Internal core: Type and number | Internal core: Internal core diameter mm | Winding up step: Before the heat treatment | Winding up step: During the heat treatment | States of film and internal core before the heat treatment: a — | b — | c mm | d — | e — | f cm² | g round | States of film and internal core after the heat treatment: a — | b — | c mm | d — | e — | f cm² | g round | f rate of change % | g rate of change % | Maximum temperature ° C. | Vertical placement or transverse placement | Fixed at the outer-most layer of film |
|---|---|---|---|---|---|---|---|---|---|---|---|---|---|---|---|---|---|---|---|---|---|---|---|---|
| | | Graphitization step Heat treatment 1 | | | | | | | | | | | | | | | | | | | | | | |
| Example 1 | Winding up | cylinder, one | 100 | present | — | 0.3 | 0.6 | 0.5 | 0.9 | 1.1 | 78.5 | 119 | 6.5 | 7.5 | 10.0 | 10.5 | 3.0 | 78.5 | 115 | 0.0 | 3.4 | 2,900 | transverse | — |
| Example 2 | Winding up | cylinder, one | 100 | present | — | 0.3 | 0.6 | 0.5 | 0.9 | 1.1 | 78.5 | 119 | 6.5 | 7.5 | 10.0 | 10.5 | 3.0 | 78.5 | 115 | 0.0 | 3.4 | 2,900 | transverse | — |
| Example 3 | Winding up | cylinder, one | 100 | present | — | 0.3 | 0.6 | 0.5 | 0.9 | 1.1 | 78.5 | 119 | 6.5 | 7.5 | 10.0 | 10.5 | 3.0 | 78.5 | 115 | 0.0 | 3.4 | 2,900 | transverse | — |
| Example 4 | Winding up | cylinder, one | 100 | present | — | 0.3 | 0.6 | 0.5 | 0.9 | 1.1 | 78.5 | 124 | 6.5 | 7.5 | 10.0 | 10.5 | 3.0 | 78.5 | 120 | 0.0 | 3.2 | 2,700 | transverse | — |
| Example 5 | Winding up | cylinder, one | 100 | present | — | 0.3 | 0.6 | 0.5 | 0.9 | 1.1 | 78.5 | 119 | 6.5 | 7.5 | 10.0 | 10.5 | 3.0 | 78.5 | 115 | 0.0 | 3.4 | 2,700 | transverse | — |
| Example 6 | Winding up | cylinder, one | 100 | present | — | 0.3 | 0.6 | 0.5 | 0.9 | 1.1 | 78.5 | 114 | 6.5 | 7.5 | 10.0 | 10.5 | 3.0 | 78.5 | 111 | 0.0 | 2.6 | 2,700 | transverse | — |
| Example 7 | Winding up | cylinder, one | 100 | — | — | 0.8 | 1.2 | 2.0 | 1.8 | 1.5 | 78.5 | 117 | 6.9 | 8.4 | 12.1 | 13.0 | 3.2 | 78.5 | 113 | 0.0 | 3.4 | 2,700 | transverse | — |
| Example 8 | Winding up | cylinder, one | 100 | present | — | 0.3 | 0.6 | 0.5 | 0.9 | 1.1 | 78.5 | 119 | 6.5 | 7.5 | 10.0 | 10.5 | 3.0 | 78.5 | 115 | 0.0 | 3.4 | 2,700 | transverse | — |
| Example 9 | Winding up | cylinder, one | 50 | present | — | 0.3 | 0.6 | 0.5 | 0.9 | 1.1 | 19.6 | 209 | 8.2 | 7.5 | 12.0 | 13.0 | 4.0 | 19.6 | 200 | 0.0 | 4.3 | 2,700 | transverse | — |
| Example 10 | Winding up | cylinder, one | 250 | present | — | 0.3 | 0.6 | 0.5 | 0.9 | 1.1 | 490.6 | 49 | 6.0 | 7.0 | 9.0 | 9.0 | 2.9 | 490.6 | 48 | 0.0 | 2.0 | 2,700 | transverse | — |
| Example 11 | Winding up | cylinder, one | 100 | present | — | 0.3 | 0.6 | 0.5 | 0.9 | 1.1 | 78.5 | 119 | 3.5 | 4.1 | 5.0 | 8.2 | 2.3 | 78.5 | 115 | 0.0 | 3.4 | 2,200 | transverse | — |
| Example 12 | Winding up | cylinder, one | 100 | present | — | 0.3 | 0.6 | 0.5 | 0.9 | 1.1 | 78.5 | 119 | 3.5 | 4.1 | 5.0 | 8.2 | 2.3 | 78.5 | 115 | 0.0 | 3.4 | 2,200 | transverse | — |
| Example 13 | Winding up | cylinder, one | 100 | present | — | 0.3 | 0.6 | 0.5 | 0.9 | 1.1 | 78.5 | 119 | 6.5 | 7.5 | 10.0 | 10.5 | 3.0 | 78.5 | 115 | 0.0 | 3.4 | 2,900 | transverse | — |
| Example 14 | Winding up | cylinder, one | 100 | present | — | 0.3 | 0.6 | 0.5 | 0.9 | 1.1 | 78.5 | 119 | 3.4 | 3.9 | 4.8 | 8.1 | 1.9 | 78.5 | 117 | 0.0 | 1.7 | 2,900 | vertical | — |
| Example 15 | Winding up | absent | — | present | — | — | — | 0.5 | 0.9 | 1.1 | — | 119 | — | — | 10.0 | 10.5 | 3.0 | — | 115 | — | 3.4 | 2,700 | vertical | — |
| Example 16 | Rotation (1,400° C. to 2,800° C.) | cylinder, one | 100 | present | present | 0.3 | 0.6 | 0.5 | 0.9 | 1.1 | 78.5 | 119 | 0.8 | 1.2 | 0.7 | 1.5 | 1.3 | 78.5 | 133 | 0.0 | −11.8 | 2,900 | transverse | — |
| Example 17 | Rotation (1,400° C. to 2,200° C.) | cylinder, one | 100 | present | present | 0.3 | 0.6 | 0.5 | 0.9 | 1.1 | 78.5 | 119 | 1.0 | 1.4 | 0.9 | 1.8 | 1.6 | 78.5 | 127 | 0.0 | −6.7 | 2,900 | transverse | — |
| Example 18 | Division by own weight | cylinder, 2-split | 100 | present | — | 0.3 | 0.6 | 0.5 | 0.9 | 1.1 | 78.5 | 119 | 0.4 | 0.7 | 8.0 | 9.3 | 2.6 | 88.5 | 115 | 12.7 | 3.4 | 2,900 | transverse | — |

TABLE 2-continued

| | | Graphitization step Heat treatment 1 | | | | | | | | | | | | | | | | | | | | | | |
|---|---|---|---|---|---|---|---|---|---|---|---|---|---|---|---|---|---|---|---|---|---|---|---|---|
| | | Internal core | | Winding up step | | States of film and internal core before the heat treatment | | | | | | | States of film and internal core after the heat treatment | | | | | | | f rate of change | g rate of change | Maximum temperature | Vertical placement or transverse placement | Fixed at the outer-most layer of film |
| | Operation | Type and number | Internal core diameter mm | Before the heat treatment | During the heat treatment | a — | b — | c mm | d — | e — | f $cm^2$ | g round | a — | b — | c mm | d — | e — | f $cm^2$ | g round | % | % | ° C. | | |
| Example 19 | Division by pressing in of tapered stick | cylinder, 2-split | 100 | present | — | 0.3 | 0.6 | 0.5 | 0.9 | 1.1 | 78.5 | 119 | 0.5 | 0.9 | 8.0 | 9.3 | 2.6 | 88.5 | 115 | 12.7 | 3.4 | 2,900 | transverse | — |
| Example 20 | Application of pressure to one outermost layer | cylinder, one | 100 | present | — | 0.3 | 0.6 | 0.5 | 0.9 | 1.1 | 78.5 | 119 | 4.0 | 5.5 | 0.8 | 1.4 | 1.3 | 78.5 | 118 | 0.0 | 0.8 | 2,900 | transverse | fixation at one layer |
| Example 21 | Application of pressure from lateral face of roll | cylinder, one | 100 | present | — | 0.3 | 0.6 | 0.5 | 0.9 | 1.1 | 78.5 | 119 | 4.0 | 5.5 | 0.8 | 1.4 | 1.3 | 78.5 | 118 | 0.0 | 0.8 | 2,900 | transverse | lateral face of the roll |
| Example 22 | Application of pressure from upper surface of roll | cylinder, one | 100 | present | — | 0.3 | 0.6 | 0.5 | 0.9 | 1.1 | 78.5 | 119 | 4.0 | 5.5 | 0.8 | 1.4 | 1.3 | 78.5 | 119 | 0.0 | 0.0 | 2,900 | transverse | upper surface of the roll |
| Example 23 | Application of pressure from lateral face of roll | cylinder, one | 100 | present | — | 0.3 | 0.6 | 0.5 | 0.9 | 1.1 | 78.5 | 119 | 4.0 | 5.5 | 0.8 | 1.4 | 1.3 | 78.5 | 119 | 0.0 | 0.0 | 2,900 | vertical | lateral face of the roll |
| Example 24 | Division by own weight + application of pressure from upper surface of roll | cylinder, 2-split | 100 | present | — | 0.3 | 0.6 | 0.5 | 0.9 | 1.1 | 78.5 | 124 | 0.4 | 0.7 | 0.6 | 1.2 | 1.2 | 88.5 | 124 | 12.7 | 0.0 | 2,900 | transverse | upper surface of the roll |
| Example 25 | Division by own weight + application of pressure from upper surface of roll | cylinder, 2-split | 100 | present | — | 0.3 | 0.6 | 0.5 | 0.9 | 1.1 | 78.5 | 119 | 0.4 | 0.7 | 0.6 | 1.2 | 1.2 | 88.5 | 119 | 12.7 | 0.0 | 2,900 | transverse | upper surface of the roll |
| Example 26 | Division by own weight + application of pressure from upper surface of roll | cylinder, 2-split | 100 | present | — | 0.3 | 0.6 | 0.5 | 0.9 | 1.1 | 78.5 | 114 | 0.4 | 0.7 | 0.6 | 1.2 | 1.2 | 88.5 | 114 | 12.7 | 0.0 | 2,900 | transverse | upper surface of the roll |

TABLE 2-continued

| | | Graphitization step Heat treatment 1 | | | | | | | | | | | | | | | | | | | | | | |
|---|---|---|---|---|---|---|---|---|---|---|---|---|---|---|---|---|---|---|---|---|---|---|---|---|
| | | Internal core | | Winding up step | | States of film and internal core before the heat treatment | | | | | | | States of film and internal core after the heat treatment | | | | | | | | | | | |
| | Operation | Type and number | Internal core diameter mm | Before the heat treatment | During the heat treatment | a — | b — | c mm | d — | e — | f $cm^2$ | g round | a — | b — | c mm | d — | e — | f $cm^2$ | g round | f rate of change % | g rate of change % | Maximum temperature ° C. | Vertical placement or transverse placement | Fixed at the outer-most layer of film |
| Example 27 | Division by own weight + application of pressure from upper surface of roll | cylinder, 2-split | 100 | — | — | 0.8 | 1.2 | 2.0 | 1.8 | 1.5 | 78.5 | 117 | 0.9 | 1.3 | 2.1 | 1.9 | 1.6 | 90.3 | 117 | 15.0 | 0.0 | 2,900 | transverse | upper surface of the roll |
| Example 28 | Winding up | cylinder, one | 150 | present | — | 0.3 | 0.6 | 0.5 | 0.9 | 1.1 | 176.6 | 30 | 6.0 | 7.1 | 9.8 | 9.7 | 2.9 | 176.6 | 27 | 0.0 | 10.0 | 2,700 | transverse | — |
| Example 29 | Division by own weight + application of pressure from upper surface of roll | cylinder, 2-split | 150 | present | — | 0.3 | 0.6 | 0.5 | 0.9 | 1.1 | 176.6 | 30 | 0.4 | 0.7 | 0.6 | 1.2 | 1.2 | 176.6 | 30 | 0.0 | 0.0 | 2,800 | transverse | upper surface of the roll |
| Comparative Example 1 | Nothing, transversely placed | cylinder, one | 100 | — | — | 0.8 | 1.2 | 2.0 | 1.8 | 1.5 | 78.5 | 117 | 7.3 | 8.2 | 12.0 | 11.5 | 3.2 | 78.5 | 113 | 0.0 | 3.4 | 2,900 | transverse | — |
| Comparative Example 2 | Triple rolling | cylinder, one | 68 | — | — | 0.8 | 1.2 | 2.0 | 1.8 | 1.5 | 36.3 | 3 | 7.3 | 8.2 | 12.0 | 11.5 | 3.2 | 36.3 | 3 | 0.0 | 16.7 | 2,900 | transverse | — |
| Comparative Example 3 | Internal cylinder having an external diameter of 250 mm | cylinder, one | 250 | — | — | 0.6 | 1.1 | 1.8 | 1.6 | 1.2 | 490.6 | 28 | 7.1 | 8.0 | 11.0 | 10.5 | 2.8 | 490.6 | 27 | 0.0 | 3.6 | 2,800 | transverse | — |
| Comparative Example 4 | Internal cylinder having an external diameter of 250 mm | cylinder, one | 250 | — | — | 0.6 | 1.1 | 1.8 | 1.6 | 1.2 | 490.6 | 30 | 7.1 | 8.0 | 11.0 | 10.5 | 2.8 | 490.6 | 29 | 0.0 | 3.3 | 2,800 | transverse | — |
| Comparative Example 5 | Internal cylinder having an external diameter of 150 mm | cylinder, one | 150 | — | — | 0.6 | 1.1 | 1.8 | 1.6 | 1.2 | 176.6 | 30 | 7.0 | 8.0 | 10.8 | 10.3 | 2.7 | 176.6 | 27 | 0.0 | 10.0 | 2,800 | transverse | — |

TABLE 3

| | Operation | Graphitization step Heat treatment 2 — Internal core: Type and number | Internal core: Internal core diameter mm | Winding up step: Before the heat treatment | Winding up step: During the heat treatment | States of film and internal core before the heat treatment: a — | b — | c mm | d — | e — | f cm² | g round | States of film and internal core after the heat treatment: a — | b — | c mm | d — | e — | f cm² | g round | f rate of change % | g rate of change % | Maximum temperature ° C. | Vertical placement or transverse placement | Fixed at the outer-most layer of film |
|---|---|---|---|---|---|---|---|---|---|---|---|---|---|---|---|---|---|---|---|---|---|---|---|---|
| Example 1 | Winding up | Cylindrical, one | 100 | Present | — | 0.4 | 0.7 | 0.7 | 1.0 | 1.1 | 78.5 | 133 | 0.4 | 0.7 | 0.7 | 1.0 | 1.1 | 78.5 | 133 | 0.0 | 0.0 | 2,900 | transverse | — |
| Example 2 | Winding up | Cylindrical, one | 100 | Loosely | — | 0.8 | 1.3 | 1.5 | 1.7 | 1.6 | 78.5 | 130 | 0.8 | 1.3 | 1.5 | 1.7 | 1.6 | 78.5 | 130 | 0.0 | 0.0 | 2,900 | transverse | — |
| Example 3 | Winding up | Cylindrical, one | 100 | Loosely | — | 1.0 | 1.5 | 2.0 | 2.0 | 1.8 | 78.5 | 126 | 1.0 | 1.5 | 2.0 | 2.0 | 1.8 | 78.5 | 126 | 0.0 | 0.0 | 2,900 | transverse | — |
| Example 4 | Winding up | Cylindrical, one | 100 | Present | — | 0.4 | 0.7 | 0.7 | 1.0 | 1.1 | 78.5 | 136 | 0.4 | 0.7 | 0.7 | 1.0 | 1.1 | 78.5 | 136 | 0.0 | 0.0 | 2,900 | transverse | — |
| Example 5 | Winding up | Cylindrical, one | 100 | Present | — | 0.4 | 0.7 | 0.7 | 1.0 | 1.1 | 78.5 | 133 | 0.4 | 0.7 | 0.7 | 1.0 | 1.1 | 78.5 | 133 | 0.0 | 0.0 | 2,900 | transverse | — |
| Example 6 | Winding up | Cylindrical, one | 100 | Present | — | 0.4 | 0.7 | 0.7 | 1.0 | 1.1 | 78.5 | 130 | 0.4 | 0.7 | 0.7 | 1.0 | 1.1 | 78.5 | 130 | 0.0 | 0.0 | 2,900 | transverse | — |
| Example 7 | Winding up | Cylindrical, one | 100 | Present | — | 0.4 | 0.7 | 0.7 | 1.0 | 1.1 | 78.5 | 133 | 0.4 | 0.7 | 0.7 | 1.0 | 1.1 | 78.5 | 133 | 0.0 | 0.0 | 2,900 | transverse | — |
| Example 8 | Winding up | Cylindrical, one | 100 | Loosely | — | 0.8 | 1.3 | 1.5 | 1.7 | 1.6 | 78.5 | 130 | 0.8 | 1.3 | 1.5 | 1.7 | 1.6 | 78.5 | 130 | 0.0 | 0.0 | 2,900 | transverse | — |
| Example 9 | Winding up | Cylindrical, one | 50 | Present | — | 0.4 | 0.7 | 0.7 | 1.0 | 1.1 | 19.6 | 227 | 0.4 | 0.7 | 0.7 | 1.0 | 1.1 | 19.6 | 227 | 0.0 | 0.0 | 2,900 | transverse | — |
| Example 10 | Winding up | Cylindrical, one | 250 | Present | — | 0.4 | 0.7 | 0.7 | 1.0 | 1.1 | 490.6 | 55 | 0.4 | 0.7 | 0.7 | 1.0 | 1.1 | 490.6 | 55 | 0.0 | 0.0 | 2,900 | transverse | — |
| Example 11 | Winding up | Cylindrical, one | 100 | Present | — | 0.4 | 0.7 | 0.7 | 1.0 | 1.1 | 78.5 | 125 | 1.0 | 1.5 | 2.0 | 1.6 | 1.8 | 78.5 | 122 | 0.0 | −2.4 | 2,900 | transverse | — |
| Example 12 | Winding up | Cylindrical, one | 100 | Present | — | 0.4 | 0.7 | 0.7 | 1.0 | 1.1 | 78.5 | 125 | 0.8 | 1.2 | 1.6 | 1.4 | 1.3 | 78.5 | 125 | 0.0 | 0.0 | 2,900 | transverse | upper surface of the roll |
| Example 13 | Winding up | — | — | — | — | — | — | — | — | — | — | — | — | — | — | — | — | — | — | — | — | — | — | — |
| Example 14 | Winding up | — | — | — | — | — | — | — | — | — | — | — | — | — | — | — | — | — | — | — | — | — | — | — |
| Example 15 | Winding up | Cylindrical, one | 100 | Present | — | 0.4 | 0.7 | 0.7 | 1.0 | 1.1 | 78.5 | 133 | 0.4 | 0.7 | 0.7 | 1.0 | 1.1 | 78.5 | 133 | 0.0 | 0.0 | 2,900 | vertical | — |
| Example 16 | Rotation (1,400° C. to 2,800° C.) | — | — | — | — | — | — | — | — | — | — | — | — | — | — | — | — | — | — | — | — | — | — | — |

TABLE 3-continued

| | | Graphitization step Heat treatment 2 | | | | | | | | | | | | | | | | | | | | | | |
|---|---|---|---|---|---|---|---|---|---|---|---|---|---|---|---|---|---|---|---|---|---|---|---|---|
| | | Internal core | | Winding up step | | States of film and internal core before the heat treatment | | | | | | | States of film and internal core after the heat treatment | | | | | | | | | | | |
| | Operation | Type and number | Internal core diameter mm | Before the heat treatment | During the heat treatment | a — | b — | c mm | d — | e — | f $cm^2$ | g round | a — | b — | c mm | d — | e — | f $cm^2$ | g round | f rate of change % | g rate of change % | Maximum temperature ° C. | Vertical placement or transverse placement | Fixed at the outer-most layer of film |
| Example 17 | Rotation (1,400° C. to 2,200° C.) | — | — | — | — | — | — | — | — | — | — | — | — | — | — | — | — | — | — | — | — | — | — | — |
| Example 18 | Division by own weight | — | — | — | — | — | — | — | — | — | — | — | — | — | — | — | — | — | — | — | — | — | — | — |
| Example 19 | Division by pressing in of tapered stick | — | — | — | — | — | — | — | — | — | — | — | — | — | — | — | — | — | — | — | — | — | — | — |
| Example 20 | Application of pressure to one outermost layer | — | — | — | — | — | — | — | — | — | — | — | — | — | — | — | — | — | — | — | — | — | — | — |
| Example 21 | Application of pressure from lateral face of roll | — | — | — | — | — | — | — | — | — | — | — | — | — | — | — | — | — | — | — | — | — | — | — |
| Example 22 | Application of pressure from upper surface of roll | — | — | — | — | — | — | — | — | — | — | — | — | — | — | — | — | — | — | — | — | — | — | — |
| Example 23 | Application of pressure from lateral face of roll | — | — | — | — | — | — | — | — | — | — | — | — | — | — | — | — | — | — | — | — | — | — | — |
| Example 24 | Division by own weight + application of pressure from upper surface of roll | — | — | — | — | — | — | — | — | — | — | — | — | — | — | — | — | — | — | — | — | — | — | — |
| Example 25 | Division by own weight + application of pressure from upper surface of roll | — | — | — | — | — | — | — | — | — | — | — | — | — | — | — | — | — | — | — | — | — | — | — |

TABLE 3-continued

| | | Graphitization step Heat treatment 2 | | | | | | | | | | | | | | | | | | | | | | |
|---|---|---|---|---|---|---|---|---|---|---|---|---|---|---|---|---|---|---|---|---|---|---|---|---|
| | | Internal core | | Winding up step | | States of film and internal core before the heat treatment | | | | | | | States of film and internal core after the heat treatment | | | | | | | | | | | |
| | Operation | Type and number | Internal core diameter mm | Before the heat treatment | During the heat treatment | a — | b — | c mm | d — | e — | f $cm^2$ | g round | a — | b — | c mm | d — | e — | f $cm^2$ | g round | f rate of change % | g rate of change % | Maximum temperature ° C. | Vertical placement or transverse placement | Fixed at the outer-most layer of film |
| Example 26 | Division by own weight + application of pressure from upper surface of roll | — | — | — | — | — | — | — | — | — | — | — | — | — | — | — | — | — | — | — | — | — | — | — |
| Example 27 | Division by own weight + application of pressure from upper surface of roll | — | — | — | — | — | — | — | — | — | — | — | — | — | — | — | — | — | — | — | — | — | — | — |
| Example 28 | Winding up | Cylindrical, one | 150 | Present | — | 0.4 | 0.7 | 0.7 | 1.0 | 1.1 | 176.6 | 37 | 0.4 | 0.7 | 0.7 | 1.0 | 1.1 | 176.6 | 37 | 0.0 | 0.0 | 2,800 | transverse | — |
| Example 29 | Division by own weight + application of pressure from upper surface of roll | — | — | — | — | — | — | — | — | — | — | — | — | — | — | — | — | — | — | — | — | — | — | — |
| Comparative Example 1 | Nothing, transversely placed | — | — | — | — | — | — | — | — | — | — | — | — | — | — | — | — | — | — | — | — | — | — | — |
| Comparative Example 2 | Triple rolling | — | — | — | — | — | — | — | — | — | — | — | — | — | — | — | — | — | — | — | — | — | — | — |
| Comparative Example 3 | Internal cylinder having an external diameter of 250 mm | — | — | — | — | — | — | — | — | — | — | — | — | — | — | — | — | — | — | — | — | — | — | — |
| Comparative Example 4 | Internal cylinder having an external diameter of 250 mm | — | — | — | — | — | — | — | — | — | — | — | — | — | — | — | — | — | — | — | — | — | — | — |

TABLE 3-continued

| | | Graphitization step Heat treatment 2 | | | | | | | | | | | | | | | | | | | | | | |
|---|---|---|---|---|---|---|---|---|---|---|---|---|---|---|---|---|---|---|---|---|---|---|---|---|
| | | Internal core | | Winding up step | | | | | | | | | | | | | | | | | | | Vertical | Fixed at the |
| | | | Internal core | Before the | During the | States of film and internal core before the heat treatment | | | | | | | States of film and internal core after the heat treatment | | | | | | | f rate of | g rate of | Maximum | placement or | outer-most |
| | Operation | Type and number | diameter mm | heat treatment | heat treatment | a — | b — | c mm | d — | e — | f $cm^2$ | g round | a — | b — | c mm | d — | e — | f $cm^2$ | g round | change % | change % | temperature ° C. | transverse placement | layer of film |
| Comparative Example 5 | Internal cylinder having an external diameter of 150 mm | — | — | — | — | — | — | — | — | — | — | — | — | — | — | — | — | — | — | — | — | — | — | — |

TABLE 4

| | | | Physical properties of graphite film | | | | | | | | | | | | | | |
|---|---|---|---|---|---|---|---|---|---|---|---|---|---|---|---|---|---|
| | | | Size | | | Thickness | | | Flatness, JIS C2151 | | | | | | | | |
| | Operation | Compression treatment | Width $U_{gs}$ mm | Area $m^2$ | Area ratio to material | Thickness µm | Unevenness of the thickness | Breakage of graphite film | Camber $R_{gs}$ mm | $R_{gs}$ at 100 mm away from the end mm | Sag $Z_{gs}$ mm | $Z_{gs}/U_{gs}$ mm/mm | Evaluation | Peculiar winding elimination | Weight $W_{gs}/T_{pi}$ g/µm | Flex resistance time | Thermal diffusivity $cm^2/s$ |
| Example 1 | Winding up | Present | 450 | 20.25 | 0.81 | 25 | A | A | <5 | <5 | 40 | 0.089 | A | B | 0.91 | ≥5,000 | 8.4 |
| Example 2 | Winding up | Present | 450 | 20.25 | 0.81 | 25 | B | A | <5 | 35 | 90 | 0.200 | C | B | 0.93 | ≥5,000 | 8.3 |
| Example 3 | Winding up | Present | 450 | 20.25 | 0.81 | 25 | B | A | <5 | 40 | 95 | 0.211 | C | B | 0.94 | ≥5,000 | 8.2 |
| Example 4 | Winding up | Present | 450 | 20.25 | 0.81 | 10 | A | A | <5 | <5 | 40 | 0.089 | A | B | 0.90 | ≥5,000 | 8.4 |
| Example 5 | Winding up | Present | 450 | 20.25 | 0.81 | 25 | A | A | <5 | <5 | 55 | 0.122 | A | B | 0.91 | ≥5,000 | 8.4 |
| Example 6 | Winding up | Present | 450 | 20.25 | 0.81 | 40 | A | A | <5 | 25 | 80 | 0.178 | B | B | 0.93 | ≥5,000 | 8.3 |
| Example 7 | Winding up | Present | 450 | 20.25 | 0.81 | 25 | B | A | <5 | 15 | 50 | 0.111 | B | B | 0.92 | ≥5,000 | 8.3 |
| Example 8 | Winding up | Present | 450 | 20.25 | 0.81 | 25 | B | A | <5 | 35 | 95 | 0.211 | C | B | 0.93 | ≥5,000 | 8.2 |
| Example 9 | Winding up | Present | 450 | 20.25 | 0.81 | 25 | C | A | <5 | 25 | 55 | 0.122 | B | B | 0.93 | ≥5,000 | 8.3 |
| Example 10 | Winding up | Present | 450 | 20.25 | 0.81 | 25 | A | A | <5 | <5 | 40 | 0.089 | A | B | 0.91 | ≥5,000 | 8.4 |
| Example 11 | Winding up | Present | 450 | 20.25 | 0.81 | 25 | B | A | <5 | 40 | 70 | 0.156 | C to B | B | 0.93 | ≥5,000 | 8.3 |
| Example 12 | Winding up | Present | 450 | 20.25 | 0.81 | 25 | B | A | <5 | 25 | 65 | 0.144 | B | B | 0.93 | ≥5,000 | 8.3 |
| Example 13 | Winding up | Present | 450 | 20.25 | 0.81 | 25 | C | A | <5 | 40 | 95 | 0.211 | D to C | B | 0.94 | ≥5,000 | 8.2 |
| Example 14 | Winding up | Present | 225 | 10.13 | 0.81 | 25 | C | A | 25 | 30 | 50 | 0.222 | C | B | 0.93 | ≥5,000 | 8.2 |
| Example 15 | Winding up | Present | 225 | 10.13 | 0.81 | 25 | A | A | 15 | 20 | 30 | 0.133 | A | B | 0.91 | ≥5,000 | 8.4 |
| Example 16 | Rotation (1,400° C. to 2,800° C.) | Present | 450 | 20.25 | 0.81 | 25 | A | B | <5 | <5 | 45 | 0.100 | A | B | 0.91 | ≥5,000 | 8.4 |
| Example 17 | Rotation (1,400° C. to 2,200° C.) | Present | 450 | 20.25 | 0.81 | 25 | B | B | <5 | 15 | 60 | 0.133 | B | B | 0.93 | ≥5,000 | 8.3 |
| Example 18 | Division by own weight | Present | 450 | 20.25 | 0.81 | 25 | C | A | <5 | 35 | 90 | 0.200 | C | B | 0.94 | ≥5,000 | 8.2 |
| Example 19 | Division by pressing in of tapered stick | Present | 450 | 20.25 | 0.81 | 25 | C | C | <5 | 40 | 95 | 0.211 | C | B | 0.94 | ≥5,000 | 8.2 |
| Example 20 | Application of pressure to one outermost layer | Present | 450 | 20.25 | 0.81 | 25 | C | C | <5 | 30 | 90 | 0.200 | C | B | 0.94 | ≥5,000 | 8.2 |

TABLE 4-continued

| | | | Physical properties of graphite film | | | | | | | | | | | | | | |
|---|---|---|---|---|---|---|---|---|---|---|---|---|---|---|---|---|---|
| | | | Size | | | Thickness | | | Flatness: JIS C2151 | | | | | | | | |
| | Operation | Compression treatment | Width $U_{gs}$ mm | Area $m^2$ | Area ratio to material | Thickness μm | Unevenness of the thickness | Breakage of graphite film | Camber $R_{gs}$ mm | $R_{gs}$ at 100 mm away from the end mm | Sag $Z_{gs}$ mm | $Z_{gs}/U_{gs}$ mm/mm | Evaluation | Peculiar winding elimination | Weight $W_{gs}/T_{pi}$ g/μm | Flex resistance time | Thermal diffusivity $cm^2/s$ |
| Example 21 | Application of pressure from lateral face of roll | Present | 450 | 20.25 | 0.81 | 25 | C | A | <5 | 25 | 85 | 0.189 | C to B | B | 0.93 | ≥5,000 | 8.3 |
| Example 22 | Application of pressure from upper surface of roll | Present | 450 | 20.25 | 0.81 | 25 | C | A | <5 | 20 | 80 | 0.178 | B | B | 0.94 | ≥5,000 | 8.3 |
| Example 23 | Application of pressure from lateral face of roll | Present | 225 | 10.13 | 0.81 | 25 | C | A | 20 | 25 | 50 | 0.222 | C to B | B | 0.93 | ≥5,000 | 8.3 |
| Example 24 | Division by own weight + application of pressure from upper surface of roll | Present | 450 | 20.25 | 0.81 | 10 | A | A | <5 | <5 | 45 | 0.100 | A | B | 0.90 | ≥5,000 | 8.4 |
| Example 25 | Division by own weight + application of pressure from upper surface of roll | Present | 450 | 20.25 | 0.81 | 25 | A | A | <5 | <5 | 50 | 0.111 | A | B | 0.91 | ≥5,000 | 8.4 |
| Example 26 | Division by own weight + application of pressure from upper surface of roll | Present | 450 | 20.25 | 0.81 | 40 | B | A | <5 | 30 | 85 | 0.189 | B | B | 0.93 | ≥5,000 | 8.3 |
| Example 27 | Division by own weight + application of pressure from upper surface of roll | Present | 450 | 20.25 | 0.81 | 25 | B | A | <5 | 30 | 60 | 0.133 | B | B | 0.92 | ≥5,000 | 8.3 |
| Example 28 | Winding up | Present | 225 | 4.05 | 0.81 | 40 | A | A | <5 | 25 | 45 | 0.200 | B | B | 0.93 | ≥5,000 | 8.3 |
| Example 29 | Division by own weight + application of pressure from upper surface of roll | Present | 225 | 4.05 | 0.81 | 40 | B | A | <5 | 30 | 55 | 0.244 | B | B | 0.93 | ≥5,000 | 8.3 |
| Comparative Example 1 | Nothing, transversely placed | Present | 450 | 20.25 | 0.81 | 25 | C | A | <5 | 45 | 160 | 0.356 | D | B | 1.10 | ≥5,000 | 8.1 |

TABLE 4-continued

| | | | Physical properties of graphite film | | | | | | | | | | | | | | |
|---|---|---|---|---|---|---|---|---|---|---|---|---|---|---|---|---|---|
| | | | Size | | | Thickness | | | Flatness | | | | | | | | |
| | | | | | | | | | JIS C2151 | | | | | | | | |
| | Operation | Com-pression treatment | Width $U_{gs}$ mm | Area $m^2$ | Area ratio to material | Thick-ness μm | Uneven-ness of the thick-ness | Break-age of graphite film | Cam-ber $R_{gs}$ mm | $R_{gs}$ at 100 mm away from the end mm | Sag $Z_{gs}$ mm | $Z_{gs}/U_{gs}$ mm/mm | Evalu-ation | Peculiar winding elimina-tion | Weight $W_{gs}/T_{pi}$ g/μm | Flex resist-ance time | Ther-mal diffus-ivity $cm^2/s$ |
| Comparative Example 2 | Triple rolling | Present | 162 | 0.031 | 0.81 | 25 | C | B | | Unmeasurable due to short length | | | D to C | D | 1.10 | ≥5,000 | 8.0 |
| Comparative Example 3 | Internal cylinder having an external diameter of 250 mm | Present | 225 | 6.075 | 0.81 | 40 | C | A | <5 | 45 | 120 | 0.533 | D to C | B | 1.01 | ≥5,000 | 8.1 |
| Comparative Example 4 | Internal cylinder having an external diameter of 250 mm | Present | 225 | 6.075 | 0.81 | 25 | C | A | <5 | 45 | 100 | 0.444 | D to C | B | 1.01 | ≥5,000 | 8.1 |
| Comparative Example 5 | Internal cylinder having an external diameter of 150 mm | Present | 225 | 4.05 | 0.81 | 40 | C | A | <5 | 40 | 110 | 0.489 | D to C | B | 1.01 | ≥5,000 | 8.1 |

Production conditions and various types of physical properties of the graphite film obtained in Examples and Comparative Examples are summarized in Table 1 to Table 4. Furthermore, various types of parameters listed in Table 2 and Table 3 are shown below, along with their meanings.

$a=w_0/R\times100$ $b=(r_1-r_0)/r_0\times100$ $c=w_n$ $d=(r_{n+1}-r_n)/r_n\times100$ $e=D/(N_h\times d)$ f: apparent cross sectional area of the internal core g: winding number $N_h$ of the heat-treated film rate of change of f rate of change of g=rate of decrease of $N_h$ Example 1

A polyimide film manufactured by Kaneka Corporation (Apical AV) shown in Table 1, having a thickness of 50 μm, a width of 500 mm and a length of 50 m was wrapped around a cylindrical internal core made of graphite having an external diameter of 100 mm and a length of 600 mm, as shown in FIG. 4, and then covered with an external cylinder having an inner diameter of 130 mm. As shown in Table 1, this vessel was transversely set in an electric furnace, and a carbonization treatment was carried out in a nitrogen atmosphere up to a temperature of 1,400° C. The carbonized film thus obtained had a size of 16 $m^2$.

Next, as shown in Table 2, the obtained carbonized film in the form of a roll was wound up around an internal core having an external diameter of 100 mm so as to adjust a=0.3, b=0.6, c=0.5, d=0.9 and e=1.1. The cross sectional area of the internal core, and the winding number of the heat-treated film before the heat treatment were determined. This vessel was transversely set in a graphitization furnace as shown in FIG. 24 (internal core being floated by means of an anchorage), and subjected to heat treatment 1 to a temperature up to 2,900° C. (see Table 2). After cooling to room temperature, the parameters a to e, the rate of change of the cross sectional area of the internal core, and the rate of change of the winding number of the heat-treated film after heat treatment 1 were determined.

Additionally, as shown in Table 3, the heat-treated film obtained by heat treatment 1 was again wound up around an internal core having an external diameter of 100 mm so as to adjust a=0.4, b=0.7, c=0.7, d=1.0 and e=1.1. The cross sectional area of the internal core, and the winding number of the heat-treated film before the heat treatment were determined. The vessel was again transversely set in a graphite furnace, and subjected to heat treatment 2 shown in Table 3 to a temperature of 2,900° C. After cooling to room temperature, the parameters a to e, the rate of change of the cross sectional area of the internal core, and the rate of change of the winding number of the heat-treated film after heat treatment 2 were determined.

As shown in Table 4, the obtained heat-treated film was subjected to a compression treatment (applying a load of 80 $kgf/cm^2$ in a thickness direction to push with a pressing machine), thereby obtaining a graphite film having a thickness of 25 μm, and an area of 20.25 $m^2$. Various types of physical properties of the obtained graphite film are listed in Table 4 and Table 5.

TABLE 5

| Measurement item | Unit | Measured Value |
|---|---|---|
| Thermal diffusivity | $cm^2/s$ | 8.4 |
| Thermal conductivity | W/mK | 1,300 |
| Tensile strength | MPa | 100 |
| Electric conductivity | S/cm | 13,600 |
| Folding endurance test | time | ≥5,000 |

Example 2

A graphite film was obtained by carrying out a treatment similarly to Example 1 under conditions shown in Tables 1 to 4 except that the degree of winding up upon heat treatment 2 was decreased (thereby providing with parameters a to f being greater). Physical properties of the obtained graphite film are shown in Table 4.

Example 3

A graphite film was obtained by charring out a treatment similarly to Example 1 under conditions shown in Tables 1 to 4 except that the degree of winding up upon heat treatment 2 was further decreased as compared with Example 2 (thereby providing with still greater parameters a to f). Physical properties of the obtained graphite film are shown in Table 4.

Example 4

A graphite film was obtained by carrying out a treatment similarly to Example 1 under conditions shown in Tables 1 to 4 except that a polyimide film manufactured by Kaneka Corporation (Apical NPI) having a thickness of 25 μm was used as the polyimide film and that the highest temperature in heat treatment 1 was 2,700° C. Physical properties of the obtained graphite film are shown in Table 4.

Example 5

A graphite film was obtained by carrying out a treatment similarly to Example 1 under conditions shown in Tables 1 to 4 except that the highest temperature in heat treatment 1 was 2,700° C. Physical properties of the obtained graphite film are shown in Table 4.

Example 6

A graphite film was obtained by carrying out a treatment similarly to Example 1 under conditions shown in Tables 1 to 4 except that a polyimide film manufactured by Kaneka Corporation (Apical AV) having a thickness of 75 μm was used as the polyimide film. Physical properties of the obtained graphite film are shown in Table 4.

Example 7

A graphite film was obtained by carrying out a treatment similarly to Example 5 under conditions shown in Tables 1 to 4 except that the carbonized film was wrapped around the internal core without winding up the same. Physical properties of the obtained graphite film are shown in Table 4.

Example 8

A graphite film was obtained by carrying out a treatment similarly to Example 5 except that the polyimide film shown in Table 1 was used, and that the degree of winding up upon heat treatment 2 was decreased (thereby providing with great parameters a to f) similarly to Example 2. Physical properties of the obtained graphite film are shown in Table 4.

Example 9

A graphite film was obtained by carrying out a treatment similarly to Example 5 under conditions shown in Tables 1 to 4 except that the diameter of the internal core was 50 mm. Physical properties of the obtained graphite film are shown in Table 4.

Example 10

A graphite film was obtained by carrying out a treatment similarly to Example 1 under conditions shown in Tables 1 to 4 except that: the highest temperature in carbonization was 1,000° C., the diameter of the internal core used in carbonization was 250 mm; and the diameter of the internal core used in the heat treatments 1 and 2 was 250 mm. Physical properties of the obtained graphite film are shown in Table 4.

Example 11

A graphite film was obtained by carrying out a treatment similarly to Example 5 under conditions shown in Tables 1 to 4 except that the highest temperature in heat treatment 1 was 2,200° C. Physical properties of the obtained graphite film are shown in Table 4.

Example 12

Figure 28:
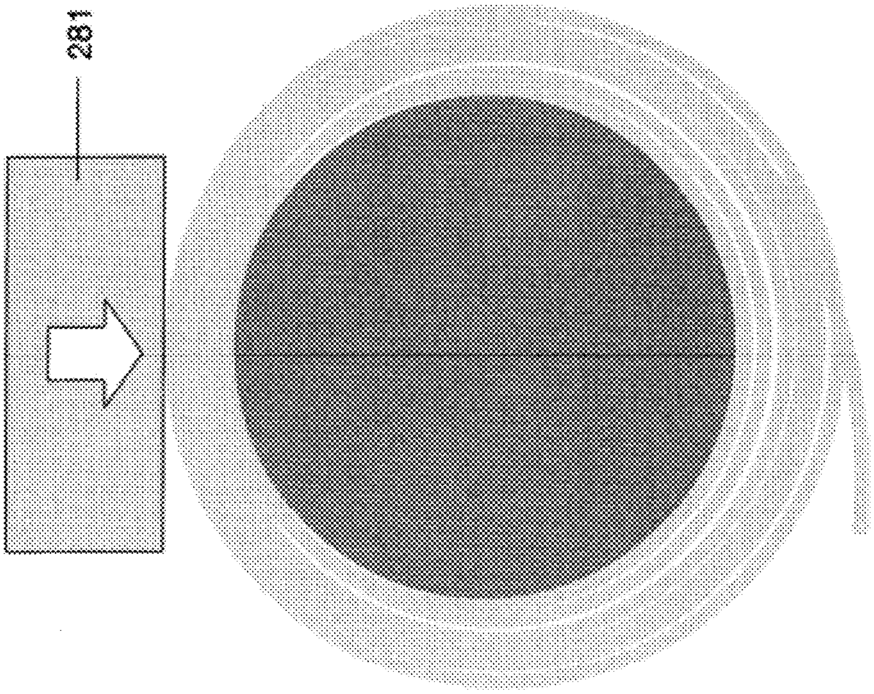
FIG. 28 shows a lateral view illustrating the case in which the upper face of a film wrapped around an internal core is fixed by a weight.

A graphite film was obtained by carrying out a treatment similarly to Example 11 under conditions shown in Tables 1 to 4 except that the vessel was transversely set in the graphite furnace, and further heat treatment 2 was carried out with a weight of 500 g placed on the upper surface of the roll as shown in FIG. 28. Physical properties of the obtained graphite film are shown in Table 4.

Example 13

A graphite film was obtained by carrying out a treatment similarly to Example 1 under conditions shown in Tables 1, 2 and 4 except that heat treatment 2 was not carried out. Physical properties of the obtained graphite film are shown in Table 4.

Example 14

A graphite film was obtained by carrying out a treatment similarly to Example 1 under conditions shown in Tables 1, 2 and 4 except that the vessel including the carbonized film wound up was vertically set in the graphitization furnace, and that heat treatment 2 was not carried out. Physical properties of the obtained graphite film are shown in Table 4.

Example 15

A graphite film was obtained by carrying out a treatment similarly to Example 5 under conditions shown in Tables 1 to 4 except that carbonized film in the form of a roll was vertically set without using the internal core in heat treatment 1, and the vessel including the film wound up was vertically set in heat treatment 2. Physical properties of the obtained graphite film are shown in Table 4.

Example 16

A graphite film was obtained by carrying out a treatment similarly to Example 1 under conditions shown in Tables 1, 2 and 4 except that in order to eliminate loosening of the film the vessel was rotated from outside the furnace at a 5 rpm within the temperature range of 1,400 to 2,800° C. but was not rotated at 2,800 to 2,900° C. in heat treatment 1, and heat treatment 2 was not carried out. Physical properties of the obtained graphite film are shown in Table 4.

Example 17

A graphite film was obtained by carrying out a treatment similarly to Example 1 under conditions shown in Tables 1, 2 and 4 except that in order to eliminate loosening of the film the vessel was rotated from outside the furnace at a 5 rpm within the temperature range of 1,400 to 2,200° C. but was not rotated at 2,200 to 2,900° C. in heat treatment 1, and heat treatment 2 was not carried out. Physical properties of the obtained graphite film are shown in Table 4.

Example 18

A graphite film was obtained by carrying out a treatment similarly to Example 1 under conditions shown in Tables 1, 2 and 4 except that as shown in FIG. 14, the heat treatment was carried out in heat treatment 1 using an internal core 51 having two lengthwise split members 161 and 162 provided by dividing into two portions, with the upper lengthwise split member 161 being fixed by supporting, whereas the lower lengthwise split member 162 being kept free, and that heat treatment 2 was not carried out. Physical properties of the obtained graphite film are shown in Table 4.

Example 19

A graphite film was obtained by carrying out a treatment similarly to Example 1 under conditions shown in Tables 1, 2 and 4 except that as shown in FIG. 13, an internal core composed of two lengthwise split members 151 and 152 provided by dividing into two portions was used in heat treatment 1, and a tapered stick 153 as shown in FIG. 13 was gradually pressed in between the two lengthwise split members 151 and 152 from the outside the furnace to permit separation in the heat treatment, and that heat treatment 2 was not carried out. Physical properties of the obtained graphite film are shown in Table 4.

Example 20

Figure 26:
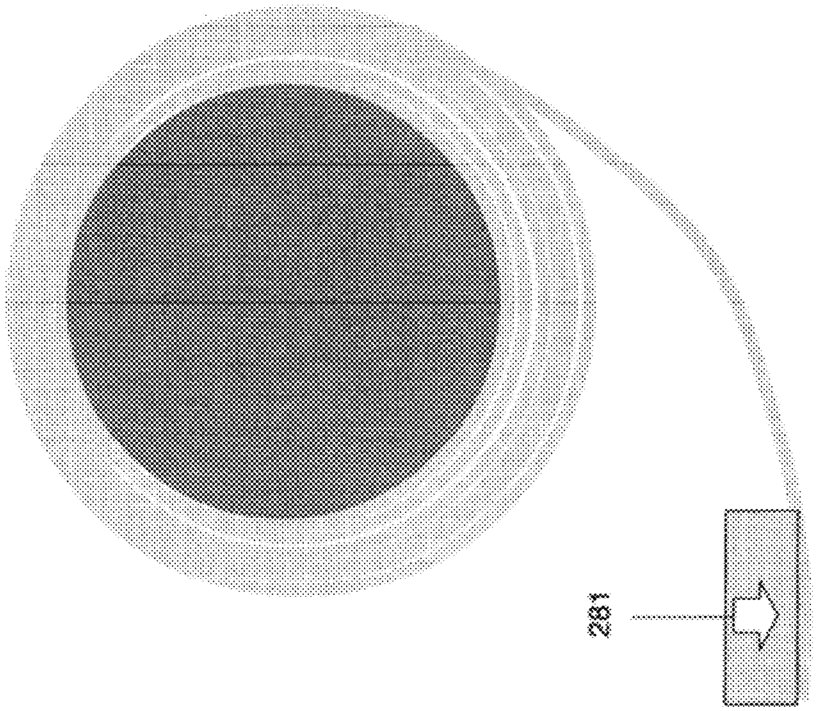
FIG. 26 shows a lateral view illustrating the case in which an outermost layer of a heat-treated film is fixed by a weight.

A graphite film was obtained by carrying out a treatment similarly to Example 1 under conditions shown in Tables 1, 2 and 4 except that as shown in FIG. 26, the outermost one layer of the film was wound off and the treatment was carried out while applying pressure with a weight 281 on only the outermost one layer of the film by placing a 500-g weight thereon in heat treatment 1, and heat treatment 2 was not carried out. Physical properties of the obtained graphite film are shown in Table 4.

Example 21

Figure 27:
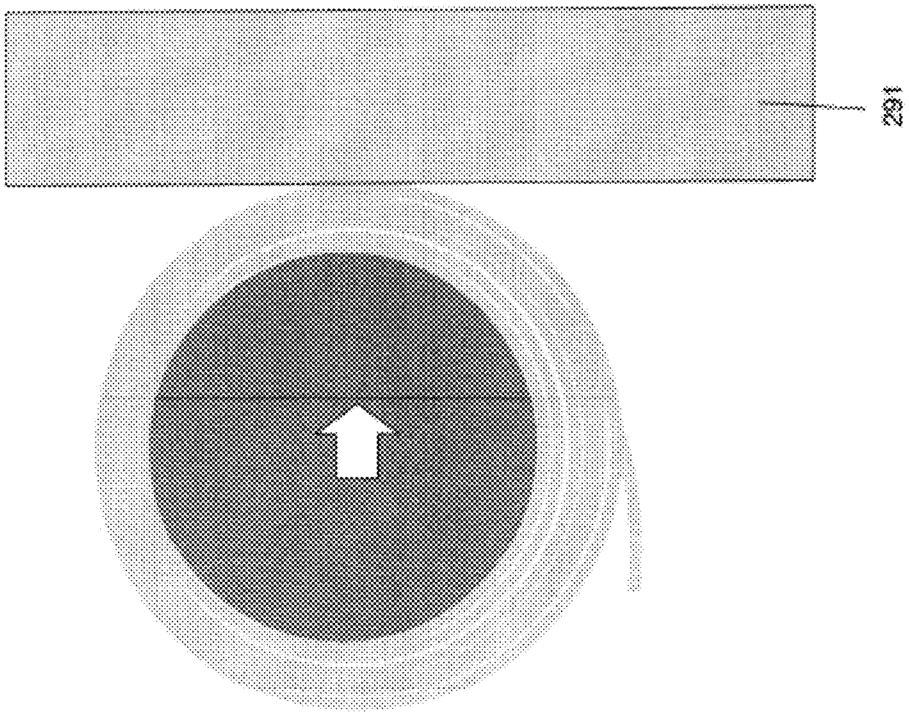
FIG. 27 shows a lateral view illustrating the case in which a film wrapped around an internal core is fixed by pressing against a wall.

A graphite film was obtained by carrying out a treatment similarly to Example 1 under conditions shown in Tables 1, 2 and 4 except that as shown in FIG. 27, the heat treatment was carried out with the lateral face of the roll pressed against a wall 291 in heat treatment 1, and heat treatment 2 was not carried out. Physical properties of the obtained graphite film are shown in Table 4.

Example 22

A graphite film was obtained by carrying out a treatment similarly to Example 1 under conditions shown in Tables 1, 2 and 4 except that as shown in FIG. 28, heat treatment 1 was carried out while a 500-g weight 281 was placed on the upper surface of the roll, and heat treatment 2 was not carried out. Physical properties of the obtained graphite film are shown in Table 4.

Example 23

A graphite film was obtained by carrying out a treatment similarly to Example 1 under conditions shown in Tables 1, 2 and 4 except that the vessel including the film wound up was vertically set in heat treatment 1, and as shown in FIG. 27, the heat treatment was carried out while the lateral face of the roll was pressed against the wall 291, and heat treatment 2 was not carried out. Physical properties of the obtained graphite film are shown in Table 4.

Example 24

A graphite film was obtained by carrying out a treatment similarly to Example 1 under conditions shown in Tables 1, 2 and 4 except that as shown in FIG. 14, the heat treatment was carried out in heat treatment 1 using an internal core having two lengthwise split members provided by dividing into two portions, with an upper lengthwise split member being fixed by supporting, whereas another lower lengthwise split member being kept free and further as shown in FIG. 28, a 500-g weight 281 being placed on the upper surface of the roll, and that heat treatment 2 was not carried out. Physical properties of the obtained graphite film are shown in Table 4.

Example 25

A graphite film was obtained similarly to Example 24 under conditions shown in Tables 1, 2 and 4. Physical properties of the obtained graphite film are shown in Table 4.

Example 26

A graphite film was obtained similarly to Example 24 under conditions shown in Tables 1, 2 and 4. Physical properties of the obtained graphite film are shown in Table 4.

Example 27

A graphite film was obtained by carrying out a treatment similarly to Example 1 under conditions shown in Tables 1, 2 and 4 except that as shown in FIG. 14, the heat treatment was carried out in heat treatment 1 using an internal core having two lengthwise split members provided by dividing into two portions, which was set in the furnace without winding up of the carbonized film, with an upper lengthwise split member being fixed by supporting, whereas another lower lengthwise split member being kept free and further as shown in FIG. 28, a 500-g weight 281 being placed on the upper surface of the roll, and that heat treatment 2 was not carried out. Physical properties of the obtained graphite film are shown in Table 4.

Example 28

A graphite film was obtained by carrying out a treatment similarly to Example 1 under conditions shown in Tables 1 to 4. Physical properties of the obtained graphite film are shown in Table 4.

Example 29

A graphite film was obtained similarly to Example 24 under conditions shown in Tables 1, 2 and 4. Physical properties of the obtained graphite film are shown in Table 4.

Comparative Examples 1 to 5

Graphite films were obtained by carrying out a treatment similarly to Example 1 under conditions shown in Tables 1, 2 and 4 except that the carbonized film was wrapped around the internal core without winding up of the film, and heat treatment 2 was not carried out. Physical properties of the obtained graphite film are shown in Table 4.

<Evaluation Results>

(Case Including Heat Treatment Step in which ($w_0/r_0 \times 100$) is Maintained to be not Greater than 7)

Amelioration of ruffling of the graphite film was compared between those found in Examples 1 to 19 and 24 to 29 including a heat treatment in which ($w_0/r_0 \times 100$) was maintained to be not greater than 7, and those found in Comparative Examples 1 to 5 not including a heat treatment in which ($w_0/r_0 \times 100$) was maintained to be not greater than 7. The sag $Z_{gs}$ of the graphite film obtained in Examples 1 to 19 and 24 to 29 as determined by a method in accordance with windability evaluation of a film (JIS C2151) was less than 100 mm, whereas $Z_{gs}$ of Comparative Examples 1 and 3 to 5 was not less than 100 mm. Thus, it was proven that ruffling of the graphite film can be ameliorated when a heat treatment step in which ($w_0/r_0 \times 100$) is maintained to be not greater than 7 is included. Similar results were shown for the camber $R_{gs}$.

The amelioration of ruffling is considered to result from close contact between the layers of the film since the heat treatment was carried out in Examples 1 to 19 and 24 to 29 in a state with a small space between the internal core and the film as shown in FIG. 3, thereby enabling deformation of the film to be suppressed and the heat history in the longitudinal direction and width direction of the film to be uniform, and thus a degree of freedom of deformation of the film decreased as occurrence of friction was avoided between the film and the internal core, and/or between layers of the film.

Actual methods employed for achieving the heat treatment step in which ($w_0/r_0 \times 100$) was maintained to be not greater than 7 involved: a method including carrying out a winding up step as in Examples 1 to 15, 28; a method including carrying out the heat treatment while winding the heat-treated film during the heat treatment as in Examples 16 to 17; and a method including enlarging the internal core to meet the extension of the film as in Examples 18 to 19, 24 to 27, and 29.

Although there are a variety of methods for maintaining ($w_0/r_0 \times 100$) to be not greater than 7, a graphite film accompanied by ameliorated ruffling can be obtained by carrying out a heat treatment while ($w_0/r_0 \times 100$) is maintained to be not greater than 7 as in Examples 1 to 19, and 24 to 29.

(Case Including Heat Treatment Step in which $w_n$ is Maintained to be not Greater than 5 mm)

Amelioration of ruffling of the graphite film was compared between those found in Examples 1 to 17 and 20 to 29 including a heat treatment in which $w_n$ was maintained to be not greater than 5 mm, and those found in Comparative Examples 1 to 5 not including a heat treatment in which $w_n$ was maintained to be not greater than 5 mm. The sag $Z_{gs}$ of the graphite film obtained in Examples 1 to 17 and 20 to 29 as determined by a method in accordance with windability evaluation of a film (JIS C2151) was less than 100 mm, whereas $Z_{gs}$ of Comparative Examples 1 and 3 to 5 was not less than 100 mm. Thus, it was proven that ruffling of the graphite film can be ameliorated when a heat treatment step in which $w_n$ is maintained to be not greater than 5 mm is included. Similar results were shown for the camber $R_{gs}$.

Enabling deformation of the film to be suppressed is considered to result from close contact between the layers of the film since the heat treatment was carried out in Examples 1 to 17 and 20 to 29 in a state with a small space between the layers of the film as shown in FIG. 3.

Actual methods employed for achieving the heat treatment step in which $w_n$ was maintained to be not greater than 5 mm involved: a method including carrying out a winding up step as in Examples 1 to 15, 28; a method including carrying out the heat treatment while winding the heat-treated film during the heat treatment as in Examples 16 to 17; and a method including fixing the outermost layer of the film to suppress loosening of the film as in Examples 20 to 27, and 29.

Although there are a variety of methods for maintaining $w_n$ to be not greater than 5 mm, a graphite film accompanied by ameliorated ruffling can be obtained by carrying out a heat treatment while $w_n$ is maintained to be not greater than 5 mm as in Examples 1 to 17, and 20 to 29.

(Case Including Heat Treatment Step in which $((r_1-r_0)/r_0\times 100)$ is Maintained to be not Greater than 8)

Amelioration of ruffling of the graphite film was compared between those found in Examples 1 to 19 and 24 to 29 including a heat treatment in which $((r_1-r_0)/r_0\times 100$, wherein, $r_g$ is the length of the outer periphery of the internal core) was maintained to be not greater than 8, and those found in Comparative Examples 1 to 5 not including a heat treatment in which $((r_1-r_0)/r_0\times 100)$ was maintained to be not greater than 8. The sag $Z_{gs}$ of the graphite film obtained in Examples 1 to 19 and 24 to 29 as determined by a method in accordance with windability evaluation of a film (JIS C2151) was less than 100 mm, whereas $Z_{gs}$ of Comparative Examples 1 and 3 to 5 was not less than 100 mm. Thus, it was proven that ruffling of the graphite film can be ameliorated when a heat treatment step in which $((r_1-r_0)/r_0\times 100)$ is maintained to be not greater than 8 is included. Similar results were shown for the camber $R_{gs}$.

The amelioration of ruffling is considered to result from the heat treatment carried out in Examples 1 to 19 and 24 to 29 in a state with a small space between the internal core and the film as shown in FIG. 3.

Actual methods employed for achieving the heat treatment step in which $((r_1-r_0)/r_0\times 100)$ was maintained to be not greater than 8 involved: a method including carrying out a winding up step as in Examples 1 to 15, 28; a method including carrying out the heat treatment while winding the heat-treated film during the heat treatment as in Examples 16 to 17; and a method including enlarging the internal core to meet the extension of the film as in Examples 18 to 19, 24 to 27, and 29.

Although there are a variety of methods for maintaining $((r_1-r_0)/r_0\times 100)$ to be not greater than 8, enabling deformation of the film to be suppressed is considered to result from bringing the film layers into close contact by carrying out a heat treatment while $((r_1-r_0)/r_0\times 100)$ is maintained to be not greater than 8 as in Examples 1 to 19, and 24 to 29.

(Case Including Heat Treatment Step in which $((r_{n+1}-r_n)/r_n\times 100)$ is Maintained to be not Greater than 8)

Amelioration of ruffling of the graphite film was compared between those found in Examples 1 to 17 and 20 to 29 including a heat treatment in which $((r_{n+1}-r_n)/r_n\times 100$, wherein n is a nonnegative integer) was maintained to be not greater than 8, and those found in Comparative Examples 1 to 5 not including a heat treatment in which $((r_{n+1}-r_n)/r_n\times 100)$ was maintained to be not greater than 8. The sag $Z_{gs}$ of the graphite film obtained in Examples 1 to 17 and 20 to 29 as determined by a method in accordance with windability evaluation of a film (JIS C2151) was less than 100 mm, whereas $Z_{gs}$ of Comparative Examples 1 and 3 to 5 was not less than 100 mm. Thus, it was proven that ruffling of the graphite film can be ameliorated when a heat treatment step in which $((r_{n+1}-r_n)/r_n\times 100)$ is maintained to be not greater than 8 is included. Similar results were shown for the camber $R_{gs}$.

Enabling deformation of the film to be suppressed is considered to result from close contact between the layers of the film since the heat treatment was carried out in Examples 1 to 17 and 20 to 29 in a state with a small space between the layers of the film as shown in FIG. 3.

Actual methods employed for achieving the heat treatment step in which $((r_{n+1}-r_n)/r_n\times 100)$ was maintained to be not greater than 8 involved: a method including carrying out a winding up step as in Examples 1 to 15, 28; a method including carrying out the heat treatment while winding the heat-treated film during the heat treatment as in Examples 16 to 17; and a method including fixing the outermost layer of the film to suppress loosening of the film as in Examples 20 to 27, and 29.

Although there are a variety of methods for maintaining $((r_{n+1}-r_n)/r_n\times 100)$ to be not greater than 8, a graphite film accompanied by ameliorated ruffling can be obtained by carrying out a heat treatment while $((r_{n+1}-r_n)/r_n\times 100)$ is maintained to be not greater than 8 as in Examples 1 to 17, and 20 to 29.

(Case Including Heat Treatment Step in which $(D/(N_h\times D))$ is Maintained to be not Less than 1 and not Greater than 2.5)

Amelioration of ruffling of the graphite film was compared between those found in Examples 1 to 17 and 20 to 29 including a heat treatment in which $(D/(N_h\times d))$ was maintained to be not less than 1 and not greater than 2.5, and those found in Comparative Examples 1 to 5 not including a heat treatment in which $(D/(N_h\times d))$ was maintained to be not less than 1 and not greater than 2.5. The sag $Z_{gs}$ of the graphite film obtained in Examples 1 to 17 and 20 to 29 as determined by a method in accordance with windability evaluation of a film (JIS C2151) was less than 100 mm, whereas $Z_{gs}$ of Comparative Examples 1 and 3 to 5 was not less than 100 mm. Thus, it was proven that ruffling of the graphite film can be ameliorated when a heat treatment step in which $(D/(N_h\times d))$ is maintained to be not less than 1 and not greater than 2.5 is included. Similar results were shown for the camber $R_{gs}$.

The amelioration of ruffling is considered to result from the heat treatment carried out in Examples 1 to 17 and 20 to 29 in a state with a small space between the layers of the film as shown in FIG. 3.

Actual methods employed for achieving the heat treatment step in which $(D/(N_h\times d))$ was maintained to be not less than 1 and not greater than 2.5 involved: a method including carrying out a winding up step as in Examples 1 to 15, 28; a method including carrying out the heat treatment while winding the heat-treated film during the heat treatment as in Examples 16 to 17; and a method including fixing the outermost layer of the film to suppress loosening of the film as in Examples 20 to 27, and 29.

Although there are a variety of methods for maintaining $(D/(N_h\times d))$ to be not less than 1 and not greater than 2.5, a graphite film accompanied by ameliorated ruffling can be obtained by carrying out a heat treatment while $(D/(N_h\times d))$ is maintained to be not less than 1 and not greater than 2.5 as in Examples 1 to 17, and 20 to 29.

(Case Including Heat Treatment Step in which Apparent Cross Sectional Area of the Internal Core is Increased by not Less than 7%)

Amelioration of ruffling of the graphite film was compared between those found in Examples 18 to 19, 24 to 27, and 29 including a heat treatment in which an apparent cross sectional area of the internal core was increased by not less than 7%, and those found in Comparative Examples 1 to 5 not including a heat treatment in which an apparent an cross sectional area of the internal core was increased by not less than 7%. The sag $Z_{gs}$ of the graphite film obtained in Examples 18 to 19, 24 to 27, and 29 as determined by a method in accordance with windability evaluation of a film (JIS C2151) was less than 100 mm, whereas $Z_{gs}$ of Comparative Examples 1 and 3 to 5 was not less than 100 mm. Thus, it was proven that ruffling of the graphite film can be ameliorated when a heat treatment step in which an apparent cross sectional area of the internal core is increased by not less than 7% is included. Similar results were shown for the camber $R_{gs}$.

The amelioration of ruffling is considered to result from close contact between the layers of the film since the space between the internal core and the film as shown in FIG. 3 was filled in as the apparent cross sectional area of the internal core increased in Examples 18 to 19, 24 to 27, and 29, thereby enabling deformation of the film to be suppressed.

An actual method employed for achieving the heat treatment step in which an apparent cross sectional area of the internal core increased by not less than 7% involved a method including using an internal core divided into a plurality of lengthwise split members, and broadening the space between the lengthwise split members to meet the extension of the film as in Examples 18 to 19, 24 to 27, and 29.

Although there seems to be a variety of methods for increasing an apparent cross sectional area of the internal core by not less than 7%, a graphite film accompanied by ameliorated ruffling can be obtained by carrying out a heat treatment with increase in the apparent cross sectional area of the internal core by not less than 7% as in Examples 18 to 19, 24 to 27, and 29.

Figure 31:
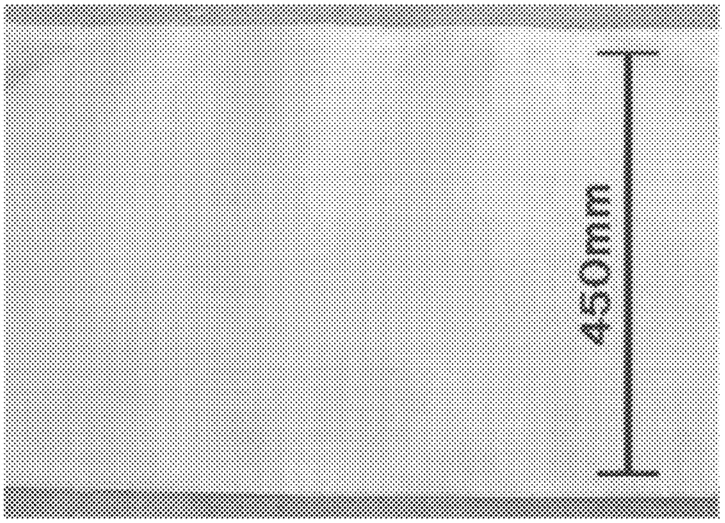
FIG. 31 shows (a) an overview photograph illustrating the graphite film obtained in Example 18, and (b) an overview photograph illustrating the graphite film obtained in Comparative Example 1.
Figure 31:

In FIGS. 31 (*a*) and (*b*), overview photographs illustrating the graphite films obtained in Example 18 and Comparative Example 1 are shown, respectively. FIG. 31 clearly indicates amelioration of ruffling by increase in the apparent cross sectional area of the internal core.

(Embodiments of Division of Internal Core)

Examples 18 and 19 are now compared. In Example 18, a cylindrical internal core composed of two lengthwise split member provided by dividing into two portions. One lengthwise split member was fixed to a guide, and another lengthwise split member was allowed to move by own weight so as to follow the extension of the film. In Example 19, a tapered stick was pushed from the outside the furnace to separate the lengthwise split members. As a result, the extent of amelioration of the ruffling was higher in Example 18 since presumably, the space between the lengthwise split members is spontaneously broadened along with extension of the film in Example 18, generation of the space between the internal core and the film was inhibited. In addition, fewer breakages of the graphite film were found in Example 18, since an inadequate force was not applied to the heat-treated film also due to the broadening of the space between the lengthwise split members by their own weight.

On the other hand, it is considered that since the space between the lengthwise split members was broadened by pressing in of a tapered stick in Example 19 to meet the expansion of the film, broadening of the space between the lengthwise split members failed, leading to occurrence of ruffling, as well as many breakages.

From the foregoing, the method in which an internal core is divided into a plurality of lengthwise split members, and the space between lengthwise split members is spontaneously broadened by their own weight is considered to be an more effective procedure.

(Case Including Heat Treatment Step in which Rate of Decrease Of the Winding Number $N_h$ Becomes not Greater than 3%)

Amelioration of ruffling of the graphite film was compared between those found in Examples 20 to 27, and 29 including a heat treatment in which the rate of decrease of the winding number $N_h$ became not greater than 3%, and those found in Comparative Examples 1 to 5 not including a heat treatment in which the rate of decrease of the winding number $N_h$ became not greater than 3%. The sag $Z_{gs}$ of the graphite film obtained in Examples 20 to 27, and 29 as determined by a method in accordance with windability evaluation of a film (JIS C2151) was less than 100 mm, whereas $Z_{gs}$ of Comparative Examples 1 and 3 to 5 was not less than 100 mm. Thus, it was proven that ruffling of the graphite film can be ameliorated when a heat treatment step in which the rate of decrease of the winding number $N_h$ became not greater than 3% is included. Similar results were shown for the camber $R_{gs}$.

The space between the layers of the film as shown in FIG. 3 is considered to be less likely to be generated since a decrease in the winding number $N_h$ was suppressed in Examples 20 to 27, and 29.

An actual method employed for achieving the heat treatment step in which the rate of decrease of the winding number $N_h$ became not greater than 3% involved a method including fixing the outermost layer of the film to suppress loosening of the film as in Examples 20 to 27, and 29.

Although there seems to be a variety of methods for carrying out the heat treatment such that the rate of decrease of the winding number $N_h$ becomes not greater than 3%, a graphite film accompanied by ameliorated ruffling can be obtained by carrying out a heat treatment such that the rate of decrease of the winding number $N_h$ becomes not greater than 3% as in Examples 20 to 27, and 29.

Figure 32:
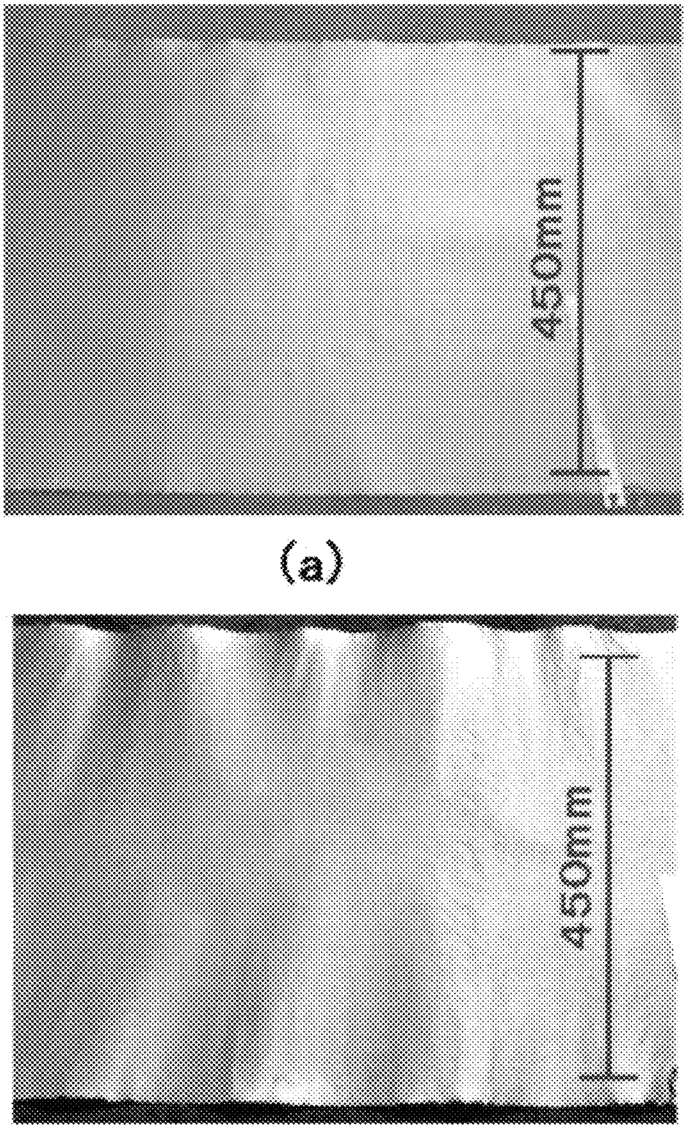
FIG. 32 shows (a) an overview photograph illustrating the graphite film obtained in Example 25, and (b) an overview photograph illustrating the graphite film obtained in Comparative Example 1.

In FIGS. 32 (*a*) and (*b*), overview photographs illustrating the graphite films obtained in Example 25 and Comparative Example 1, respectively. FIG. 32 clearly indicates amelioration of ruffling by fixing the outermost layer.

(Fixing Method)

In Examples 20, 21, and 22, methods of fixing the outermost layer of the film were compared. Since one outermost layer of the film was fixed by placing a weight thereon in Example 20, the film was cracked, and thus many breakage of the graphite film were found. In addition, the fixation was insufficient, and the film was loosen during the heat treatment, leading to significant ruffling as compared with Examples 21 and 22. In Examples 21 and 22, pressure was applied from the lateral face and the upper surface of the roll, respectively; however, according to this method, the film was less likely to be broken, and suppression of loosening was enabled, whereby a graphite film accompanied by ameliorated ruffling was obtained.

(Vertical Placement and Transversely Placement, and Compression)

Comparison between Examples 21 and 23 is described. In Example 21, the vessel was transversely placed, and the pressure was applied from the lateral face of the roll. In Example 23, the vessel was vertically placed, and the pressure was applied from the lateral face of the roll. As compared with Example 21, suppression of loosening of the film was enabled in Example 23 owing to the vertical placement, and thus a graphite film accompanied by ameliorated ruffling was obtained.

(Combination of Increase in Cross Sectional Area, and Fixing of the Outermost Layer of the Film)

In Examples 24 to 26, and 29, the apparent cross sectional area of films having varying thicknesses was increased with the internal core composed of two lengthwise split members provided by dividing into two portions, and the heat treatment was carried out while suppressing loosening of the film by applying a load from the upper surface of the roll. As a result, a film accompanied by significantly ameliorated ruffling was successfully obtained. A graphite film accompanied by significantly ameliorated ruffling was successfully obtained because enlargement of the apparent cross sectional area of the internal core by the split internal core enabled the heat treatment to be carried out in a state in which the space 53 between the internal core 51 and the film 52 as shown in FIG. 3 was filled, and the treatment carried out while applying a load to the upper surface of the roll enabled a heat treatment in a state with the space between the layers of the film eliminated more effectively.

(Case Including Winding Up Step)

Amelioration of ruffling of the graphite film was compared between those found in Examples 1 to 17, and 28 including a winding up step, and Comparative Examples 1 to 5 not including a winding up step. The sag $Z_{gs}$ of the graphite film obtained in Examples 1 to 17, and 28 as determined by a method in accordance with windability evaluation of a film (JIS C2151) was less than 100 mm, whereas $Z_{gs}$ of Comparative Examples 1 and 3 to 5 was not less than 100 mm. Thus, it was proven that ruffling of the graphite film can be ameliorated when a winding up step is included. Similar results were shown for the camber $R_{gs}$.

It is considered that amelioration of ruffling was enabled since the spaces between the core and the film, and the space between the layers of the film as shown in FIG. 3 were successfully eliminated by subjecting the loosened heat-treated film to a winding up step in Examples 1 to 17, and 28, and the degree of freedom of deformation of the film was enabled to be suppressed by carrying out the heat treatment again in this state.

The effects achieved by the winding up step were superior, and the following two types of methods were employed. In Examples 1 to 15, and 28, the winding up step was carried out at room temperature before the heat treatment or after the heat treatment, and the heat treatment was again carried out in this state. In Examples 16 to 17, the vessel was rotated while carrying out the heat treatment, and the winding up step was carried out while the loosening was taken.

Although there seems to be a variety of modes for carrying out the winding up step, a graphite film accompanied by ameliorated ruffling can be obtained by carrying out a winding up step as in Examples 1 to 17, 28.

Figure 33:
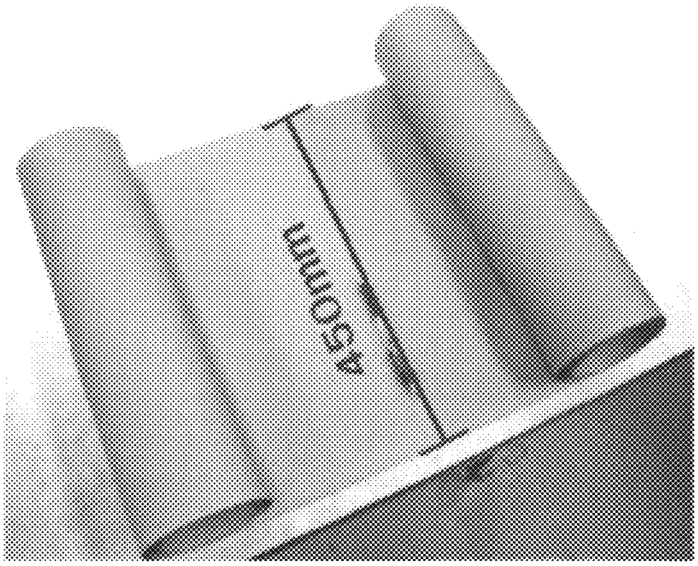
FIG. 33 shows (a) an overview photograph illustrating the graphite film obtained in Example 5, and (b) an overview photograph illustrating the graphite film obtained in Comparative Example 1.
Figure 33:

In FIGS. 33 (*a*) and (*b*), overview photographs illustrating the graphite films obtained in Example 25 and Comparative Example 1, respectively. FIG. 33 clearly indicates amelioration of ruffling by the winding up step.

(Timing of Winding Up Step: Winding Up at Room Temperature)

Example 1, Example 5, Example 11, Example 13, and Comparative Example 1 were compared on amelioration of ruffling of the graphite film. In Example 1, the winding up step was carried out twice after the carbonization step and the treatment at 2,900° C., and finally treated at 2,900° C. In Example 5, the winding up step was carried out twice after the carbonization step and the treatment at 2,700° C., and finally treated at 2,900° C. In Example 11, the winding up step was carried out twice after the carbonization step and the treatment at 2,200° C., and finally treated at 2,900° C. In Example 13, the winding up step was carried out once after the carbonization step, and finally treated at 2,900° C. In Comparative Example 1, the winding up step was not carried out, and finally treated at 2,900° C.

According to Comparative Example 1 in which the winding up step was not carried out, the sag $Z_{gs}$ was 120 mm, indicating that the ruffling occurred very significantly. According to Example 13 in which the winding up step was carried out only after the carbonization step, the sag $Z_{gs}$ was 95 mm, indicating that the ruffling was somewhat ameliorated. This indicates the effect achieved by the step of winding up of loosening of the film generated in the carbonization process.

In Example 11, since the winding up step was further carried out after the heat treatment to not less than 2,200° C., the sag $Z_{gs}$ was 50 mm, indicating that the ruffling was further ameliorated. As is seen from the relationship between the heat treatment temperature and extension of the film shown in FIG. 2, the film extended to some degree by the treatment to 2,200° C., and thereafter thus resulting loosening was wound up followed by the heat treatment to 2,900° C.; therefore, it is considered that the following treatment caused less loosening, whereby amelioration of ruffling was enabled. In Examples 1 and 5, the heat treatment to not less than 2,700° C. was carried out, and then the winding up step was carried out when the film was stretched; therefore, the best effect achievable by the winding up step was exhibited, and thus graphite film accompanied by significantly ameliorated ruffling was obtained.

As described above, in connection with the timing of the winding up step of the heat-treated film after the heat treatment, the winding up step can be advantageously executed when carried out after generation of loosening as the film size increased due to the heat treatment.

(Winding Up Step After Carbonization Treatment)

Examples 5 and 7 and Example 13, and Comparative Example 1 were compared on amelioration of ruffling of the graphite film. In Example 5, the winding up step was carried out twice after the carbonization step and the treatment at 2,700° C., and finally treated at 2,900° C. In Example 7, the winding up step was carried out once after the treatment at 2,700° C., and finally treated at 2,900° C.

As a result, ruffling tends to be ameliorated by the winding up after the carbonization treatment in Example 5, although the difference was slight. Also when Example 13 was compared with Comparative Example 1, similar tendency was confirmed.

(Timing of Winding Up Step: Winding Up During the Heat Treatment)

Examples 16 and 17 were compared on amelioration of ruffling of the graphite film. In Example 16, the heat treatment was carried out while winding up the film by rotating the vessel in a temperature range of 1,400° C. to 2,800° C. and then heat treated up to 2,900° C. In Example 17, the heat treatment was carried out while winding up the film by rotating the vessel in a temperature range of 1,400° C. to 2,200° C. and then heat treated up to 2,900° C.

In Examples 16 and 17, the sag $Z_{gs}$ was not greater than 40 mm, indicating that the ruffling was ameliorated as compared with Comparative Example 1 in which the winding up step was not carried out. Particularly, when the winding up step was carried out in a temperature range of 1,400 to 2,800° C. in which the film increases its size associated with graphitization as in Example 16, the sag $Z_{gs}$ was not greater than 25 mm, whereby a graphite film accompanied by significantly ameliorated ruffling was obtained.

As in the foregoing, in connection with the timing of the winding up step of the heat-treated film during the heat treatment, the winding up step can be advantageously executed when carried out within the temperature range in which loosening is generated as the film size increased due to the heat treatment.

(Degree of Winding Up)

Examples 1 to 3, 5, and 8 were compared on amelioration of ruffling of the graphite film. In Examples 1 to 3, the winding up step was carried out twice after the carbonization step and the treatment at 2,900° C., and finally treated at 2,900° C. In this procedure, the degree of winding up was decreased in the order of Examples 1, 2, and 3 in the second winding up step. In Example 1, the winding up step was carried out so as to adjust a=0.4, b=0.7, c=0.7, d=1.0 and e=1.1, whereby the spaces between the film and the internal core and between the layers of the film were hardly present. In Example 2, the winding was carried out so as to adjust a=0.8, b=1.3, c=1.5, d=1.7 and e=1.6, whereby some spaces were generated. Further, in Example 3, the winding was carried out so as to adjust a=1.0, b=1.5, c=2.0, d=2.0 and e=1.8, whereby spaces were further generated.

As a result, the extent of amelioration of the ruffling was favorable in the order of Examples 1, 2, and 3 as the spaces were smaller. The sag $Z_{gs}$ was 20 mm in Example 1, 70 mm in Example 2, and 90 mm in Example 3.

In Examples 5 and 8, the winding up step was carried out twice after the carbonization step and the treatment at 2,700° C., and finally treated at 2,900° C. In this procedure, the degree of winding up was decreased in the order of Examples 5 and 8 in the second winding up step. In Example 5, the winding up step was carried out so as to adjust a=0.4, b=0.7, c=0.7, d=1.0 and e=1.1, whereby the spaces between the film and the internal core and between the layers of the film were hardly present. In Example 8, the winding was carried out so as to adjust a=0.8, b=1.3, c=1.5, d=1.7 and e=1.6, whereby some spaces were generated. As a result, the extent of amelioration of the ruffling was favorable in the order of Examples 5 and 8 as the spaces were smaller. The sag $Z_{gs}$ was 25 mm in Example 5, and 75 mm in Example 8.

As in the foregoing, with regard to the degree of the winding up step of the heat-treated film, it is important to wind up such that generation of spaces between the internal core and the film and between the layers of the film can be avoided as far as possible.

(Thickness of Polymer Film)

In Examples 4 to 6, the thickness of the polyimide film as a material was studied. When the thickness falls within the range of Examples, the graphite film accompanied by significantly ameliorated ruffling can be obtained by carrying out the winding up step. However, in Example 6 in which a thick film was used, the extent of amelioration of ruffling somewhat decreased.

(Diameter of Internal Core)

In Examples 5, 9, and 10, the diameter of the internal core around which the carbonized film was wrapped was studied. As the diameter of the internal core was smaller, the extent of amelioration of the resulting ruffling of the graphite film was somewhat decreased. As the diameter is smaller, the winding number of the film increases (i.e., rolling thickness increases); therefore, temperature irregularity becomes likely to be generated during the heat treatment, and thus the extent of amelioration of the ruffling is somewhat decreased.

(Vertical Placement and Transverse Placement)

In Examples 5 and 15, and Examples 13 and 14, comparison was made on the vessel as to vertical placement, or transverse placement. In Examples 5 and 15, the winding up step was carried out twice after the carbonization step and the treatment at 2,700° C., and finally treated at 2,900° C. In this process, the carbonization treatment was carried out with transverse placement in both Examples 5 and 15, but the graphitization step was carried out with transverse placement in Example 5, and with vertical placement in Example 15. When the winding up step was carried out, the sag $Z_{gs}$ was not greater than 25 mm in both cases of vertical placement and transversely placed, and thus a film accompanied by ameliorated ruffling was successfully obtained. However, the treatment with vertical placement restricts the size permissible in the furnace; therefore, the width of the graphite film which can be obtained was as small as 225 mm, which was half the width permissible in the case of transverse placement. Also the internal core was not used in heat treatment 1 of Example 15; however, since vertically placed, the heat-treated film can maintain a roll shape after heat treatment 1, and by carrying out heat treatment 2 after the winding up step, the sag $Z_{gs}$ became not greater than 25 mm. Accordingly, it was proven that the internal core is not necessarily required for any heat treatments, and may be absent depending on the state of the heat treatment.

In Examples 13 and 14, the winding up step was carried out once after carbonization step, and then treated at 2,900° C. The carbonization step was carried out with transverse placement in both Examples, whereas the graphitization step was carried out with transverse placement in Example 13, and with vertical placement in Example 14. In these cases, the sag $Z_{gs}$ was smaller when vertical placed than when transversely placed, indicating amelioration of ruffling. It is considered that the film is less likely to be loosened when vertically placed, and thus spaces are less likely to be generated between the layers of the film, whereby the ruffling was ameliorated. However, the camber $R_{gs}$ was inferior with vertical placement.

(Prevention of the Film after Winding Up Step from Loosening)

Examples 11 and 12 were compared on amelioration of ruffling of the graphite film. In Examples 11 and 12, the winding up step was carried out twice after the carbonization step and the treatment at 2,200° C., and finally treated at 2,900° C. In this procedure in Example 12, for preventing the film from loosening of the film after the second winding up step, the heat treatment was carried out while placing a weight on the top of the roll. As a result, ruffling was ameliorated in Example 12 in which the loosening was prevented with the weight. It is considered that although loosening was eliminated by the winding up step in Example 11, the following heat treatment again caused loosening, and thus ruffling thereby occurred, to the contrary, the heat treatment while maintaining the state after completing the winding up step was enabled by the weight in Example 12. From the foregoing, it is concluded that the prevention of loosening after completing the winding up step can be very effective.

(Regarding $W_{Gs}/T_{pi}$)

When Examples 1 to 27 having $W_{gs}/T_{pi}$ of less than 0.99 g/μm were compared with Comparative Examples 1 to 3 having $W_{gs}/T_{pi}$ of not less than 0.99 g/μm, the graphite film of Examples 1 to 27 exhibited greatly ameliorated ruffling. The heat treatment was carried out in the state of the internal core and the film, and the layers of the film with each other being in close contact under various types of treatment conditions in Examples 1 to 27; therefore, it is considered that the graphite layer grew along the planar direction, and as a result, a small weight $W_{gs}$ of the graphite per unit was attained. Thus, it is considered that the ruffling was ameliorated due to the growth of the graphite layer in the planar direction. Similar effects can be also achieved by changing the rate of temperature rise.

Accordingly, when a graphite film is produced such that $W_{gs}/T_{pi}$ is adjusted to be not greater than 0.99 g/μm, a graphite film accompanied by ameliorated ruffling can be obtained.

As is seen from the foregoing Examples, and Comparative Examples, it is considered that a graphite film accompanied by ameliorated ruffling can be obtained when a heat treatment is performed in a state in which the spaces between the internal core and the film, and between the layers of the film was eliminated. According to the present invention, a long and large-area graphite film accompanied by improved thermal diffusivity and flex resistance, and ameliorated ruffling can be obtained. Examples describe a part of methods in which the heat treatment is conducted in space-free state, in relation to the winding up step, the split internal core, fixation of the outermost layer, and the like; however, Embodiments and Examples disclosed herein are presented for illustrative purposes in all aspects and should not be construed as limiting. The scope of the present invention is defined not by the foregoing description but by claims, and equivalent matter to claims and any modifications within the scope of claims are intended to be included.

EXPLANATION OF THE REFERENCE SYMBOLS

51 internal core
52 film
53 space (between internal core and film)
54 space (between film layers)
61 internal core
62 external cylinder
63 polymer film
71 roll start of first layer of film
72 roll end of first layer
73 first layer
74 roll start of outermost layer
75 roll end of outermost layer
76 outermost layer
77 fourth layer
81 axial direction
82 outer periphery of film cross section (length $r_0$ of outer periphery of internal core)
91 recession
92 breakage
111 space (between internal core and first layer)
121 space (between n-th layer and n+one-th layer)
151 lengthwise split member
152 lengthwise split member
153 tapered stick
161 lengthwise split member
162 lengthwise split member
201 furnace
202 heater
203 internal core
204 film
211 end of outermost layer
212 end of innermost layer
213 internal core
214 film
231 table
232 test piece (graphite film)
233 position of ruler
244 first roller
245 second roller
246 film roll
247 test piece (graphite film)
248 measurement point
249 reference line
2491 tensile force
2492 sag $Z_{gs}$
251 roll start of film
252 roll end of film
261 internal core
262 carbonized film
263 support member
271 lengthwise split member
272 lengthwise split member
281 weight
291 wall
311 film

The invention claimed is:

1. A method for producing a graphite film, the method comprising providing a heat-treated film that is a polymer film that has been subjected to a heat treatment, graphitizing the heat-treated film to give the graphite film, wherein the graphitizing comprises substeps (i) and (ii):

(i) subjecting the heat-treated film to a first graphitizing heat treatment at a temperature of not less than 2,000° C. while the heat-treated film is in a state of being wrapped around an internal core, wherein the heat-treated film is loosened by the first graphitizing heat treatment, and (ii) winding up the heat-treated, loosened film during the first graphitizing heat treatment, after the first graphitizing heat treatment and prior to a subsequent graphitizing heat treatment, or during a subsequent graphitizing heat treatment.

2. The method for producing a graphite film according to claim 1, wherein the graphitizing heat treatment is carried out a plurality of times.

3. The method for producing a graphite film according to claim 2, wherein the winding up is carried out during the plurality of times of the graphitizing heat treatment.

4. The method for producing a graphite film according to claim 3, wherein the winding up is carried out after a first graphitizing heat treatment and prior to a subsequent graphitizing heat treatment.

5. The method for producing a graphite film according to claim 4, wherein the film is cooled to room temperature when the winding up is carried out.

6. The method for producing a graphite film according to claim 1, wherein the winding up is carried out during the graphitizing heat treatment before reaching a highest temperature of the graphitizing heat treatment.

7. The method for producing a graphite film according to claim 6, wherein the winding up is carried out at a temperature of not less than 1,400° C.

8. The method for producing a graphite film according to claim 6, wherein the winding up is carried out at a temperature of lower than 1,400° C.

9. The method for producing a graphite film according to claim 1, wherein the heat-treated, loosened film consists of a carbonized polymer film.

10. The method for producing a graphite film according to claim 1, wherein in the winding up, the heat-treated, loosened film is wound up such that $(w_0/r_0 \times 100)$ is not greater than 7, wherein the length of the outer periphery of the internal core is defined as $r_0$, and the spatial distance between the internal core and the first layer of the heat-treated film is defined as $w_0$.

11. The method for producing a graphite film according to claim 1, wherein in the winding up, the heat-treated, loosened film is wound up such that the distance $w_n$ is not greater than 5 mm in $N_h \times 0.5$ or more spaces between the layers of the heat-treated film from among spaces between the layers of the heat-treated film that are present in the number of $N_h$, wherein the winding number of the heat-treated film is defined as $N_h$, and the spatial distance between the n-th layer of the heat-treated film and the n+one-th layer (wherein n represents an integer of 0 to $N_h-1$, and the null layer corresponds to the outer surface of the internal core) of the heat-treated film is defined as $w_n$.

12. The method for producing a graphite film according to claim 1, wherein in the winding up, the heat-treated, loosened film is wound up such that $((r_{n+1}-r_n)/r_n \times 100)$ is not greater than 8, wherein the roll length of the n-th layer of the heat-treated film is defined as $r_n$, and the roll length of the n+one-th layer of the heat-treated film is defined as $r_{n+1}$ (wherein n is 0 or a nonnegative integer, and $r_0$ represents the length of the outer periphery of the internal core).

13. The method for producing a graphite film according to claim 1, wherein in the winding up, the heat-treated, loosened film is wound up such that $(D/(N_h \times d))$ is not less than 1 and not greater than 2.5, wherein the winding number of the heat-treated film is defined as $N_h$, the thickness of the heat-treated film per layer is defined as d, and the apparent rolling thickness of the heat-treated film is defined as D.

14. The method for producing a graphite film according to claim 1, wherein carrying out the graphitizing heat treatment to not less than 2,200° C. is followed by winding up of the heat-treated film.

15. The method for producing a graphite film according to claim 1, wherein the winding up of the heat-treated, loosened film is carried out by rotating the internal core.

16. The method for producing a graphite film according to claim 1, wherein the winding up of the heat-treated, loosened film is carried out by rotating the heat-treated, loosened film.

17. The method for producing a graphite film according to claim 1, wherein the winding up of the heat-treated, loosened film is carried out by unwinding the heat-treated, loosened film from the internal core and re-winding the heat-treated, loosened film onto the internal core.

18. The method for producing a graphite film according to claim 1, wherein the heat-treated, loosened film is rewound onto the internal core such that the innermost portion of the heat-treated, loosened film before unwinding is the outermost portion of the heat-treated, loosened film after re-winding.

19. The method for producing a graphite film according to claim 1, wherein the winding up of the heat-treated, loosened film is carried out a plurality of times.

* * * * *